US011992446B2

(12) United States Patent
Tessmer et al.

(10) Patent No.: US 11,992,446 B2
(45) Date of Patent: May 28, 2024

(54) PATIENT SUPPORT APPARATUS WITH SIDE RAIL

(71) Applicant: Stryker Corporation, Kalamazoo, MI (US)

(72) Inventors: Brian J. Tessmer, Kalamazoo, MI (US); Christopher Ryan Sweeney, Portage, MI (US); Jeffrey C. Shiery, East Leroy, MI (US); Michael T. Brubaker, Portage, MI (US); Dickson J. Brubaker, Climax, MI (US); Dan George Parker, Grand Rapids, MI (US)

(73) Assignee: Stryker Corporation, Kalamazoo, MI (US)

( * ) Notice: Subject to any disclaimer, the term of this patent is extended or adjusted under 35 U.S.C. 154(b) by 0 days.

(21) Appl. No.: 17/957,036

(22) Filed: Sep. 30, 2022

(65) Prior Publication Data

US 2023/0033438 A1 Feb. 2, 2023

Related U.S. Application Data

(63) Continuation of application No. 16/715,674, filed on Dec. 16, 2019, now Pat. No. 11,504,289, which is a continuation of application No. 15/216,860, filed on Jul. 22, 2016, now Pat. No. 10,507,151.

(60) Provisional application No. 62/196,061, filed on Jul. 23, 2015.

(51) Int. Cl.
*A61G 7/05* (2006.01)

(52) U.S. Cl.
CPC .......... *A61G 7/0509* (2016.11); *A61G 7/0516* (2016.11)

(58) Field of Classification Search
CPC .......... A61G 7/00; A61G 7/05; A61G 7/0509; A61G 7/0516
See application file for complete search history.

(56) References Cited

U.S. PATENT DOCUMENTS

| | | | | |
|---|---|---|---|---|
| 1,473,993 | A | 11/1923 | Kuhns | |
| 5,394,580 | A | 3/1995 | Foster et al. | |
| 6,598,247 | B1 | 7/2003 | Heimbrock et al. | |
| 6,691,345 | B2 | 2/2004 | Nanahara | |
| 6,728,984 | B2 | 5/2004 | Dietrich | |
| 6,938,289 | B2 * | 9/2005 | Morin | A61G 5/10 5/430 |
| 6,941,600 | B2 | 9/2005 | Freeborn et al. | |
| 7,073,220 | B2 | 7/2006 | Simmonds et al. | |
| 17,073,219 | | 7/2006 | Poulin et al. | |
| 7,082,630 | B2 | 8/2006 | Castonguay et al. | |
| 7,134,155 | B2 | 11/2006 | Freeborn et al. | |

(Continued)

FOREIGN PATENT DOCUMENTS

| | | |
|---|---|---|
| EP | 2 322 129 | 12/2014 |
| EP | 1 916 926 | 11/2015 |

*Primary Examiner* — Fredrick C Conley
(74) *Attorney, Agent, or Firm* — Warner Norcross + Judd LLP

(57) ABSTRACT

A patient support apparatus that comprises a frame and a side rail mounted to the frame. The side rail comprises a side rail body and a pair of arms mounting the side rail body for rotational movement relative to the frame. The pair of arms has a pair of upper pivot connections connected to the side rail body and a pair of lower pivot connections for mounting to the frame. The upper pivot connections engage a timing link.

21 Claims, 50 Drawing Sheets

(56) References Cited

U.S. PATENT DOCUMENTS

| | | | |
|---|---|---|---|
| 7,467,427 B1 | 12/2008 | Wu et al. | |
| 7,708,346 B2 | 5/2010 | White et al. | |
| 7,761,939 B2 | 7/2010 | Wiggins et al. | |
| 7,784,125 B2 | 8/2010 | Morin et al. | |
| 8,104,118 B2 | 1/2012 | Derenne et al. | |
| 8,631,524 B2 | 1/2014 | Derenne et al. | |
| 2003/0167568 A1 | 9/2003 | Brooke | |
| 2004/0040092 A1 | 3/2004 | Hensley et al. | |
| 2004/0139545 A1 | 7/2004 | Reinke et al. | |
| 2005/0132935 A1 | 6/2005 | Lahmann et al. | |
| 2006/0053555 A1 | 3/2006 | Poulos et al. | |
| 2006/0059621 A1 | 3/2006 | Poulos et al. | |
| 2006/0059624 A1 | 3/2006 | Poulos et al. | |
| 2006/0117481 A1 | 6/2006 | Stryker et al. | |
| 2006/0137092 A1 | 6/2006 | Reinke et al. | |
| 2006/0168730 A1 | 8/2006 | Menkedick et al. | |
| 2006/0168731 A1 | 8/2006 | Menkedick et al. | |
| 2006/0195984 A1 | 9/2006 | Hakamiun et al. | |
| 2009/0188042 A1* | 7/2009 | Derenne .............. | A61G 7/0521<br>5/430 |
| 2011/0162141 A1 | 7/2011 | Lemire et al. | |
| 2011/0314602 A1 | 12/2011 | Stryker et al. | |
| 2015/0164722 A1 | 6/2015 | Roussy et al. | |
| 2015/0305955 A1 | 10/2015 | Simmonds et al. | |
| 2016/0193095 A1 | 7/2016 | Roussy et al. | |
| 2017/0020757 A1* | 1/2017 | Tessmer ............... | A61G 7/0516 |

* cited by examiner

PATIENT SUPPORT APPARATUS WITH SIDE RAIL

This application is a continuation of U.S. patent application Ser. No. 16/715,674 (P-475B), filed on Dec. 16, 2019, by inventors Brian J. Tessmer et al. and entitled PATIENT SUPPORT APPARATUS WITH SIDE RAIL, which is a continuation of U.S. patent application Ser. No. 15/216,860 (P475A) filed on Jul. 22, 2016, by inventors Brian J. Tessmer et al. and entitled PATIENT SUPPORT APPARATUS WITH SIDE RAIL, now U.S. Pat. No. 10,507,151, which claims the benefit of U.S. Prov. Pat. App. Ser. No. 62/196,061 filed Jul. 23, 2015, by inventors Brian J. Tessmer et al. and entitled PATIENT SUPPORT APPARATUS WITH SIDE RAIL, the disclosures of which are incorporated herein by reference in their entireties.

TECHNICAL FIELD

Summary

The present disclosure is directed to a side rail, and more particularly to a patient support apparatus side rail with a raising and lowering mounting mechanism.

In one embodiment, a patient support apparatus comprises a frame and a side rail mounted to the frame. The side rail comprises a side rail body and a pair of arms mounting the side rail body for movement relative to the frame. The arms have a pair of upper pivot connections connected to the side rail body and a pair of lower pivot connections for mounting to the frame. The patient support apparatus further comprises a timing link coupled to the upper pivot connections.

In one aspect, the patient support apparatus further comprises a latch. The latch is provided for selectively engaging the timing link or the upper pivot connections or both to thereby lock the position of the side rail body.

In a further aspect, the upper pivot connections and the timing link are located in the side rail body.

In yet another aspect, each of the upper pivot connections comprises a gear for engaging the timing link.

In any of the above, the patient support apparatus may comprise a damper, with the damper forming a counterbalance to the weight of the side rail. For example, the damper may form a counterbalance to the weight of the side rail over a first range of motion of the side rail and over a second range of motion of the side rail. Suitable dampers may comprise a spring, such as a gas spring.

In other aspects, the timing link may comprise a bar, a belt, a gear or a straight or curved rack.

In another embodiment, the patient support apparatus further comprises a spring. The spring is supported in the side rail to allow the spring to apply a force in a first direction and a second direction opposed to the first direction to provide a counterbalance to the weight of the side rail when the side rail rotates over first range of motion and over a second range of motion different from the first range of motion.

In yet other embodiments, the side rail is mounted for movement between a lowered position, a first locked position, and a second locked position wherein the latch is configured to bypass one of the locked positions. For example, in one embodiment, the latch is configured to bypass the second locked position when the side rail is raised from the lowered position to the first locked position.

In further aspects, the side rail comprises one or more dampers to absorb energy when the side rail is impacted by a force. For example, the dampers may comprise rubber bumpers.

According to yet another aspect, the side rail is mounted to a side of the frame parallel to the longitudinal axis, with springs absorbing shock along an axis parallel to the longitudinal axis.

In another aspect, the timing link is configured to allow a tight fit up with the gears over one range of motion of the side rail but decreases the tight fit between the timing link and the gears over another range of motion of the side rail.

For example, the timing link or the gears comprise a cam profile. In one aspect, the timing link includes a longitudinal axis and height, with the height varying along the longitudinal axis to form the cam profile on the timing link.

According to yet other aspects, the timing link is supported by at least one elastomeric roller, which urges the timing link into engagement with the gears.

In yet another embodiment, the patient support apparatus comprises a frame and a side rail movably mounted to the frame for movement between a raised position and a lowered position. The patient support apparatus further comprises a damper configured and arranged to form a counterbalance to the weight of the side rail over a first portion of its full range of motion and over the other portion of the full range of motion of the side rail.

For example, the damper may comprise a spring, such as a gas spring. In one aspect, the spring comprises a first end and a second end, with the spring supported to allow each of its ends to move relative to the side rail.

In addition, the side rail may comprise first and second stops for applying a force to the first and second ends of the spring, respectively.

Optionally, the spring is located in the side rail body.

According to yet another embodiment, a patient support apparatus comprises a frame and a side rail mounted to the frame. The side rail comprises a side rail body and a pair of arms mounting the side rail body for movement relative to the frame. The arms have a pair of upper pivot connections connected to the side rail body and a pair of lower pivot connections for mounting to the frame. A locking assembly is provided that has a single latch for locking the rotation of the pair of arm simultaneously.

In a further embodiment, the patient support apparatus further comprises a timing link engaged by the upper pivot connections. The latch is operable to engage the timing link to thereby lock the position of the side rail body.

In yet another embodiment, a patient support apparatus comprises a frame and a side rail mounted to the frame. The side rail comprises a side rail body and a pair of arms mounting the side rail body for movement relative to the frame. The arms have a pair of upper pivot connections connected to the side rail body and a pair of lower pivot connections for mounting to the frame. A locking assembly is provided for locking the rotation of the pair of arms. The patient support apparatus further comprises one or more dampers to absorb energy when the side rail is impacted by a force.

Suitable dampers may comprise rubber bumpers. For example, the dampers may be located to absorb shock along an axis parallel to the longitudinal axis of the frame.

In one aspect, the dampers are located between the arms and the frame.

According to yet another embodiment, a patient support comprises a frame, a side rail mounted to the frame, and a locking assembly with a latch for locking the rotation of the pair of arms of the side rail. One or more dampers are provided to allow relative translational movement between the locking assembly and the side rail body or between the locking assembly and the frame to thereby absorb energy.

In one aspect, the damper is located between the latch and the side rail body.

In another aspect, the locking assembly comprises a bracket and a latch supported by the bracket, the damper located between the bracket and the side rail body.

In one aspect, the rubber bumper is positioned between the bracket and its fasteners.

DETAILED DESCRIPTION OF THE EMBODIMENTS

Figure 1:
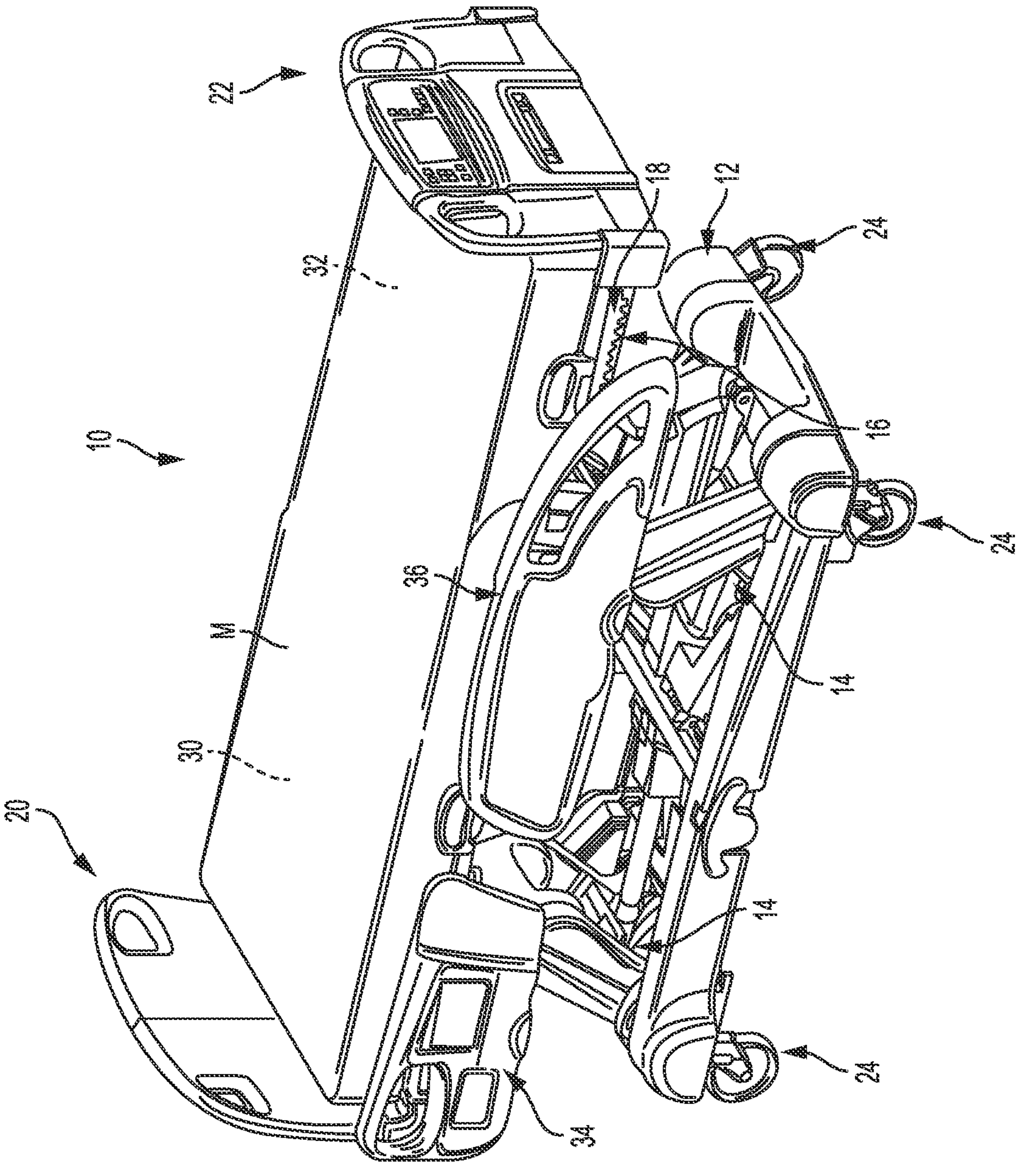
FIG. 1 is a perspective view of a patient support apparatus with a side rail shown in a lowered position.

Referring to FIG. 1, the numeral 10 generally designates a patient support apparatus 10. As will be more fully described below, patent support apparatus 10 comprises one or more side rails that are mounted to the patient support apparatus using mounting mechanisms that are compact and, therefore, do not interfere with the ability of the side rails to be lowered to a very low height. Further, the mounting mechanisms are more efficient, which can reduce the overall part count and hence simplify the assembly process. In another embodiment, the side rails are configured so that they absorb energy from impacts, which can reduce the wear and tear on the component parts of the side rail. Still yet other features will be described below.

Referring again to FIG. 1, patient support apparatus 10 comprises a base 12, a pair of elevation adjustment mechanisms 14, a frame or litter assembly 16, a patient support surface or deck 18, which supports a mattress M, a headboard 20, and a footboard 22. Base 12 comprises a plurality of caster wheels 24 (FIG. 1) that can be selectively locked and unlocked so that when unlocked patient support apparatus 10 is able to be wheeled to different locations. Elevation adjustment mechanisms 14 are adapted to raise and lower frame 16 and deck 18 with respect to base 12. Elevation adjustment mechanisms 14 may be hydraulic actuators, electric actuators, or any other suitable device for raising and lowering frame 16 and deck 18 with respect to base 12. In some embodiments, elevation adjustment mechanisms 14 operate independently so that the orientation of frame 16 and deck 18 may also be adjusted with respect to base 12.

Frame 16 provides a structure for supporting deck 18, headboard 20, and footboard 22 (FIG. 1). Deck 18 provides a surface on which mattress M (FIG. 1), or other soft cushion, is positionable so that a patient may lie and/or sit thereon. Deck 18 may comprise a plurality of deck sections, some of which are pivotable about generally horizontal pivot axes. For example, deck 18 may comprise a head section, a seat section, a thigh section, and a foot section. The head section, which is also often referred to as a Fowler section, is pivotable between a generally horizontal orientation (shown in FIG. 1) and a plurality of raised positions. The thigh and foot sections may also be pivotable in some embodiments.

In addition to the aforementioned components, patient support apparatus 10 comprises one or more side rails. In the illustrated embodiment, patient support apparatus 10 comprises four side rails: A right head side rail 30, a right foot side rail 32, a left head side rail 34, and a left foot side rail 36 (FIG. 1). The terms “right” and “left” as used above is used in reference from the perspective of a person standing at the foot end of the patient support apparatus and looking toward the head end. In other cases, left and right may be used in reference to the orientation shown in the figures. Each of the side rails 30, 32, 34, and 36 are movable between one or more raised positions and a lowered (lowermost) position. In the configuration shown in FIG. 1, all four of the side rails 30, 32, 34, and 36 are lowered. The term lowered position refers to the position where the side rails are at their lowermost position—this can in some embodiments mean lowered to where the mounting arms are vertical and perpendicular to the floor, and in other embodiments this means that arms angle upwardly relative to the floor, which is defined by a stop. Further, when in the lowered position the side rail may be locked or unlocked. Accordingly, the side rail may be locked in any position over its full range of motion.

The physical construction of base 12, elevation adjustment mechanisms 14, frame 16, patient support surface 18, headboard 20, and/or footboard 22 may be the same as disclosed in commonly assigned, U.S. Pat. No. 7,690,059 issued to Lemire et al., and entitled HOSPITAL BED, the disclosure of which is also hereby incorporated herein by reference in its entirety; or as disclosed in commonly assigned U.S. Pat. publication No. 2007/0163045 filed by Becker et al. and entitled PATIENT HANDLING DEVICE INCLUDING LOCAL STATUS INDICATION, ONE-TOUCH FOWLER ANGLE ADJUSTMENT, AND POWER-ON ALARM CONFIGURATION, the disclosure of which is also hereby incorporated herein by reference in its entirety; or as embodied in the commercially available S3 bed sold by Stryker Corporation of Kalamazoo, Michigan, and document in the Stryker Maintenance Manual for Stryker’s MedSurg Bed, Model 3002 S3, (doc. 3006-109-002 Rev D), published in 2010, the disclosure of which is also hereby incorporated herein by reference in its entirety. The construction of any of base 12, elevation adjustment mechanisms 14, frame 16, patient support surface 18, headboard 20, and footboard 22 may also take on forms different from what is disclosed in these documents.

For ease of description, reference herein after will be made to one side rail, namely the foot end side rail, with the understanding the shape and size of the side rail may vary depending on whether it is a head end or foot end side rail.

Figure 2:
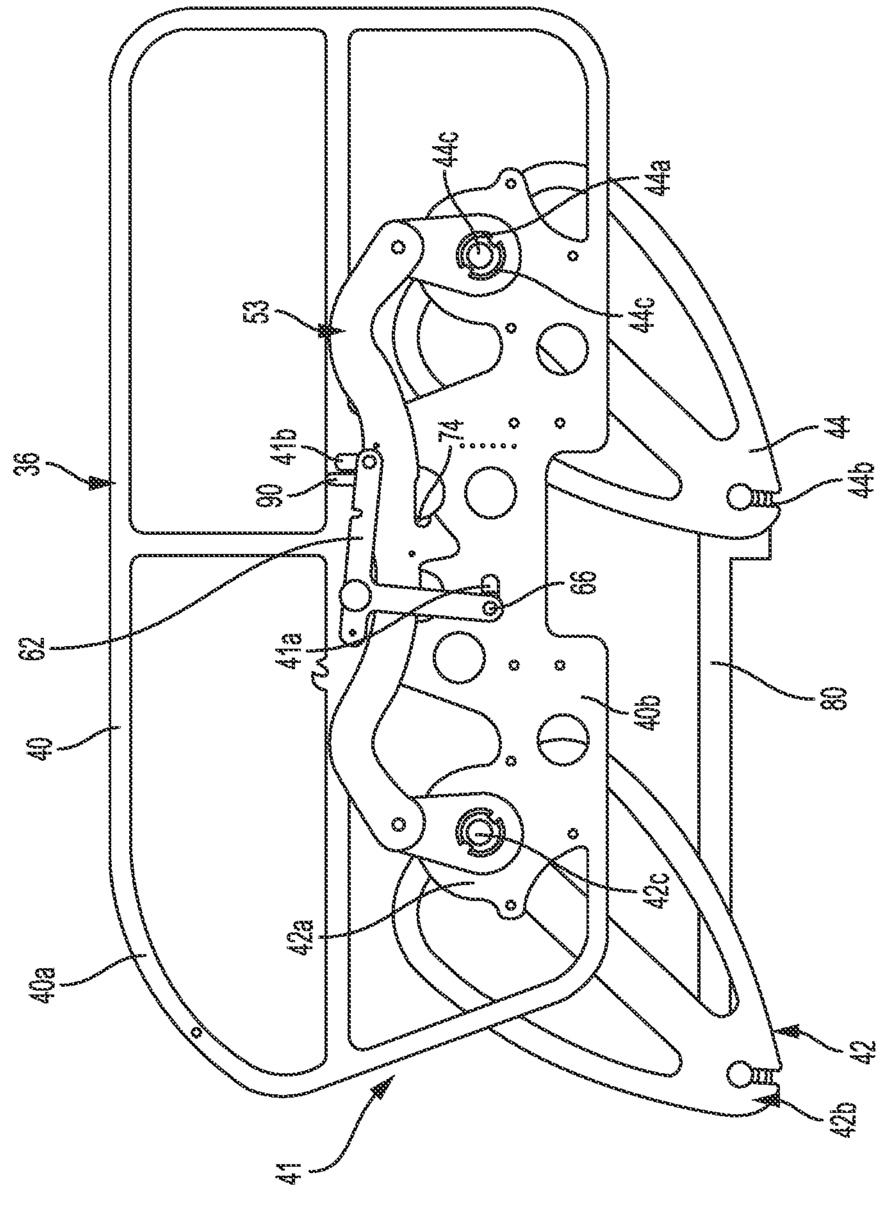
FIG. 2 is a fragmentary front elevation view of one side rail of the patient support apparatus FIG. 1.
Figure 3:
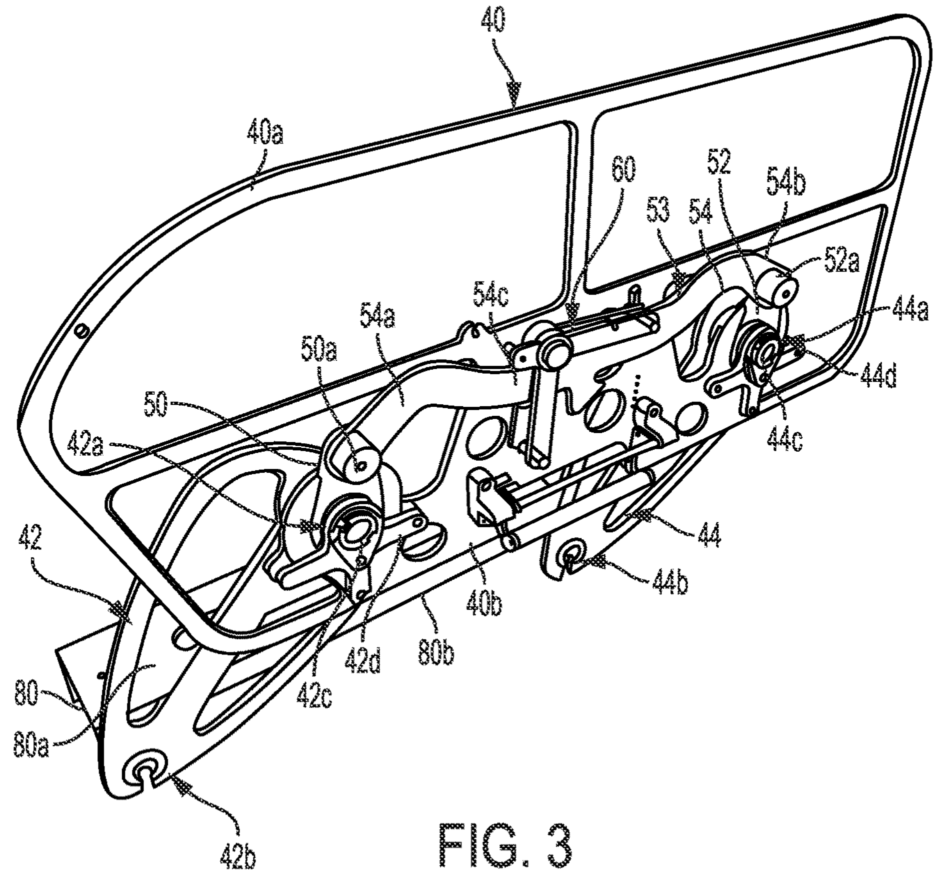
FIG. 3 is a fragmentary perspective view of the side rail of FIG. 2.

Referring to FIGS. 2 and 3, side rail 36 comprises a frame 40 and a pair of mounting arms 42 and 44, which form a four bar mounting mechanism 41 (FIG. 2, more fully described below) that pivotally mounts frame 40 to patient support apparatus 10. In the illustrated embodiment, the side rails are mounted to frame 16, though it should be understood, that the side rails may be mounted to other parts of the patient support apparatus, such as the deck so as to move with the deck sections as they are articulated.

As would be understood from FIGS. 2 and 3, frame 40 forms part of the side rail body of side rail 36 and comprises perimeter frame 40*a*, to which the side rail body outer plastic shell or shells are mounted, and a generally central plate 40*b* for mounting the arms (42, 44) to the frame. Arms 42 and 44 comprise upper and lower pivot connections 42*a*, 44*a*, and 42*b*, 44*b* (FIGS. 2 and 3), respectively. The term upper and lower is merely used for convenience and refers to the orientation shown in FIG. 2, for example, where the side rail body is moved to a raised position.

Upper pivot connections 42*a*, 44*a* are formed by cylindrical bushings 42*c*, 44*c* formed at or mounted to the upper portions of arms 42, 44, respectively, that extend through plate 40*b* and, further, are rotationally secured to plate 40*b* by brackets 42*d*, 44*d* (FIGS. 2 and 3). Bushings 42*c*, 44*c* pivotally mount the upper pivot connections to frame 40. Extending from bushings 42*c*, 44*c* are linking arms 50, 52 (FIG. 3), which are mechanically coupled to bushings 42*c*, 44*c* so they rotate together with the bushings. Hence when mounting arms 42, 44 rotate so do linking arms 50, 52. As will be more fully described below, side rail 36 also includes a timing mechanism 53 (FIG. 3) that couples the two bushings together so that they rotate in unison. Further, the timing mechanism 53 may be configured to be more compact than prior timing links and has fewer components to simplify the manufacturing and/or assembly process. In the illustrated embodiment, timing mechanism 53 comprises a link 54 that acts as a timing link and also provides engagement structures, which allow the side rail to be locked in one or more positions, typically a raised locked position and, optionally, one or more intermediate locked positions. However, as noted, the side rail may be locked in any position over its full range of motion—that is, as noted above, the side rail can be locked in any position above its horizontal position, at its horizontal position, or below its horizontal position, or any where in between.

Linking arms 50, 52 are rotatably coupled to link 54 by way of pivot shafts 50*a*, 52*a* that extend through openings in the ends of link 54. In this manner, when frame 40 (and the rest of the side rail body) is raised or lowered and arms 42, 44 pivot about their upper pivot connections 42*a*, 44*a*. Additionally, link 54 keeps the upper pivot connections synchronized, thereby forming the four bar mounting mechanism with the arms and the side rail mount (described below), and to thereby form the timing link. In the illustrated embodiment, mounting arms 42, 44 are respectively coupled to linking arms 50, 52 so they move in synchrony, i.e. both clockwise at the same time or both counterclockwise at the same time. However, it should be understood that linking arms may be configured to move the other way, i.e. counterclockwise when mounting arms move clockwise.

In the illustrated embodiment, link 54 is a non-linear bar with two inverted generally V-shaped portions 54*a*, 54*b* that extend from a generally straight mid-section 54*c*. To lock the position of the side rail body, side rail 36 comprises a locking mechanism 60 to engage timing link 54 to thereby lock the position of the side rail. Locking mechanism 60 is selectively operated by a handle mounted to the side rail that is accessible from the outside of side rail body. Note that the handle can be designed in many ways when it functions to engage/disengage the locking mechanism.

Figure 4:
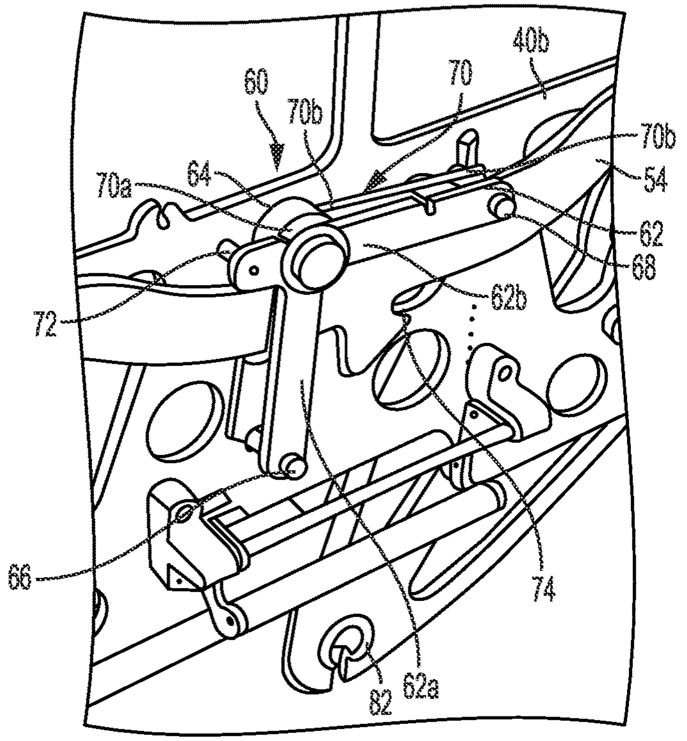
FIG. 4 is an enlarged view of the locking mechanism of FIG. 3.

As best seen in FIGS. 2 and 4, locking mechanism 60 comprises an L-shaped latch 62. Latch 62 is pivotally mounted about a pivot shaft or bushing 64, which extends from plate 40*b* and which extends through an opening formed at the juncture of the two arms 62*a*, 62*b* of L-shaped latch 62. In this manner, latch 62 pivots about bushing 64 between a locked position and an unlocked position. The ends of arms 62*a*, 62*b* comprise first and second pins 66, 68, and the central portion of latch 62 comprises a third pin 72. Pins 66, 68 each selectively engage notches or grooves provided in link 54 (formed or provided at its upper and lower edges) so that when link 54 is engaged by one of the pins, link 54 is fixed in position to thereby lock the rotation of arms 42 and 44. Although only two notches are illustrated, link 54 may include fewer or additional notches when fewer or additional locked positions are desired.

As best understood from FIG. 2, pins 66, 68 are each supported and guided by a slotted opening 41*a*, 41*b* formed in plate 40*b* so that the latch can be guided between its unlocked and locking positions. To urge latch 62 in its locking position, i.e. into engagement with link 54, locking mechanism 60 comprises a spring 70. The handle, noted above, is coupled to the latch and is configured, such as by pivoting latch 62 by way of pin 72 to move the latch to its unlocked position against the force of the spring. For example, pin 72 may comprise a floating pin that is coupled to a handle (not shown) by a link so that when the handle is moved, e.g. pivoted, pin 72 will pivot latch 62 about bushing 64. A suitable link may comprise a wire or other link that is attached on one end to the pin and attached at its other end to the handle.

As best seen in FIG. 4, spring 70 comprises a coiled portion 70*a* that is mounted about pivot shaft or bushing 64 and a spring arm 70*b* that applies a downward spring or biasing force on pin 68 to urge latch 62 in a clockwise direction as viewed in FIG. 3. When the side rail is in an intermediate position, pin 68, therefore, is aligned and urged into a notch (not shown) formed in or provided at the upper edge on link 54, which defines an intermediate locked position of the side rail. When a force is applied to counteract the downward force of spring arm 70*b*, e.g. when the handle is pivoted upwardly, pin 68 can raise out of the notch and the side rail body may be raised to its raised locked position, where pin 66 is then aligned with a second notch 74 along the lower edge of link 54 that corresponds to the raised locked position of the side rail. It should be understood that the side rail may include one or more locked positions.

Once the handle is released, pin 66 is then urged into engagement with second notch 74 to thereby lock the side rail in its raised locked position. When pins 66 and 68 are no longer engaged with the timing link 54, the side rail can be lowered to its lowered (lowermost) position, which in the illustrated embodiment is a lowered, unlocked position. It should be understood that each of the pins is biased into engagement with the respective notches on link 54 by spring 70.

In this manner, the timing link 54 can be the vehicle to lock the position of the side rail, which allows for a simplified mounting mechanism because no additional locking mechanism is required. Further, with this, link 54 may be fully contained within the side rail body, and further generally above the upper pivot connections of the arms 42, 44.

In this manner, a single latch is disclosed that can lock the rotation of both side rail mounting arms 42, 44.

Also noted above, link 54 forms a four bar linkage with arms 42, 44 and their mounting member, namely mounting member 80. As noted above, side rail 36 may be mounted to the deck or frame of apparatus 10. As best seen in FIG. 3, mounting member 80 comprises an inverted channel shaped member whose upper horizontal web 80*a* mounts to the underside of the frame of apparatus 10. The outer flanges 80*b* provide mounting surfaces for lower pivot connections 42*b*, 44*b* of arms 42, 44 and support pivot bushings 82 on which the lower ends of arms 42, 44 are mounted to thereby pivotally mount arms 42, 44 to mounting member 80. In this manner, link 54, arms 42, 44, and mounting member 80 form a four bar linkage. As such, when arms 42, 44 pivot counter-clockwise as viewed in FIGS. 2 and 3, link 54 will shift to the left and lower so that notch 74 will align with pin 66. When aligned, pin 66 can then seat in notch 74 to lock the side rail in its raised locked position. When pin 66 is disengaged from link 54, and arms 42, 44 are rotated in a clockwise direction as viewed in FIGS. 2 and 3, link 54 will shift to the right as viewed in FIGS. 2 and 3 so that pin 68 is aligned and can engage the notch in the upper edge of link 54, which defines another locked position, such as an intermediate locked position, as noted above.

Optionally, as best seen in FIG. 2, side rail 36 may comprise a bypass mechanism which bypasses one of the side rail positions. In the illustrated embodiment, the bypass mechanisms is in the form of a bypass lever 90, which only allows the side rail to lock in an intermediate position from one direction, for example, when being lowered. The lever is pivotally mounted to frame 40 and allows the latch to engage the notch that corresponds to an intermediate locked position when side rail 36 is moved in one direction, e.g. when the side rail is lowered. The lever, however, blocks the latch from seating in the notch that corresponds to an intermediate locked position when side rail 36 is moved in another direction, e.g. when the side rail is raised. For further details of one embodiment of the bypass lever, reference is made to the description accompanying FIGS. 19-22. It should be understood that the bypass mechanism may be configured to bypass any of the locked positions and from either direction, i.e., when lowering or raising the side rail.

Optionally, various dampers may be employed between one or more of the component parts of the side rail to absorb energy, as will be more fully described below. Suitable dampers comprise rubber bumpers. For example, a damper may be provided in the connections (1) between the arms and the side rail body, (2) between the locking mechanism, e.g. the latch and the side rail body, and/or (3) between the arms and the frame (or deck) of the patient support apparatus.

Figure 5:
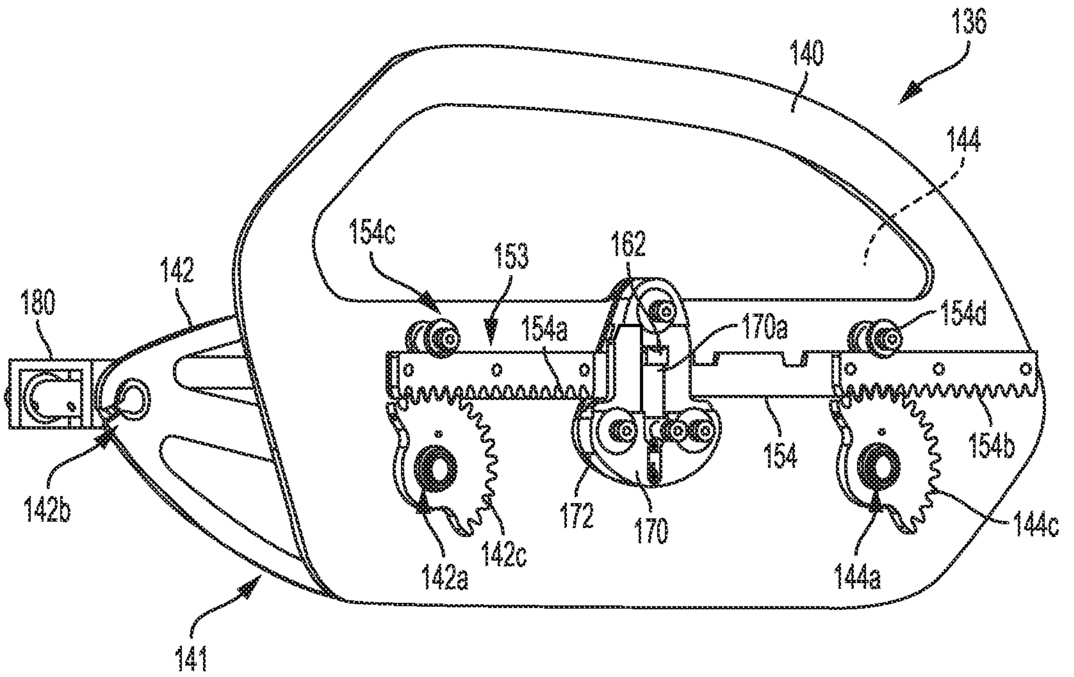
FIG. 5 is a perspective fragmentary view of another embodiment of a side rail.

Referring to FIG. 5, the numeral 136 designates another embodiment of a side rail. Side rail 136 similarly includes a pair of mounting arms 142, 144 that form a four bar mounting mechanism 141, which also includes a timing mechanism 153 that couples the two bushings of the upper pivot connections together so that they rotate in unison. Further, timing mechanism 153 may be configured to be more compact and to have fewer components to simplify the manufacturing and/or assembly process. In the illustrated embodiment, timing mechanism 153 includes a linear timing link 154 to couple the upper pivot connections together, which also may provide a structure for engagement by a locking mechanism.

Referring again to FIGS. 5-7, side rail 136 includes a side rail body 140 and a mounting assembly with two arms 142, 144 with upper and lower pivot connections 142*a*, 144*a* and 142*b*, 144*b* (FIG. 6), respectively, for movably mounting the side rail body 140 to either the deck or frame similar to the previous embodiment by way of mounting member 180. In the illustrated embodiment, the upper pivot connections 142*a*, 144*a* are also similarly coupled together by timing link 154. Link 154 also may provide engagement surfaces or structures for a locking assembly so that the position of the side rail can be locked with a single latch.

Figure 7:
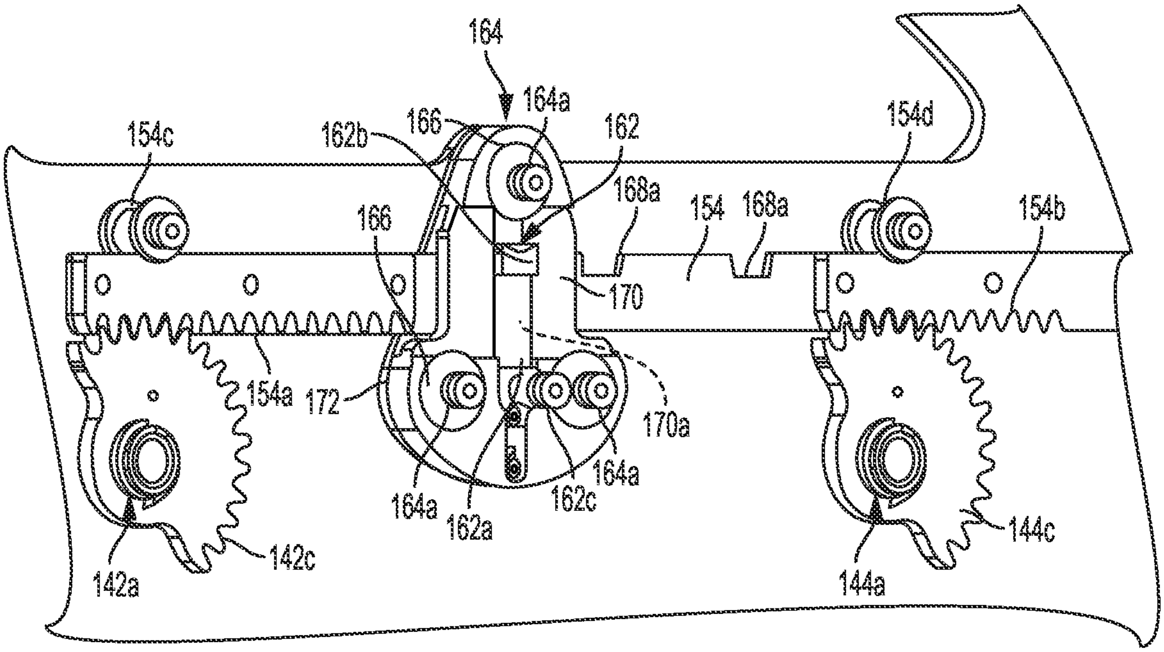
FIG. 7 is an enlarged perspective view illustrating the locking mechanism of the side rail of FIG. 5.

As best seen in FIG. 7, to synchronize the upper pivot connections, timing link 154 comprises regions of teeth or toothed portions 154*a*, 154*b* at its opposed ends for engaging gears 142*c*, 144*c* that are keyed to the respective cylindrical bushings that form the upper pivot connections. In the illustrated embodiment, gears 142*c*, 144*c* are sector gears and, therefore, only have teeth over a portion of their outer perimeters. However, it should be understood that full, circular gears may be used. In this manner, when the side rail body is raised or lowered, gears 142*c*, 144*c* will rotate, and link 154 will translate relative to pivot connections 142*a*, 144*a*.

Link 154 is guided for linear movement relative to the upper pivot connections via one or more rollers 154*c*, 154*d* (FIG. 5) mounted to side rail body 140 (e.g. to the underlying frame), which urge toothed portions 154*a*, 154*b* into engagement with the respective gears 142*c*, 144*c* (FIG. 6) mounted at pivot connections 142*a*, 144*a*. For example, rollers 154*c*, 154*d* (FIG. 5) may comprise elastomeric rollers to reduce noise and also provide energy absorbing characteristics.

In this arrangement, link 154 is located above the upper pivot connections. Similar to the previous embodiment, pivot connections 142*a*, 144*a* are formed from cylindrical bushings that extend from the upper portions of arms 142, 144 and extend through and are rotatable mounted in the frame (not shown) by way of a plate (not shown) of side rail 136. For examples of a suitable frame and optional mounting plate reference is made to the first embodiment.

Similar to the previous embodiment, timing link 154 may be used as part of the side rail locking mechanism. Referring to FIG. 7, side rail 136 comprises a latch 162 that is supported in side rail body 140 for vertical movement between an engaged position, such as shown in FIGS. 5-8 (where latch 162 engages link 154 to lock the position of link 154 and, hence, lock the side rail body 140 in position), and a non-engaged position out of engagement with link 154, so that side rail body 140 is free to be raised or lowered. To stop the side rail when lowered to its lowered position, link 154 forms a stop 154*e* that engages the bracket 164, described below, to define the lowermost, but unlocked position.

Figure 8:
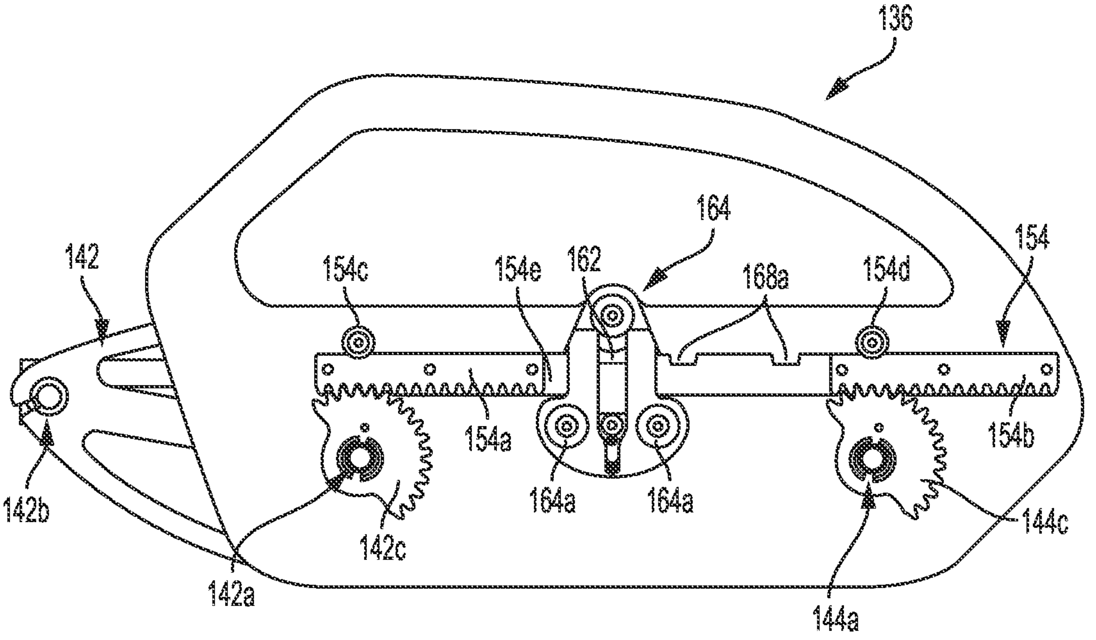
FIG. 8 is a front elevation view of the side rail of FIG. 5.
Figure 9:
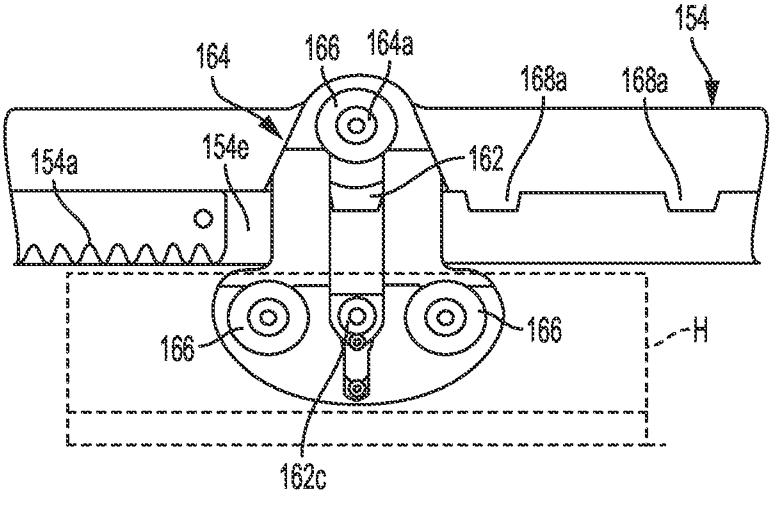
FIG. 9 is an enlarged view of the locking mechanism of FIG. 8.

As best seen in FIGS. 7-9, link 154 has a plurality of notches 168*a* formed at its upper edge, which are selectively engaged by latch 162 when latch 162 is moved to its locking position. Again, referring to FIG. 7, latch 162 comprises an elongate body 162*a* with a lug 162*b* at its upper end, which is sized to extend into and seat in the respective notches of the link 154. Latch 162 also comprises a pin 162*c*. Pin 162*c* is coupled to a handle H (shown in phantom in FIG. 9) that is pivotally mounted to bracket 164 and extends through to the outside of the side rail body, so that it is selectively operable by a caregiver or other attendant to push or pull on the pin to engage or disengage the latch from link 154. Latch 162 is slideably mounted in bracket 164, which is mounted in side rail body 140 by a plurality of fasteners 164*a*. Bracket 164 optionally comprises dampers 166 about fasteners 164*a*, for example, rubber bumpers, which absorb energy when the side rail is raised or lowered, and, moreover, if and when the side rail body 140 is subject to an impact force, for example, when the patient support apparatus is inadvertently pushed or knocked into an object.

In the illustrated embodiment, and as best seen in FIG. 7, bracket 164 comprises a generally inverted T shaped body 170 with an elongate central opening 170*a* in which latch 162 is slidably mounted, and a back plate 172, which are secured together by fasteners 164*a* and together straddle at least a portion of link 154 for engaging link 154 as described above.

Figure 6:
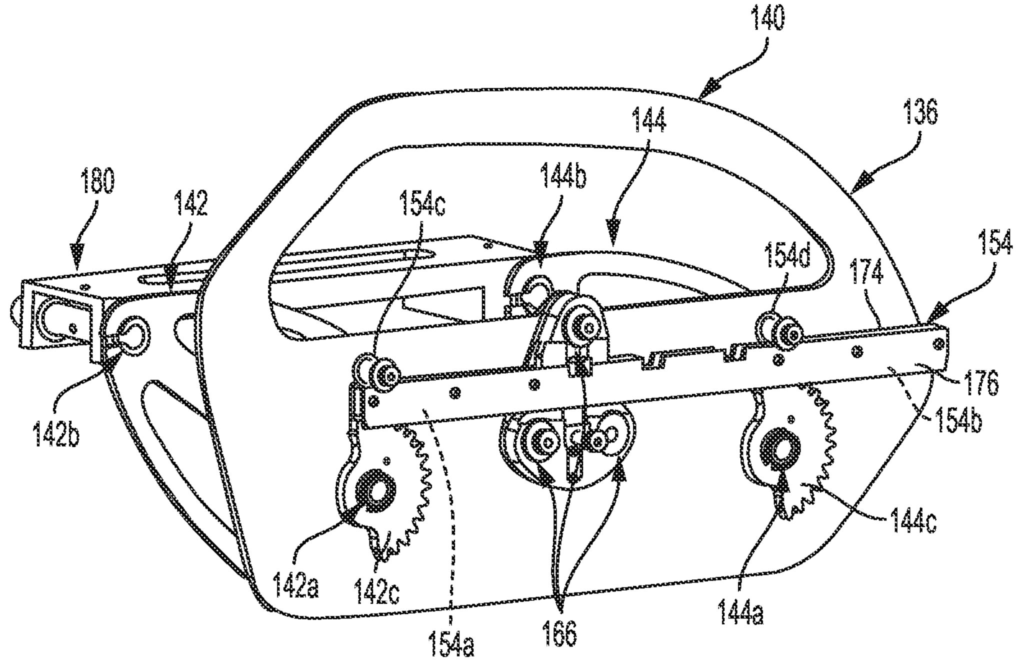
FIG. 6 is a similar view to FIG. 5 with the mounting arms and the side rail body lowered to its lowered position.

Referring to FIG. 6, link 154 may be formed from two bars or elongated plates 174 and 176, each having notches at their upper edges to form the notches for link 154 for engagement by latch 162. Further, bars 174 and 176 capture a pair of tooth racks there between, which form toothed portions 154*a*, 154*b*, to thereby form a timing link assembly. The end of the tooth rack that forms toothed portion 154*a* forms stop 154*e*, which abuts bracket 164 to thereby define the lowered position of the side rail body. Similarly, the end of the toothed rack that forms toothed portion 154*b* and faces bracket 164 on its other side may form another stop, for example, for the raised locked position or another position beyond the raised locked position. Alternately, the ends of link 154 may be solid with the toothed portions 154*a*, 154*b* formed or integrated with the solid ends. In this embodiment, the central portion of link 154 may still be formed from two plates. In which case, similar to the previous embodiment, the two plates straddle the bracket, with one of the plates extending between T-shaped body 170 and back plate 172. The stop is, therefore, formed by the end of the solid portion of the link (i.e., the transition between the solid end of the link and the bifurcated portion (the portion of the link that is formed by two plates)), which defines the lowered position when the stop abuts the bracket 164, similar to the embodiment described above. The stop that forms the other end of the side rail body's motion, e.g. the raised locked position, is formed by the end of the opposed solid end of the link. Alternately, link 154 may be solid along its full length and still extend between the T-shaped body 170 and back plate 172 along a thinner portion formed in the link (e.g. the link may have a long notch) to form the two spaced apart stops to define the range of motion of the side rail body. The ends of solid link 154 may then be formed, or otherwise provided, with threaded portions to engage the gears.

In this manner, similar to the previous embodiment, side rail 136 includes compact mounting and locking mechanisms, which can free up space for the patient support apparatus to achieve a lower height without interference with the mounting mechanism. Further, a single latch may be used to lock the position of the side rail body.

Further, by providing dampers between the locking mechanism and the side rail body, energy from an impact between the side rail body and an object may be absorbed, which may reduce the wear and tear on some of the components of the side rail.

Figure 10:
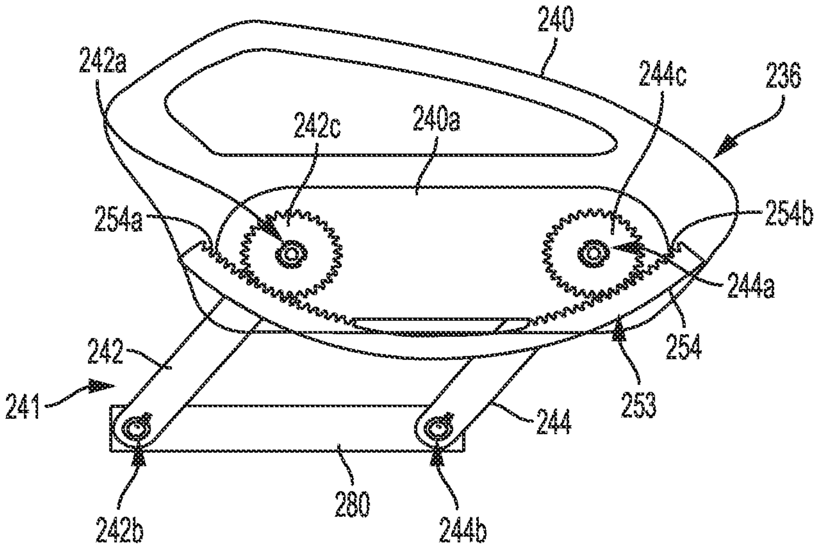
FIG. 10 is a front elevation view of another embodiment of a side rail.

Referring to FIG. 10, the numeral 236 refers to another embodiment of a side rail. Side rail 236 is similar to the previous embodiments in that it comprises a side rail body 240 (with a frame—only mounting plate 240*a* is shown) and a mounting mechanism 241. Mounting mechanism 241 comprises a pair of arms 242, 244, which are pivotally mounted at their upper ends to side rail body 240 by upper pivot connections 242*a*, 244*a* and pivotally mounted at their lower ends to mounting member 280 by lower pivot connections 242*b*, 244*b*. Side rail 236 also includes a timing mechanism 253 in the form of a timing link 254, which is also coupled to upper pivot connections 242*a*, 244*a* to thereby form a four bar linkage assembly.

In the illustrated embodiment, link 254 comprises a curve timing link with curve toothed portions 254*a*, 254*b* at its opposed ends. Mounted to upper pivot connections 242*a*, 244*a* are gears 242*c*, 244*c*, which are mounted in a similar manner to gears 142*c*, 144*c* so that they rotate with the cylindrical bushings forming the pivot connections (and hence arms 242, 244). As such, as the side rail is raised or lowered, link 254 will translate relative to upper pivot connections 242*a*, 244*a*, but in a curved or non-linear path. Similar to link 154, link 254 may be supported by spaced rollers mounted to the side rail body on the opposed side of the link from the gears to urge link 254 into engagement with the gears mounted about the upper pivot connections.

Similarly, link 254 may provide engagement surfaces for engagement by a locking mechanism similar to the locking mechanisms described in reference to the previous embodiments. Further, the locking mechanism may incorporate dampers between it and the side rail body to absorb energy, for example, when the side rail is raised or lowered, or is impacted by a force. In addition, a more compact arrangement can be realized with the curve arrangement of the link 254.

Figure 11:
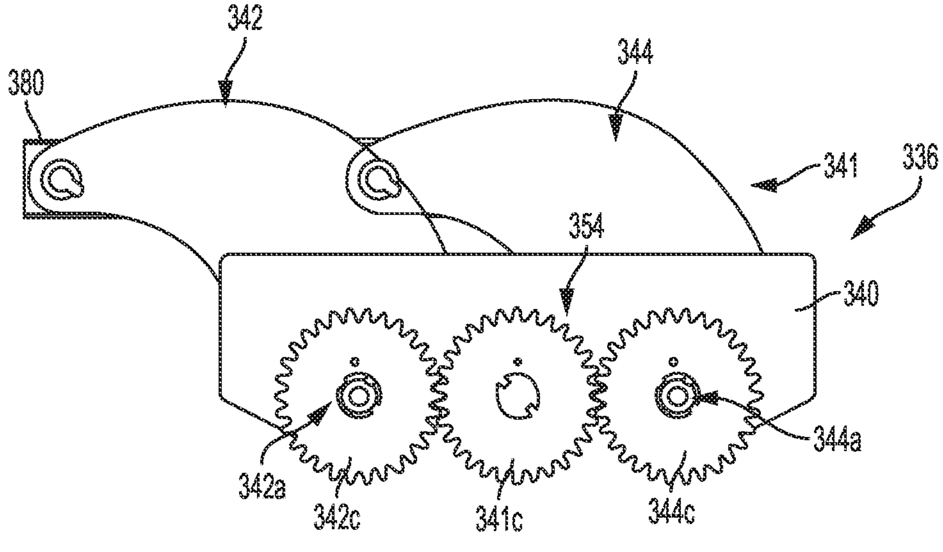
FIG. 11 is a front elevation view of another embodiment of a side rail.

Referring to FIG. 11, another embodiment of a side rail mounting mechanism 341 is illustrated. Similar to the previous embodiments, mounting mechanism 341 comprises a pair of arms 342, 344, which are pivotally mounted at one end by a pair of lower pivot connections to a mounting member 380 and pivotally mounted by upper pivot connections 342*a*, 344*a* to the frame 340 of a side rail body (not shown) of side rail 336. Also, similar to the mounting mechanism of side rail 236, mounting mechanism 341 comprises gears 342*c*, 344*c* mounted to the rotating bushings of the upper pivot connections 342*a*, 344*a* so they rotate when the side rail body is raised or lowered.

In the illustrated embodiment, side rail 336 comprises a timing link 354 in the form of a center gear 341*c*, which is mounted to frame 340 between gears 342*a* and 344*c*. Center gear 341*c* engages both gears 342*c*, 344*c* to thereby provide a circular timing link between the upper pivot connections. The locking mechanism, which may be similar to the previously described locking mechanisms, may engage the center gear to again allow the use of a single locking mechanism to lock both arms. For example, the singe locking mechanism may comprise a pivotal latch with teeth for selectively engaging a first group of teeth that correspond with the raised locked position, and a second group of teeth that correspond with an intermediate locked position. Depending on how large the center gear is, the groups of teeth may share some teeth. Further, fewer or additional locked positions may be provided.

As is in the case of the previous embodiments, one or more dampers may be provided between various parts of the side rail such as (1) between the arms and the side rail body, (2) between the locking mechanism, (3) between the arms and the frame (or deck) of the patient support apparatus, to absorb energy for example due to an impact, or when the side rail is lowered or raised.

Figure 12:
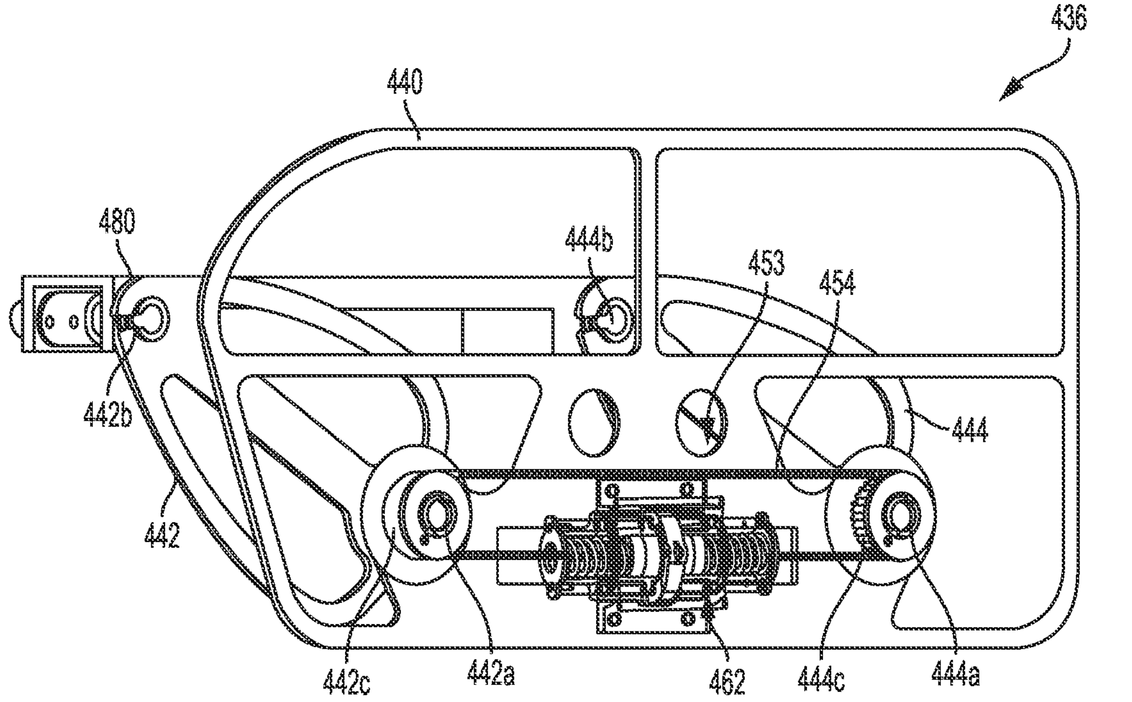
FIG. 12 is a perspective elevation view of another embodiment of a side rail illustrating another embodiment of a locking mechanism, which is shown in transparency.
Figure 13:
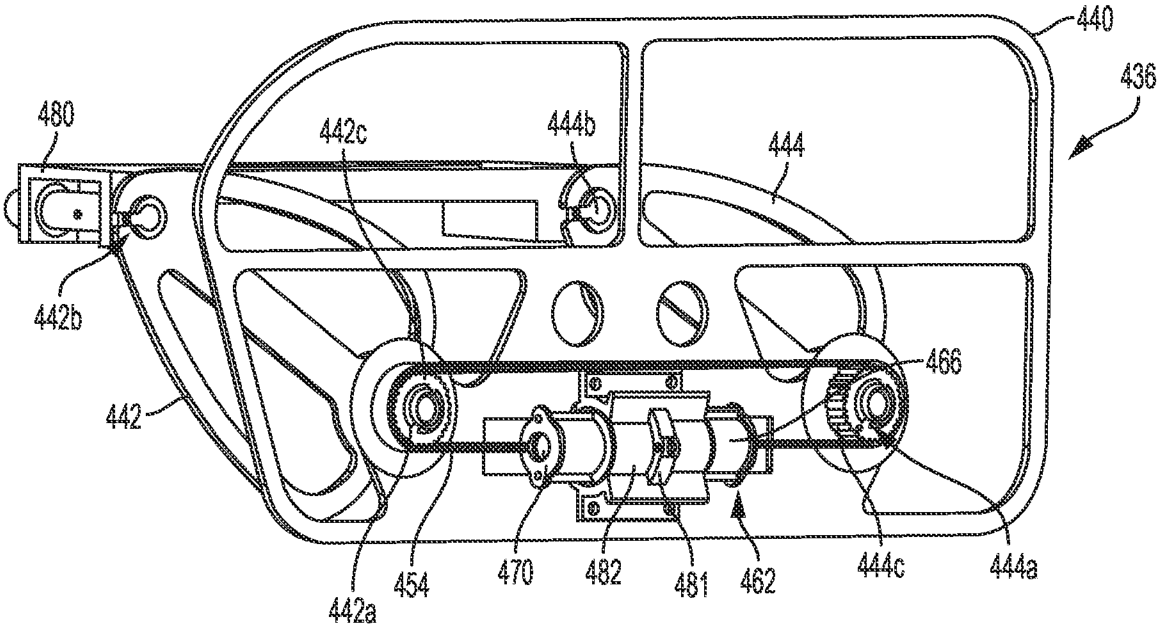
FIG. 13 is a similar view to FIG. 12, with the locking mechanism not shown in transparency.

Referring to FIGS. 12-13, the numeral 436 generally designates another embodiment of a side rail. Similar to the previous embodiments, side rail 436 comprises a frame 440, which forms part of the side rail body, and a pair of mounting arms 442, 444. Arms 442, 444 are pivotally mounted by upper pivot connections 442*a*, 444*a* to frame 440 and are pivotally mounted by lower pivot connections

442*b*, 444*b* to a mounting member 480, which mounts the side rail 436 to the frame or deck of a patient support apparatus, such as apparatus 10. In the illustrated embodiment, upper pivot connections 442*a*, 444*a* are coupled together by a timing mechanism 453 with the timing link formed by belt or chain 454. Belt 454 extends around gears 442*c*, 444*c*, which are, like in the previous embodiments, mounted and keyed to the rotating bushings forming upper pivot connections 442*a*, 444*a*.

Figure 14:
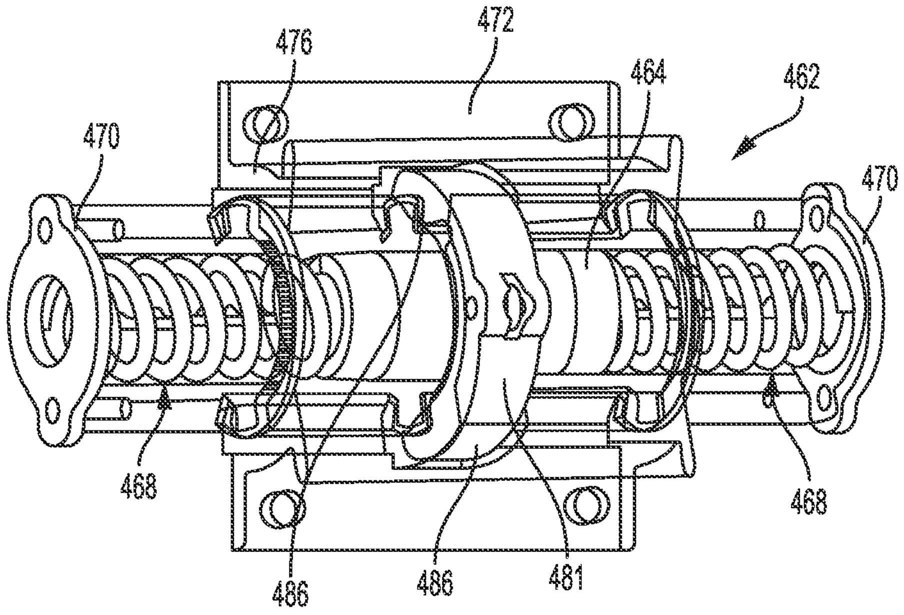
FIG. 14 is an enlarged perspective view of the locking mechanism of the side rail of FIG. 12.
Figure 15:
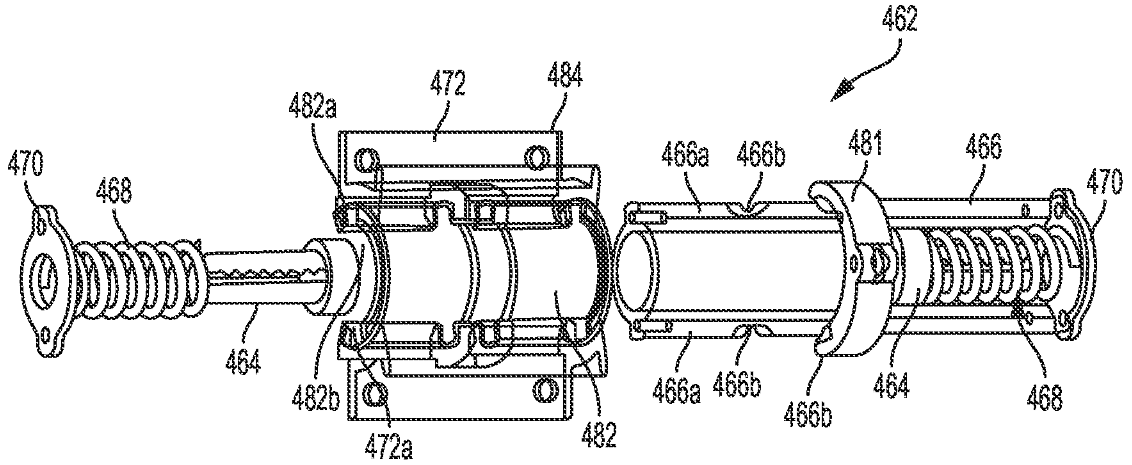
FIG. 15 is an enlarged exploded perspective view of the locking mechanism.

To lock the position of side rail 436, side rail 436 comprises a locking mechanism 462. As best seen in FIGS. 14 and 15, locking mechanism 462 comprises belt retainers 464 that mount about the free ends of belt 454. Retainers 464 are received within a sliding sleeve 466 and retained therein by springs 468 and retaining plates 470 that mount to the opposed ends of sleeve 466 by one or more fasteners. In the illustrated embodiment, springs 468 are coil springs that extend around the belt and are captured in the sleeve 466 between retainers 464 and retaining plates 470.

The springs, therefore, provide a biasing force at the two ends of the timing belt, which keep the belt 454 on the gears. Additionally, springs 468 may absorb energy in the event that the side rail encounters an impact force along the longitudinal axis of the belt, which is parallel to the longitudinal axis of the side rail and the patient support apparatus.

Sliding sleeve 466 is received in a bracket 472, which mounts sleeve 466 to frame 440 of the side rail body. As best seen in FIG. 15, sleeve 466 comprises a pair of opposed flanges 466*a*, which extend into longitudinal channels 472*a* formed in bracket 472 so that sleeve 466 is permitted to slide longitudinally along bracket 472 when the side rail body is raised or lowered but then selectively locked in position along the longitudinal axis of sleeve 466 to thereby lock the position of the side rail.

Referring again to FIG. 15, sleeve 466 comprises a plurality of spaced grooves 466*b* formed in flanges 466*a*. To lock the position of sleeve 466 along the longitudinal axis of sleeve 466, bracket 472 supports a latch 481, which is moved between a locking position where it is seated in one pair of the grooves 466*b* to thereby fix the position of sleeve 466 in bracket 472 and an unlocked position where latch 481 is disengaged from the sleeve.

In the illustrated embodiment, bracket 472 comprises a generally semi-annular body 482 with passageways 482*a*, 482*b* for receiving sleeve 466 and outwardly extending flanges 484, which mount the bracket to frame 440 of the side rail body. Bracket 472 also comprises open ended raised shoulders 486 extending around portions of semi-annular body 482 for receiving and holding latch 481 about sleeve 466, and further so that latch 481 is accessible exteriorly of bracket 472.

In the illustrated embodiment, latch 481 is a semi-annular ring with inwardly protecting tabs or lugs for selectively engaging the grooves 466*b* to thereby lock the position of sleeve 466 along passageways 482*a*, 482*b* to thereby lock the side rail. Latch 481 is moved between an unlocked position and a locking position (shown in FIG. 15) by rotation of latch 481 about sleeve 466 by way of a handle, with the handle mounted exteriorly of the side rail body. Optionally, the handle comprises a pair of pins that mount to the opposed sides of latch 480 so that when handle is pivoted, the pins rotate the ring to move the tabs into or out of engagement with the notches.

Furthermore, in any of the above side rails one or more springs may be used to counterbalance the weight of the side rail to reduce the force needed to raise or lower the side. In one embodiment described below, a single spring is provided that is oriented along the longitudinal axis of the side rail.

Figure 16:
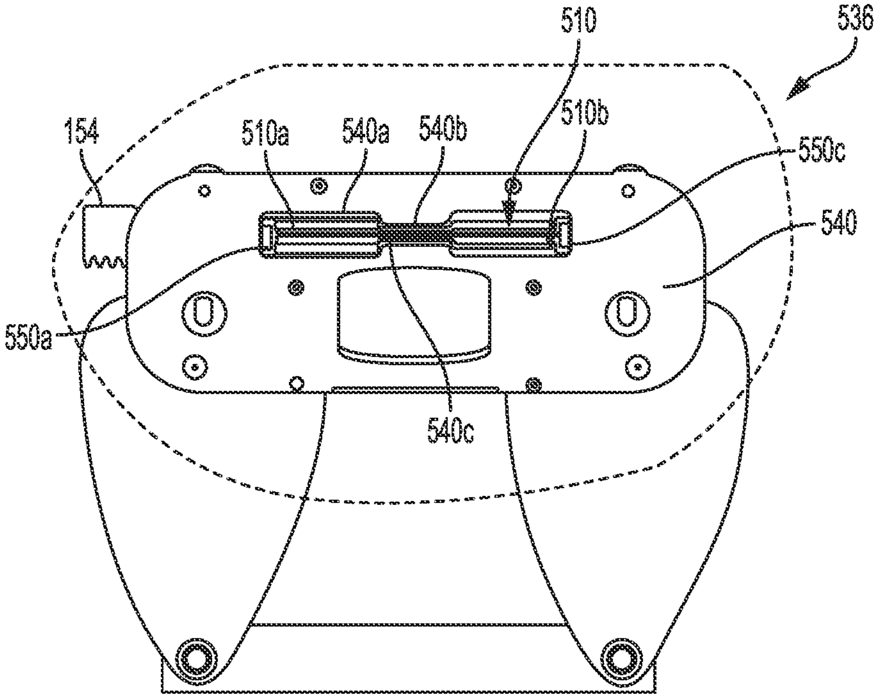
FIG. 16 is a front elevation view of another embodiment of a side rail incorporating a counterbalance spring.

Referring to FIG. 16, another embodiment of a side rail 536 is illustrated. Side rail 536 comprises a timing link 154 of the type described in reference to FIGS. 5-9. For further details of the timing link, reference is made to the second embodiment of the side rail. To counterbalance the weight of the side rail, side rail 536 comprises a spring 510. Spring 510 is mounted so that it can apply a force in a first direction and then apply a force in a second direction opposed from the first direction to provide a counterbalance to the weight of the side rail when the side rail rotates over first range of motion and then over a second range of motion different from the first range of motion.

Spring 510 is mounted in the side rail body, for example, in frame 540 and, more specifically, in or adjacent a window 540*a* formed in frame 540. Further, spring 510 is supported in a sleeve 540*b*, which is located in window 540*a*. Sleeve 540*b* may be attached to frame 540 or formed by a portion of frame 540. Sleeve 540*b* may have a closed longitudinal passageway or have an open longitudinal passageway 540*c*, which is sized to support a portion of spring 510 therein. The opposed ends 510*a* and 510*b* of spring 510 are free-floating and are not attached to frame 540, and instead encounter stops 550*a*, 550*b*, 550*c*, and 550*d*, which compress the spring as described below as side rail 536 moves, for example, between its raised and lowered positions and thereby provide a counterbalance to the weight of the side rail.

Figure 16A:
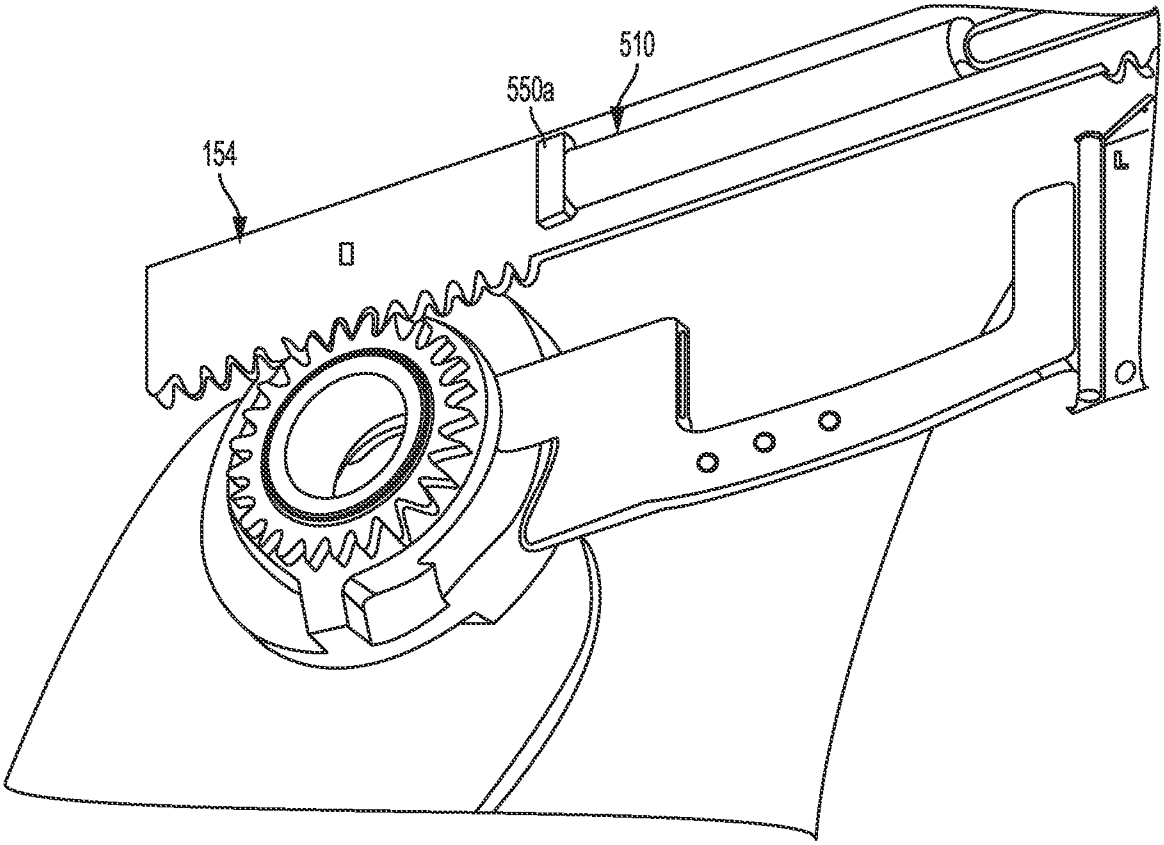
FIG. 16A is an enlarged view of one of the mounting arms and the counterbalance spring of FIG. 16 with the frame removed for clarity and for illustrating an optional timing link and bypass mechanism detailed in FIGS. 25-26.
Figure 17:
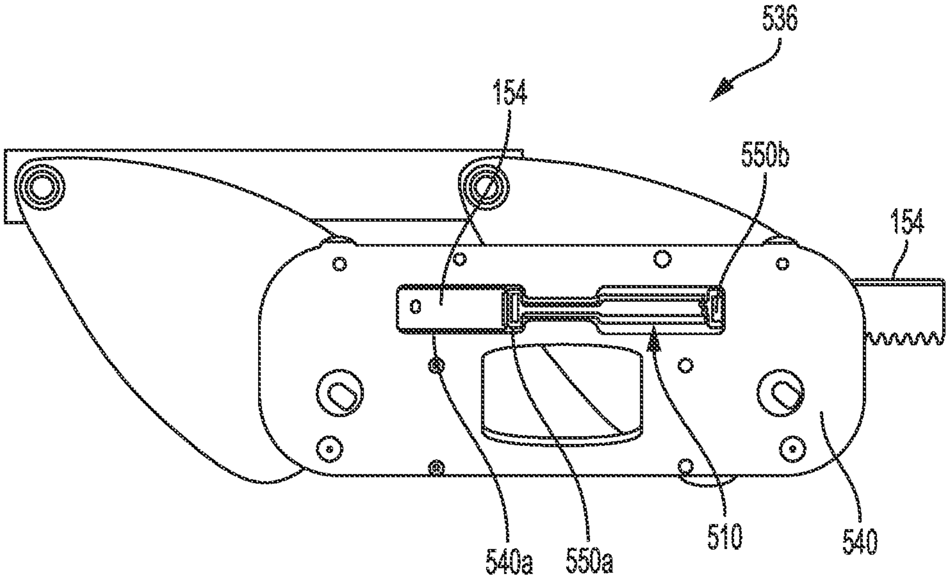
FIG. 17 is a similar view to FIG. 16 illustrating the side rail a lowered position.

Referring again to FIG. 16, when side rail 536 is in its full upright position, spring 510 is in a neutral position. In the neutral position, spring 510 may be uncompressed or compressed between stops mounted to the rack (for example, here, the two ends (550*a*, 550*c*) of a rectangular window in the rack of the timing link serve as stops) or to the frame. For further details of rack 154 reference is made to FIGS. 5-9 described above. In this manner, spring 510 may be initially compressed, though only partially compressed. As understood from FIG. 17, when side rail 536 is lowered, and timing link 154 moves to the right (as viewed in FIG. 17), spring 510 is compressed by the left end stop 550*a*, which is mounted to rack 154 (see FIG. 16A), against the right end stop 550*b*, which is mounted to frame 540 in the opposed end of window 540*a* to thereby form a stop in the right direction (as viewed in FIG. 17). In this manner, as side rail 536 is lowered, spring 510 is compressed a first direction (to the right as viewed in FIG. 17).

Figure 18:
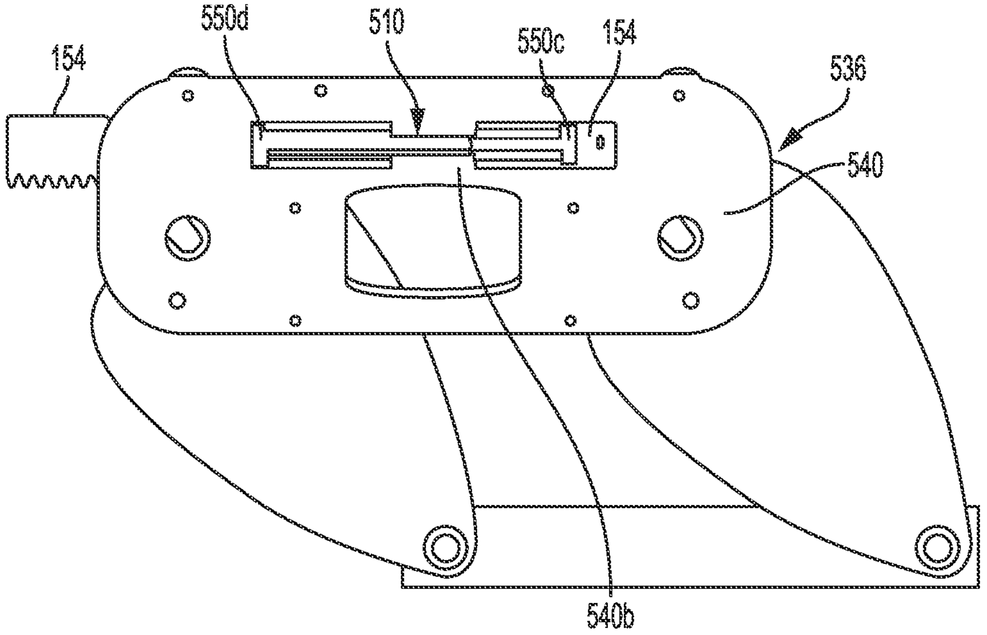
FIG. 18 is a similar view to FIG. 17 with the side rail in a raised position.

Referring now to FIG. 18, when side rail 536 is raised and timing link moves to the left (as viewed in FIG. 18), spring 510 is compressed by the right end stop 550*c* on rack 154 against the left end stop 550*d*, which is mounted to frame 540 in the opposed end of window 540*a*. In this manner, as side rail 536 is raised to a raised locked position, spring 510 will compress in a second direction opposite from the first direction, which forms a bidirectional counterbalance for side rail 536. Thus, spring 510 provides a force in opposed directions, both of which are parallel to the longitudinal axis of the side rail. Therefore, the spring can provide a counterbalance to the weight of the side rail through the full range of motion of the side rail, e.g. from its full upright position. Further, the spring can absorb shock along an axis parallel to the longitudinal axis of the side rail.

In the illustrated embodiment, the spring comprises a gas spring. However, it should be understood that other springs may be used, such as a floating coil spring or a floating damper. Furthermore, although illustrated in the context of the linear rack timing link of the second embodiment of the side rail, it should be understood that the counterbalance mechanism may be combined with any one of the above described timing links, including the curved timing link version and the intermediate gear timing link version. For details of optional locking mechanism and/or bypass mechanism reference is made below to FIGS. 23-26.

Referring to FIGS. 19-22, the numerals 653, 660 refer to another embodiment of a timing link and a locking mechanism that may be used to lock the position of a side rail. Timing mechanism 653 and locking mechanism 660, as well as the upper pivot connections 642*a* and 644*a*, are similar to those described in reference to side rail 136. Therefore, for any details not described herein, reference is made to side rail 136.

As noted above in reference the first embodiment, the side rails described herein may comprise a bypass mechanism that bypasses one or more locked positions from any direction (i.e., when raising or lowering the side rail body). For example, the bypass mechanism can bypass an intermediate locked position when moving the side rail, for example, from its lowered position to its raised locked position. In the illustrated embodiment, the numeral 690 (FIGS. 19-22) designates one embodiment of a bypass mechanism in the form of a bypass lever. Bypass lever 690 is pivotally mounted to timing link 654 (FIGS. 19-22), which as noted is illustrated in the form of a linear timing link.

Figure 19:
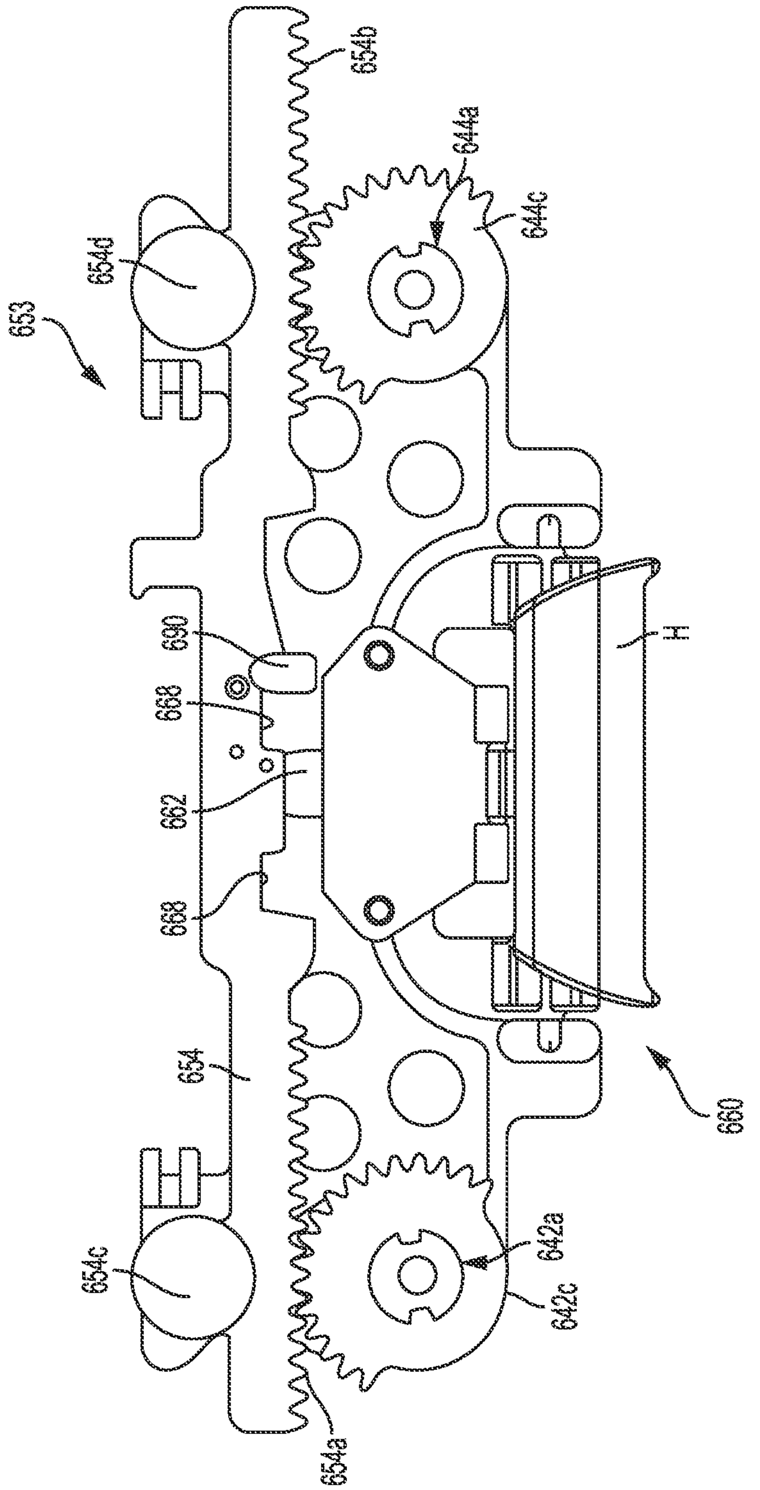
FIG. 19 is a partial fragmentary view of a side rail incorporating a bypass mechanism in the form of a bypass lever shown in a neutral position.

Similar to the embodiments described above, as shown in FIGS. 19-22, timing link 654 comprises toothed portions 654*a* and 654*b* for engaging gears 642*c*, 644*c* mounted about upper pivot connections 642*a*, 644*a* of the mounting arms that mount the side rail body to the deck or frame, for example, of a bed. Link 654 is urged into engagement with gears 642*c*, 644*c* by rollers 654*c*, 654*d* (FIG. 19). In addition, timing link 654 comprises notches 668 (FIG. 19) at its lower edge for engagement by locking mechanism 660.

In the illustrated embodiment, bypass lever 690 is pivotally mounted to link 654 so that it can move between a neutral position, a locking position, and a blocking position. In the neutral position, such as shown in FIG. 19, bypass lever 690 hangs downwardly and does not influence the latch. In its neutral position, bypass lever 690 may hang downwardly under the force of gravity or under the influence of a spring or living hinge.

Figure 20:
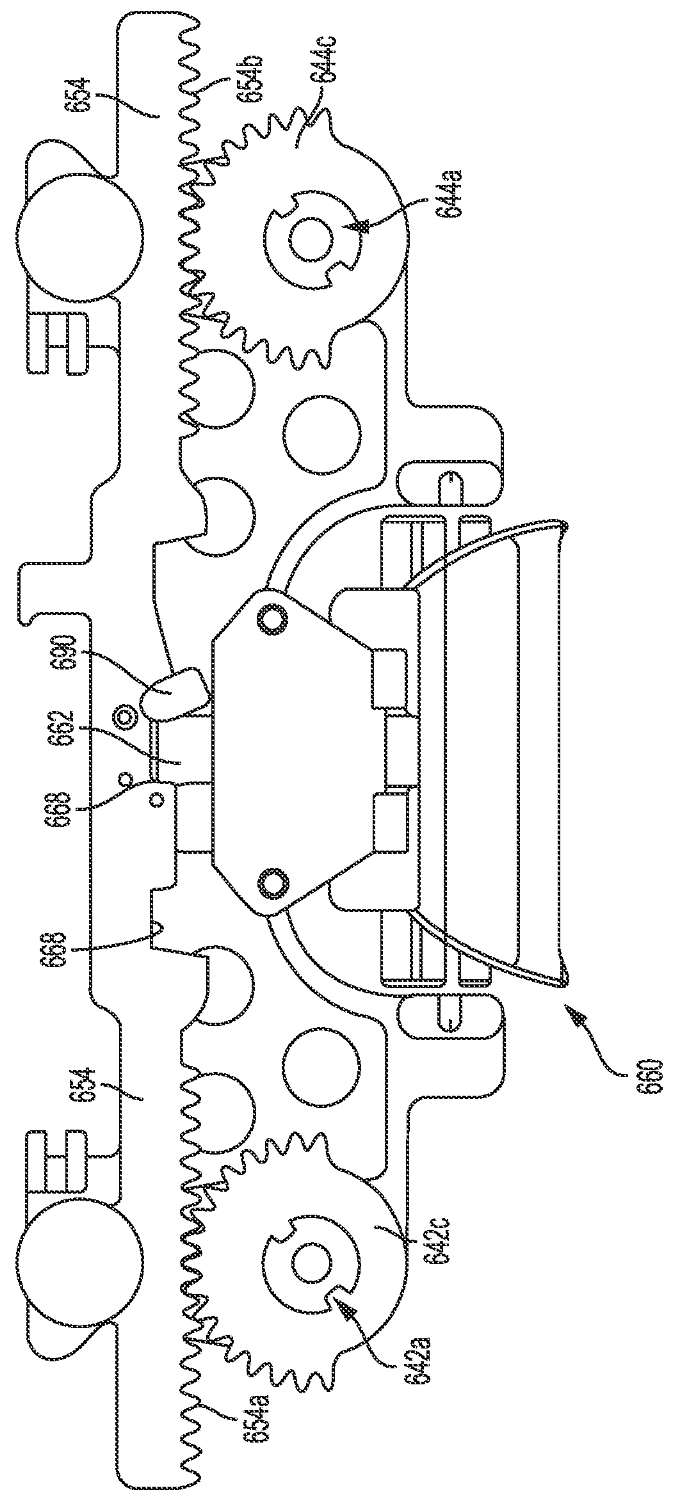
FIG. 20 is a similar view to FIG. 19 illustrating the bypass lever in a locked position.
Figure 21:
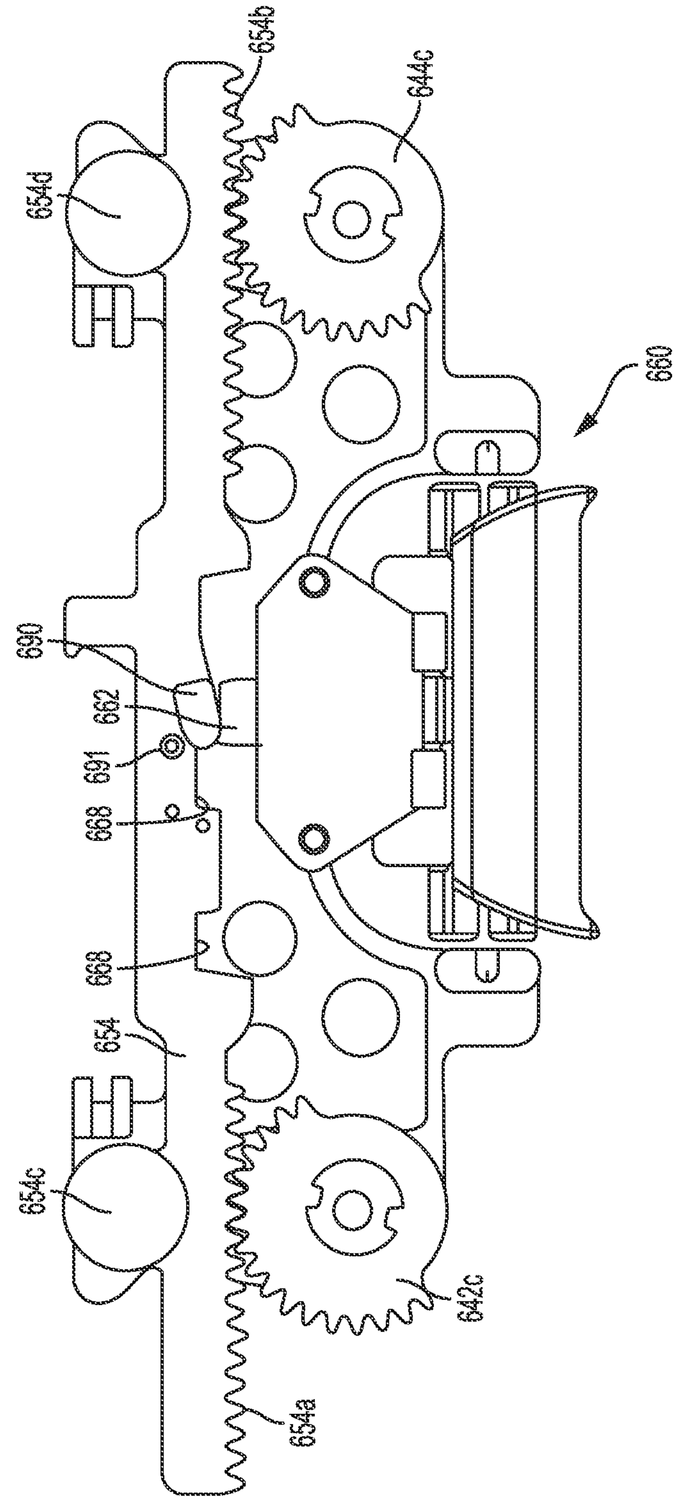
FIG. 21 is a similar view to FIG. 20 illustrating the bypass lever in a released position.

In the locking position, such as shown in FIG. 20, when rack 654 is moved to the left (as shown in FIG. 20), lever 690 is pivoted counterclockwise (as shown in FIG. 20) by latch 662 so that it allows latch 662 of locking mechanism 660 to extend into notch 668 and lock into rack 654. As rack 654 continues to move the left (as shown in FIG. 21) and latch 662 is released, for example, by handle H, latch 662 pivots bypass lever 690 further counterclockwise, which allows latch 662 to slide past lever 690.

Figure 22:
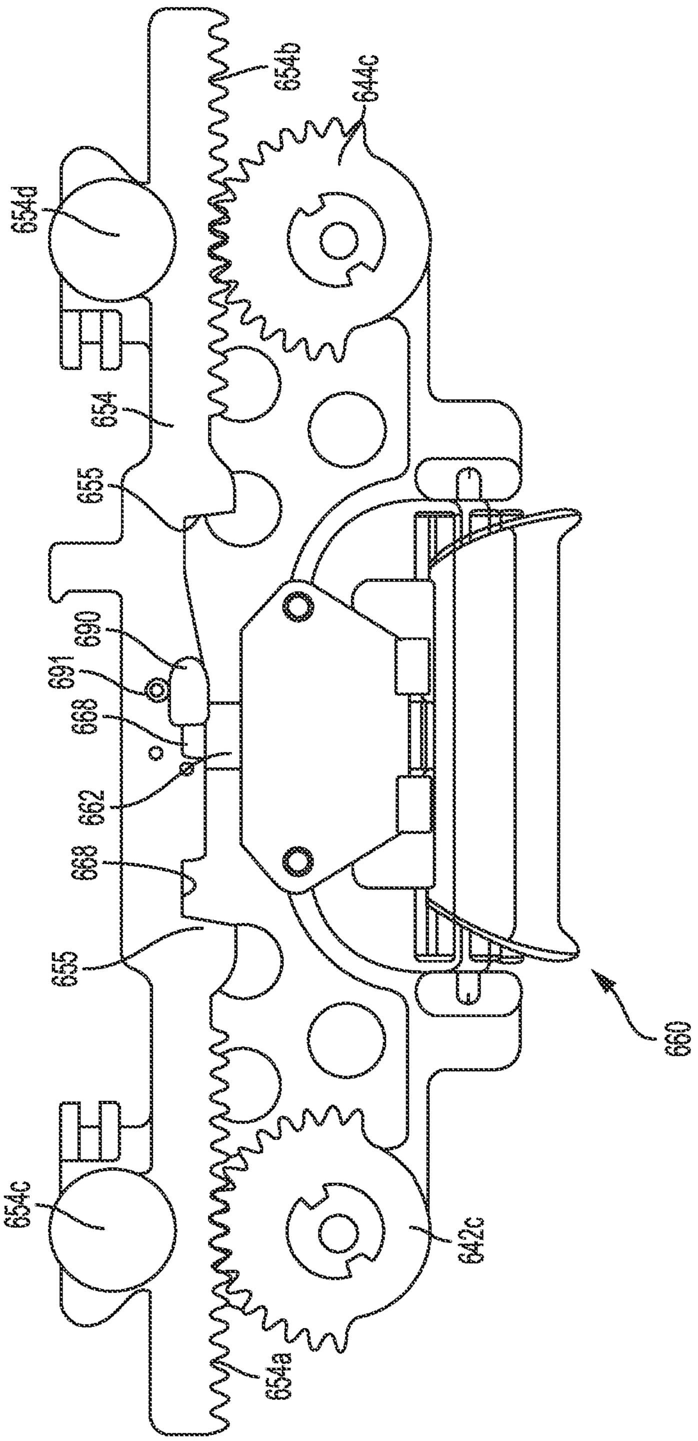
FIG. 22 is a similar view to FIG. 20 illustrating the bypass lever in a bypass position.
Figure 23A:
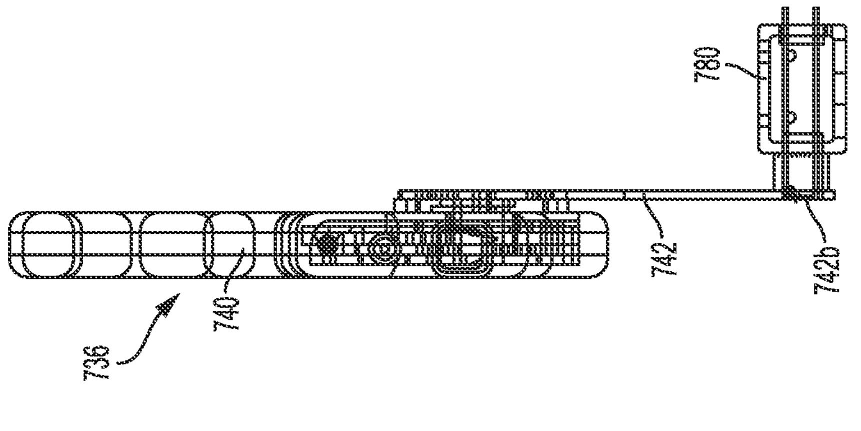
FIG. 23A is a side elevation view of the side rail of FIG. 23.
Figure 23:
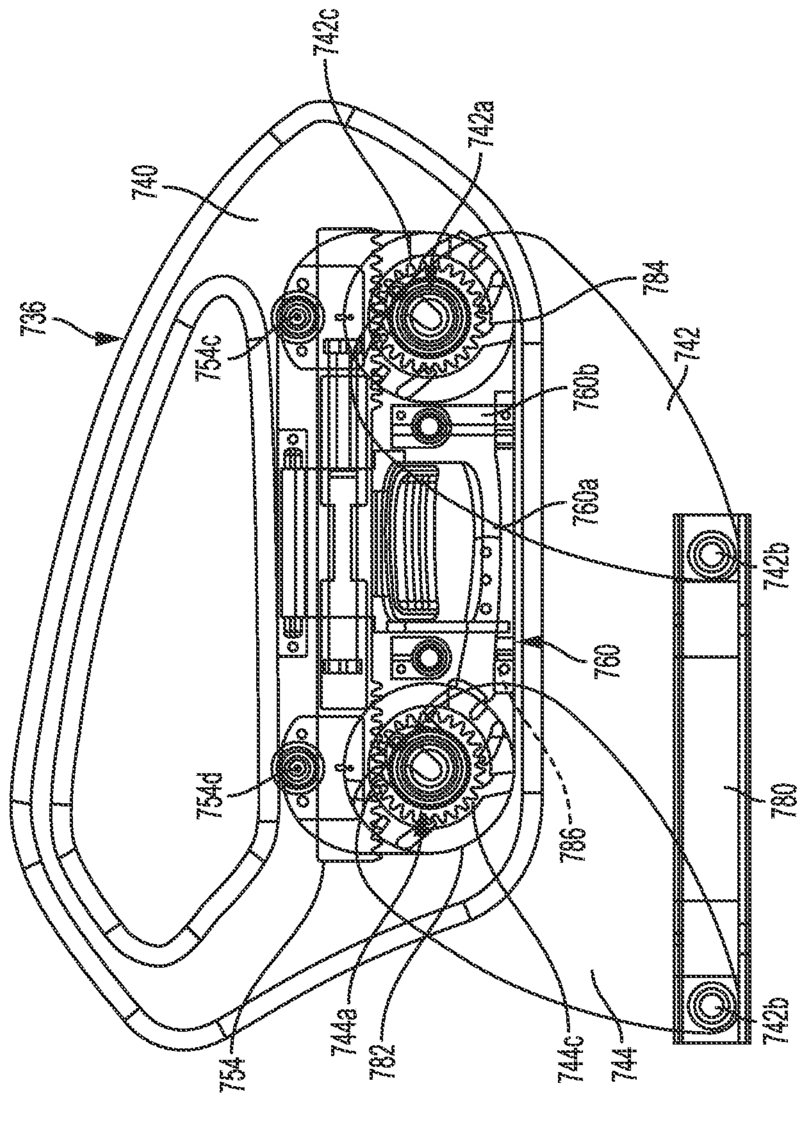
FIG. 23 is a front elevation view of another embodiment of a side rail incorporating another embodiment of a bypass mechanism.

As best understood from FIG. 22, when link 654 is moved to the far left and latch 662 has passed by lever 690, lever 690 will return to its neutral position. When rack 654 then moves to the right, lever 690 will pivot in a counter clockwise direction where it blocks the notch (668) that corresponds to the intermediate locked position. Lever 690 will, therefore, not allow latch 662 to lock in rack 654 when moving in the opposite direction. Optionally, the rotation of lever 690 may be limited by a hard stop 691 (FIGS. 21 and 22).

In this manner, bypass lever 690 allows a caregiver to move the side rail in one direction where the latch will lock the side rail in one position, such as the intermediate locked position, but will bypass the position, e.g. the intermediate locked position, when moving the side rail in another direction. As noted above, the bypass function is provided when the side rail is being raised, but can be configured to be used when the side rail is being lowered.

In the illustrated embodiment, the stop for the lowered position of the side rail body is also formed by the rack 654, which forms a link between the two gears. As best seen in FIG. 22, rack 654 includes shoulders 655, which prevent the latch from going any further to thereby define the range of motion of the side rail, e.g. the lowered position and the raised position.

According to yet another embodiment (FIGS. 23, 23A, 24, 24A, 25 and-26), a side rail 736 comprises a side rail body 740 and a pair of mounting arms 742, 744, which pivotally mount the side rail body 740 to a patient support apparatus, such as patient support apparatus 10. Similar to the previous embodiments, arms 742 and 744 comprise upper and lower pivot connections 742*a*, 744*a*, and 742*b*, 744*b*, respectively. Upper pivot connections 742*a*, 744*a* are pivotally mounted to a frame 740, which may have a similar construction to the previously described frames. Lower pivot connections 742*b*, 744*b* are pivotally mounted to a mounting member 780, which mounts the side rail to the patient support apparatus.

Side rail 736 may also comprise a timing mechanism in the form of a timing link 754 (FIG. 23) that also comprises toothed portions 754*a*, 754*b* for engaging gears 742*c*, 744*c*, which are mounted about upper pivot connections 742*a*, 744*a*, similar to the previous embodiments. Timing link 754 may also be urged into engagement with gears 742*c* and 744*c* by rollers 754*c* and 754*d*, which are mounted to frame 740 above timing link 754. For further details of the pivot connections 742*a*, 744*a*, 742*b*, 744*b*, timing link 754, rollers 754*c*, 754*d*, and gears 742*c*, 744*c*, reference is made to the previous embodiments.

In the illustrated embodiment, side rail 736 is configured to provide a way to bypass the locking mechanism so that it locks in one direction but not in the other direction. Referring to FIGS. 23, 24, 24A, 25, 25A-25C, and 26, side rail 736 comprises a locking mechanism 760 that cooperates with at least one of the upper pivot connections to lock the position of the side rail.

Referring again to FIGS. 24 and 25, latch plates 782 and 784 are mounted about upper pivot connections 742*a*, 744*a*, which are configured to provide a bypass so that the locking mechanism 760 will bypass one of the positions, such as an intermediate locked position, when the side rail is moved, for example, from the lowered position to its raised locked position similar to the previous embodiment. Although two latch plates are illustrated, only a single latch plate is used on the illustrated embodiment.

Figure 25:
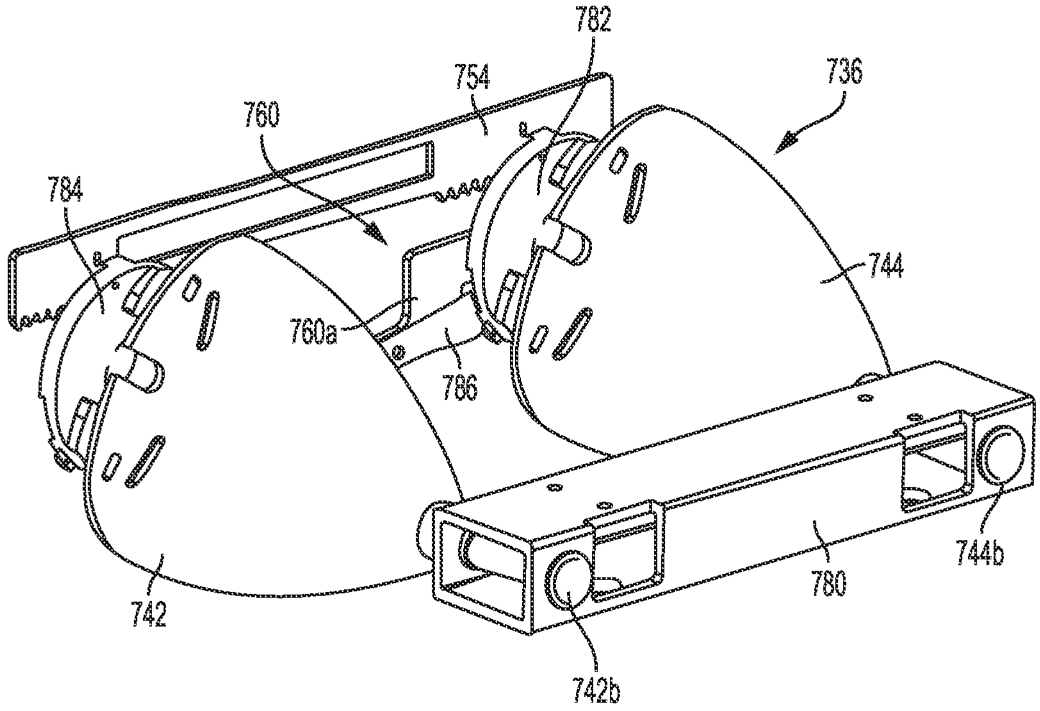
FIG. 25 is a similar view to FIG. 24 illustrating the side rail in a different position.
Figure 25A:
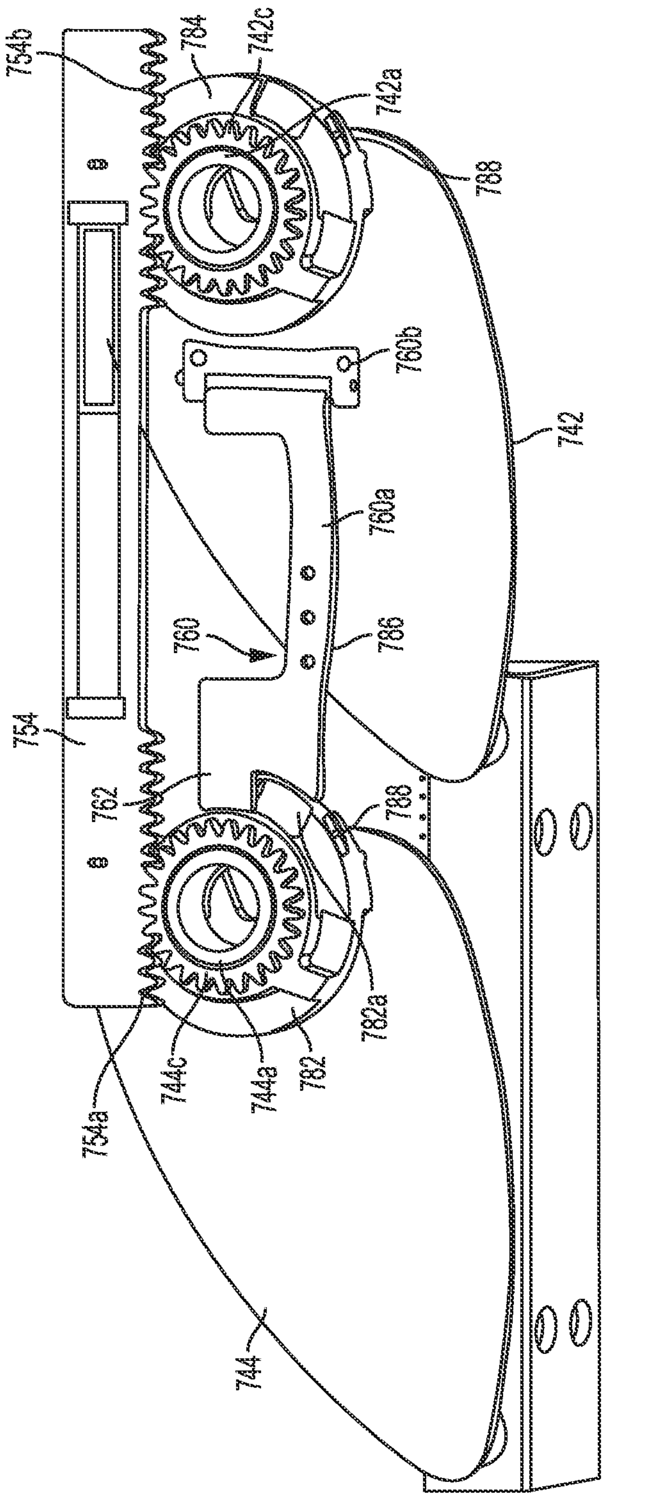
FIG. 25A is a similar view to FIG. 25 as viewed from the opposed side of the side rail illustrating the latch plate recesses and the latch bolt.
Figure 25B:
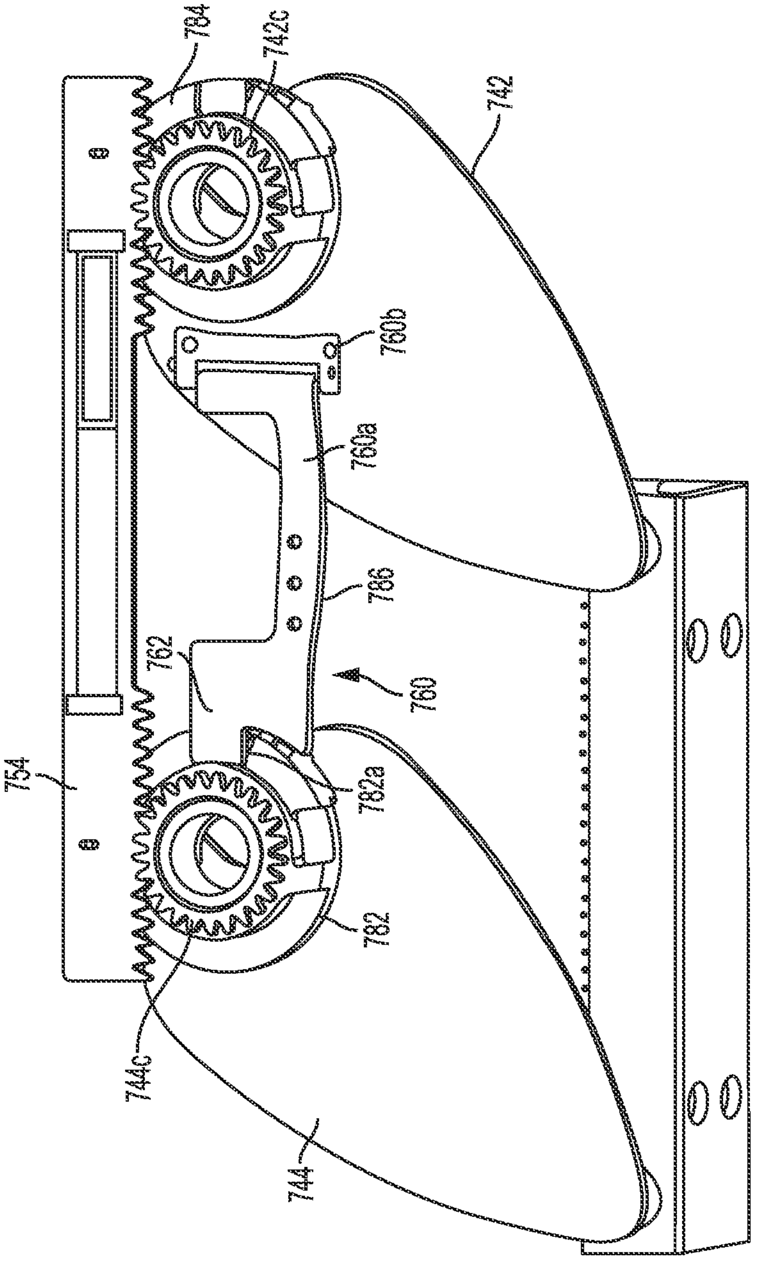
FIG. 25B is a similar view to FIG. 25A illustrating the latch bolt aligned in one of the recesses and engaged with the latch plate.
Figure 25C:
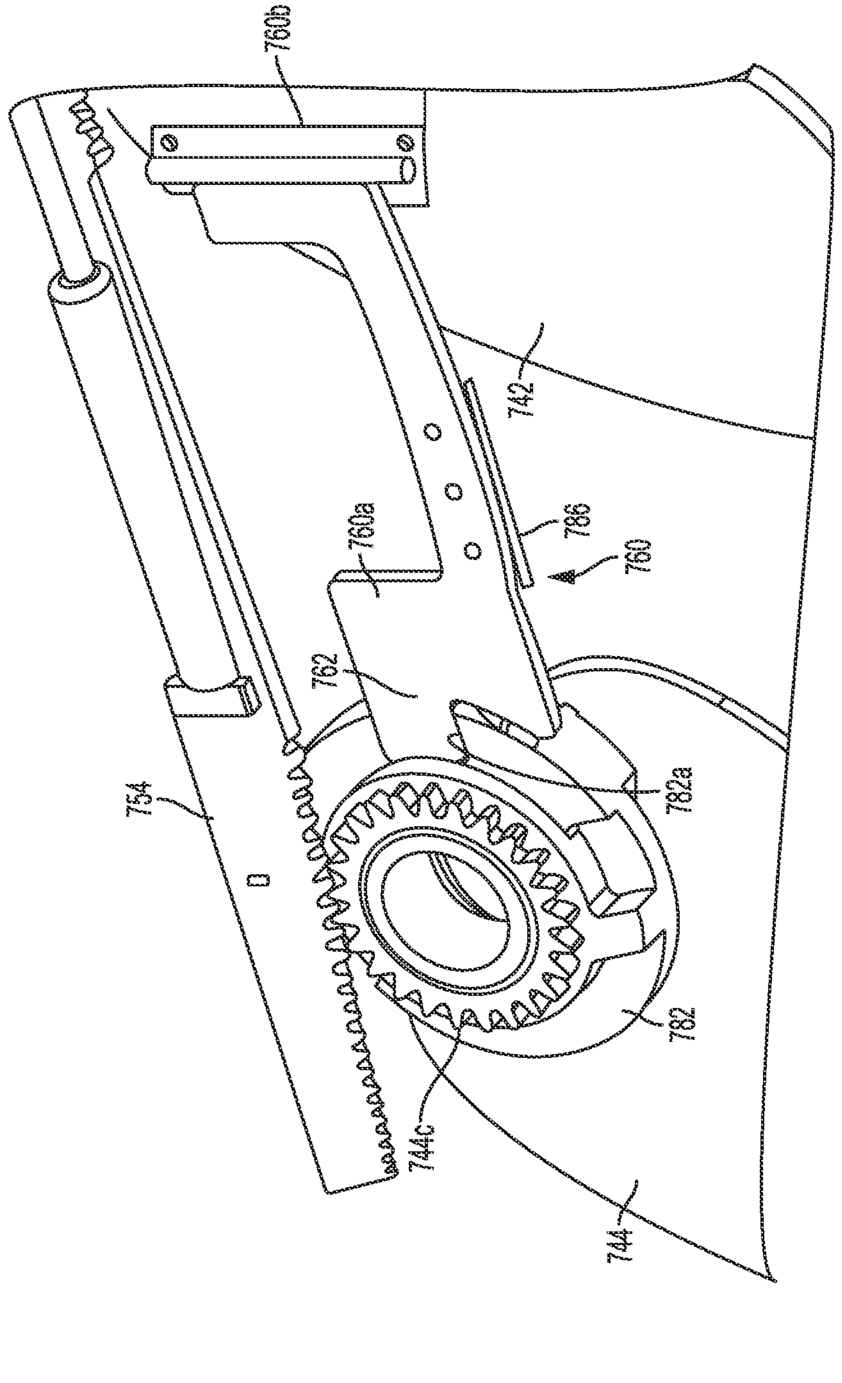
FIG. 25C is an enlarged, fragmentary perspective view of the latch bolt engaging the latch plate.

As best seen in FIGS. 25A-25C, locking mechanism 760 comprises a latch bolt 760*a* that is configured to selectively engage at least one latch plate, for example, by engaging one or more notches 782*a* provided at or in the periphery of the at least one latch plate. In the illustrated embodiment, latch bolt 760*a* comprises a U-shaped plate that is mounted to mounting arm 742 by bracket 760*b* (FIG. 25A) and includes a tab 762 that is sized to extend into and seat in the notches provided or formed on the latch plate 782. The term “latch bolt” is used broadly and is not limited to a cylindrical body, and instead is intended to cover a body with other shapes, including rectangular.

Although described in reference to a side rail with a timing link that also serves as part of the locking mechanism, it should be understood that the bypass mechanism 787 described herein may be applied to other locking mechanisms where a latch bolt rotates or translates relative to a latch plate, and where the latch bolt (e.g. 760*a*) is allowed to snap into a recess in the latch plate (e.g. 782) once they are lined up.

Referring again to FIG. 24, in the illustrated embodiment, side rail 736 comprises a spring 786 that cooperates with a cam mechanism 787 to bypass one of the locked positions, such as an intermediate locked position. One of these elements may be attached to the latch plate 782 and the other attached to the latch bolt (760*a*); however, in the illustrated embodiment the bypass mechanism 787 is attached to the latch plate 782, and the spring 786 is attached to the latch bolt (760*a*), but this can be reversed if desired. Further, as noted, the bypass mechanism can bypass locked positions when raising or lowering the side rail.

As noted in the illustrated embodiment, latch plate 782 comprises the bypass mechanism 787, which is formed by a bypass cam member 788. Cam member 788 comprises two opposed ramps 788*a* and 788*b* (FIGS. 24, 24A) that contact the spring 786 at different times. In the illustrated embodiment, spring 786 comprises a leaf spring formed from a metal plate that is mounted at one end to latch bolt 760*a* and its other free end adjacent the free end of the latch bolt. Cam member 788 may comprise a diamond-shaped body, which forms the two ramp surfaces. Cam member 788 may be formed on latch plate 782 or may be mounted to latch plate 782.

Figure 24:
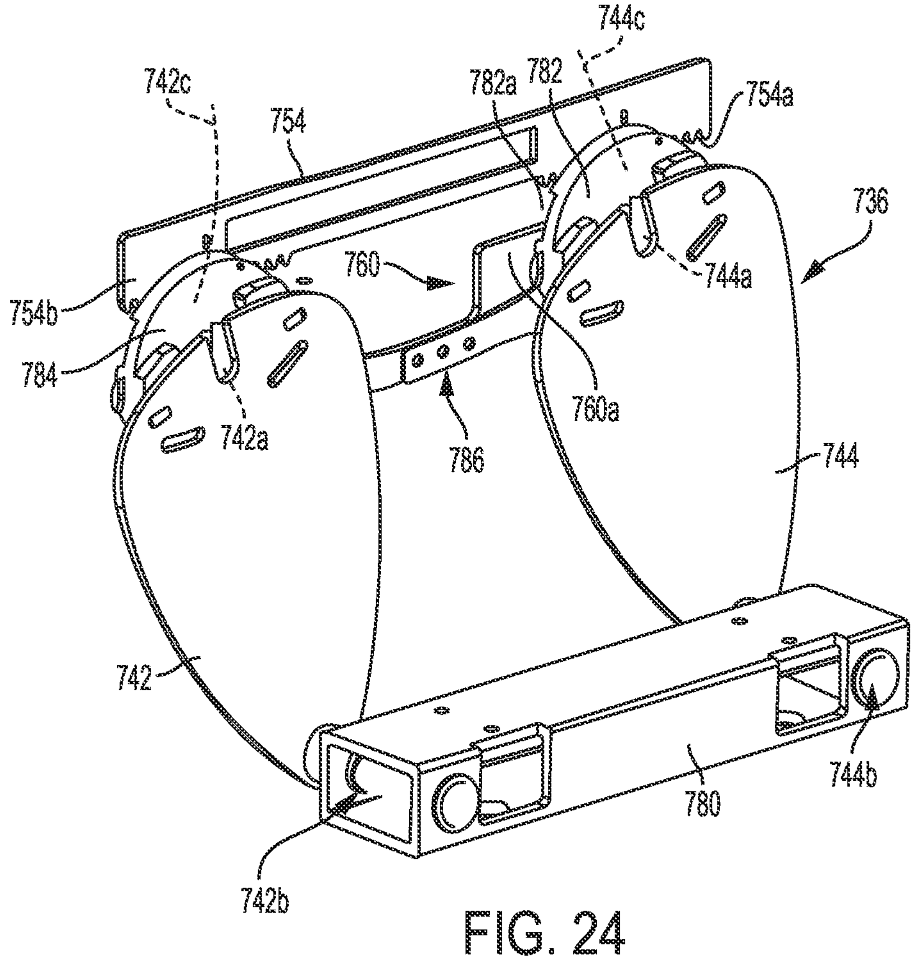
FIG. 24 is a perspective view of the side rail of FIG. 23 illustrating the bypass mechanism.
Figure 24A:
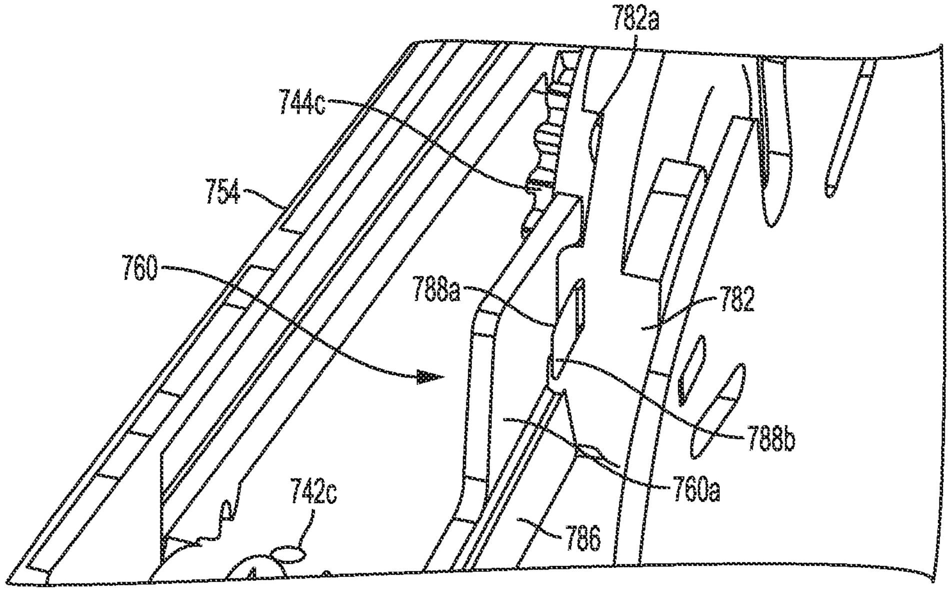
FIG. 24A is an enlarged perspective view of the latch bolt, the latch plate, and the bypass mechanism cam of FIG. 24 as viewed from above the mounting arm.
Figure 26:
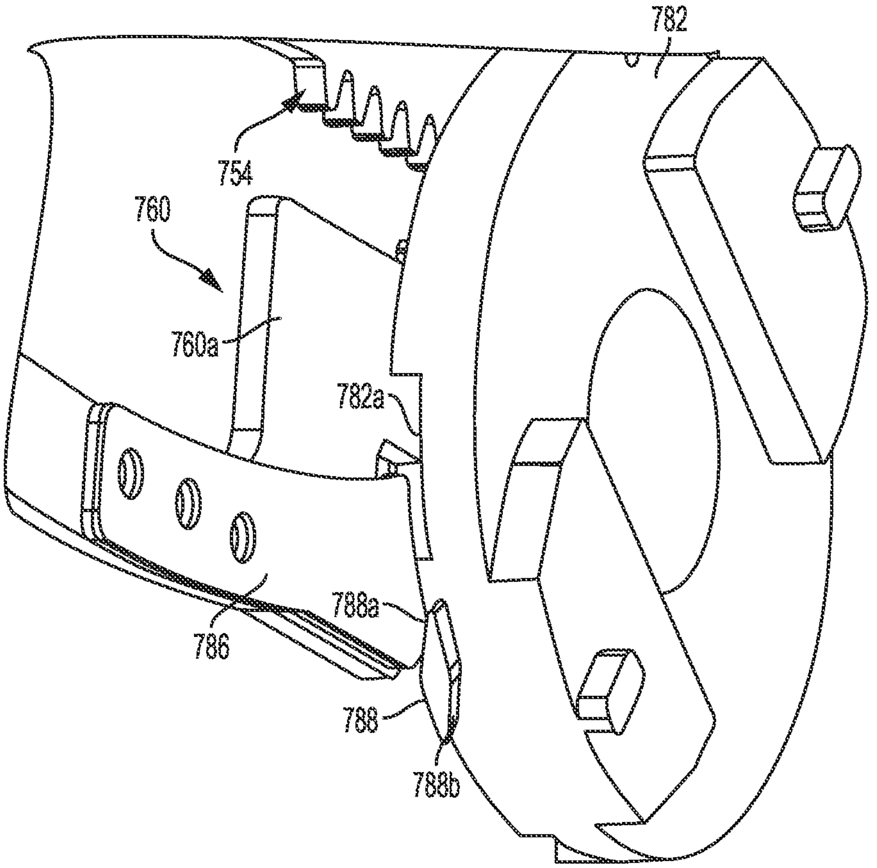
FIG. 26 is an enlarged perspective view of the latch bolt, the latch plate, the leaf spring, and the bypass mechanism of FIG. 25 with the mounting arm removed for clarity.

When the latch plate 782 rotates or translates in one direction (for example in a clockwise direction as viewed in FIG. 26), one ramp profile 788*a* urges the free end of the leaf spring (786) toward the latch bolt 760*a*. FIG. 26 illustrates the bypass cam member about to contact the leaf spring, which pushes it into the latch bolt (760*a*), forcing the latch bolt (760*a*) away from the latch plate recess (782*a*) and bypassing the locked position. When the latch plate (782) rotates or translates in the opposite direction (e.g. in the counter clockwise direction as viewed in FIG. 24), cam member 788 separates the free end of leaf spring 786 from latch bolt 760*a*, with the opposing ramp 788*b* profile urging the free end of the leaf spring 786 away from the latch bolt 760*a* so that the leaf spring pulls on the latch bolt 760*a* (by virtue of its connection at its other end to the latch bolt). FIG. 24A illustrates the bypass cam member about to contact the leaf spring and pull it away from the latch bolt (760*a*), allowing the latch bolt 760*a* to snap into the latch plate recess (782*a*) and lock the side rail in place.

Thus, the leaf spring is configured so that when it is pushed away from the latch plate 782 by ramp 788*a*, leaf spring 786 pushes the latch bolt 760*a* with it, thus allowing the bolt to bypass the latch plate recess (FIGS. 25, 25A, and 26). However, when the leaf spring 786 is pushed toward the latch plate 782 by ramp 788*b*, it is sufficiently flexible so that it can separate from the latch bolt and allow the bolt to snap into the latch plate recess (FIGS. 24A, 25B, and 25C).

In other words, the leaf spring under the influence of the cam member toggles between two positions—one where it is pushes the latch bolt away from the latch plate and another position where is pulls the latch bolt into engagement with the latch plate.

Figure 27:
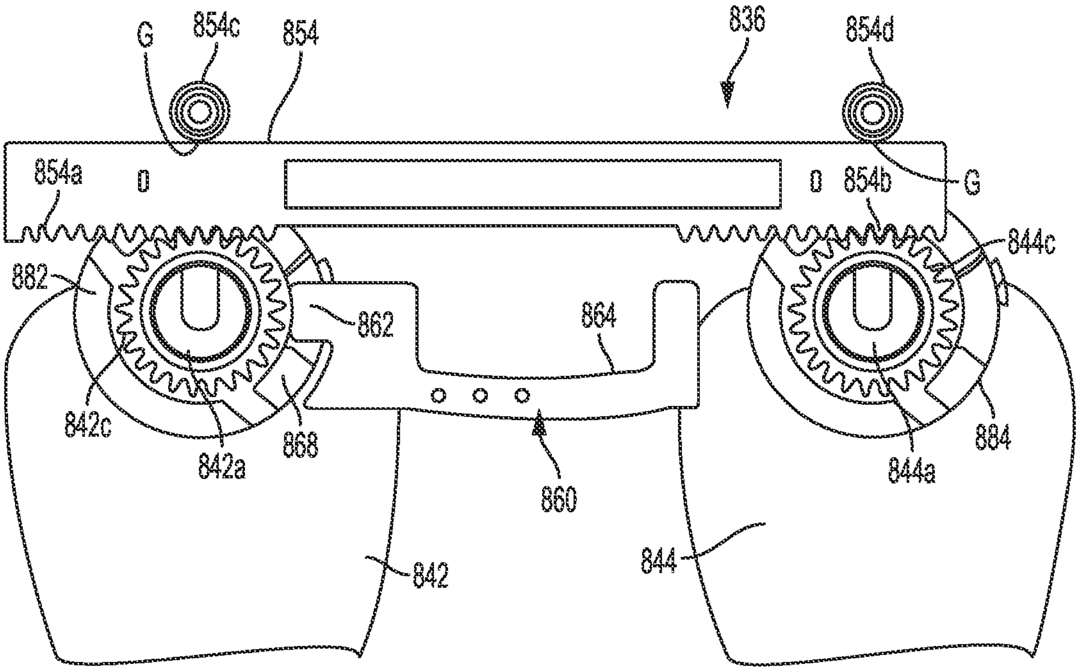
FIG. 27 is a fragmentary view of another embodiment of a timing mechanism of a side rail illustrating the side rail in a non-locked position.
Figure 28:
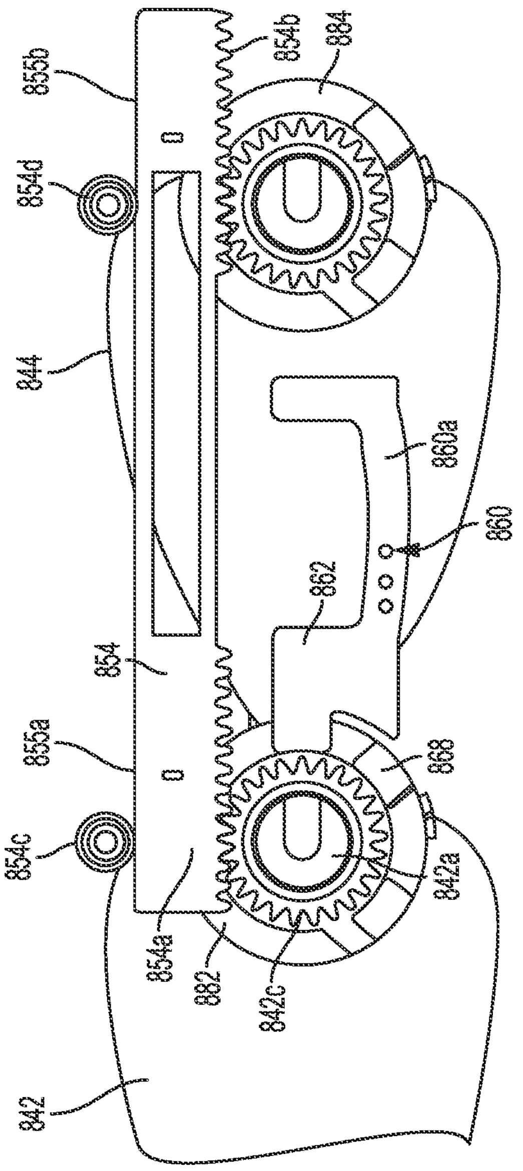
FIG. 28 is a similar view to FIG. 27 with the side rail lowered in a toggle position.

Referring to FIGS. 27 and 28, the numeral 836 generally refers to another embodiment of a side rail, which is suitable for mounting to patient support apparatus 10. As will be more full described below, side rail 836 also comprises a pair of mounting arms 842, 844 that form a four bar mounting mechanism with a timing link 854 (FIGS. 27 and 28). In addition, as will be more fully described below, the fit between the timing link 854 and the gears 842*c*, 844*c*, which are mounted about the upper pivot connections 842*a*, 844*a* of mounting arms 842, 844, is increased to provide a tight fit over at least one range of motion and is decreased over the other range of motion to reduce the friction between the timing link and the gears.

In the illustrated embodiment, locking mechanism 860 includes a latch bolt 860*a* and at least one latch plate 882 or 884 that is mounted about upper pivot connection 842*a* or 844*b*. For ease of description reference will be made to latch bolt 860*a* engaging latch plate 882 only. In the illustrated embodiment, latch bolt 860*a* comprises a generally U-shaped plate with a tab 862 for engaging one or more notches 868 formed in latch plate 882. The motion of the latch bolt between its locked position and its unlocked position is controlled by a handle (not shown), which is mounted to the exterior surface of the side rail bod. The handle pivots the latch bolt 860 to engage or disengage from latch plate 882. In this manner, when latch bolt 860*a* is pivoted toward or away from the plane defined by the latch plate (882), latch bolt tab 862 will engage or disengage from latch plate 882. Because upper pivot connections 842*a*, 844*a* are drivingly coupled together by timing link 854, only a single latch is needed. Though it should be understood, as in the case with any of the above embodiments, that a second latch may be provided.

When in the upright position, such as shown in FIG. 27, the engagement between the timing link toothed portions 854*a*, 854*b* and gears 842*c*, 844*c* has less of an impact on the play or stability of the side rail and a clearance G may be provided between rollers 854*c*, 854*d*, which reduces the friction between the timing link and rollers 854*c*, 854*d* and allows easier motion. However, when side rail 836 is lowered in a toggle position (e.g. as shown in FIG. 28), the engagement between the timing link toothed portions 854*a*, 854*b* and gears 842*c*, 844*c* has a greater impact on the play or stability of the side rail. At the toggle position, if the mounting arms 842, 844 are not synchronized because of the play in the timing link, the side rail mounting mechanism can bind if the force to raise or lower it is applied in certain directions. A tight engagement between the timing link and the gears at the toggle position will, therefore, significantly reduce the play in the side rail mounting mechanism and prevent this undesired situation. However, the tight engagement is not desirable in the other positions of the side rail. Hence, in the illustrated embodiment, the play is reduced, if not eliminated, in the toggle position by selectively varying the clearance between the timing link and the gears so that link 854 has a tight fit with gears 842*c*, 844*c* only where needed.

In the illustrated embodiment, this varying clearance is achieved by varying the profile of link 854. For example, link 854 has a longitudinal axis and a height that varies along the longitudinal axis to form cam profiles or ramps 855*a* and 855*b* on link 854 that correspond to the toggled position to reduce the clearance between link 854 and rollers 854*c*, 854*d* to increase stability. The cam profiles or ramps may alternatively be provided on rollers 854*c*, 854*d* or on gears 842*a*, 844*a*, for example. Optionally, the roller can also comprise a flexible material, such as an elastomer, which forms a region of relief to reduce the pressure on the link over a selected range of motion that coincides with where the fit between the link and gears can be relaxed. Alternately, the elastomer may form regions that increase the pressure on the link over a selected range of motion that coincides with where the fit between the link and gears needs to be tightened. For example, the flexible material can be applied at the outermost layer of the roller or it can be used as a middle layer between an outermost layer and the axle of the roller.

Figure 29:
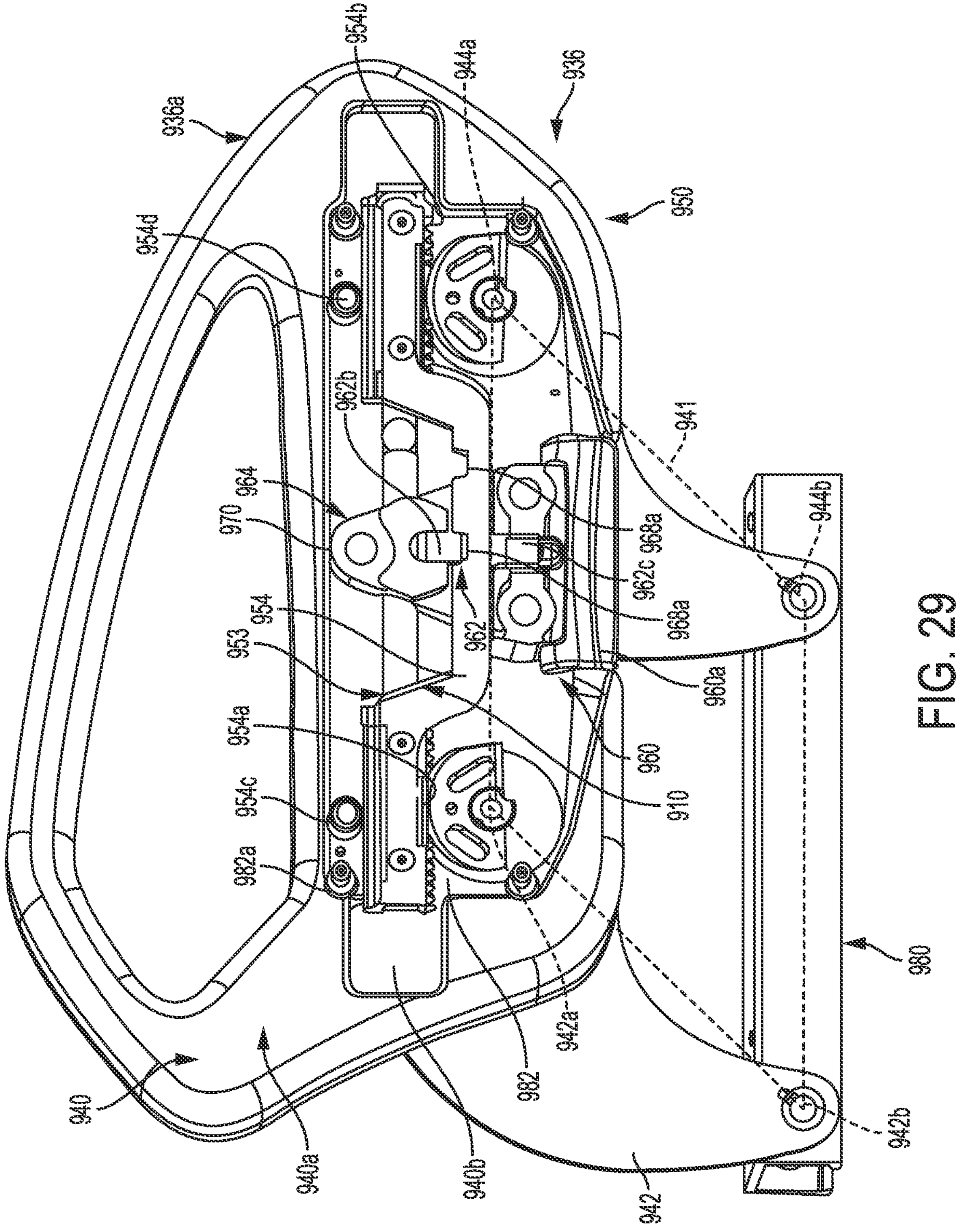
FIG. 29 is a fragmentary perspective view of another embodiment of a side rail as viewed from the inside of the patient support apparatus shown in a locked position.
Figure 30:
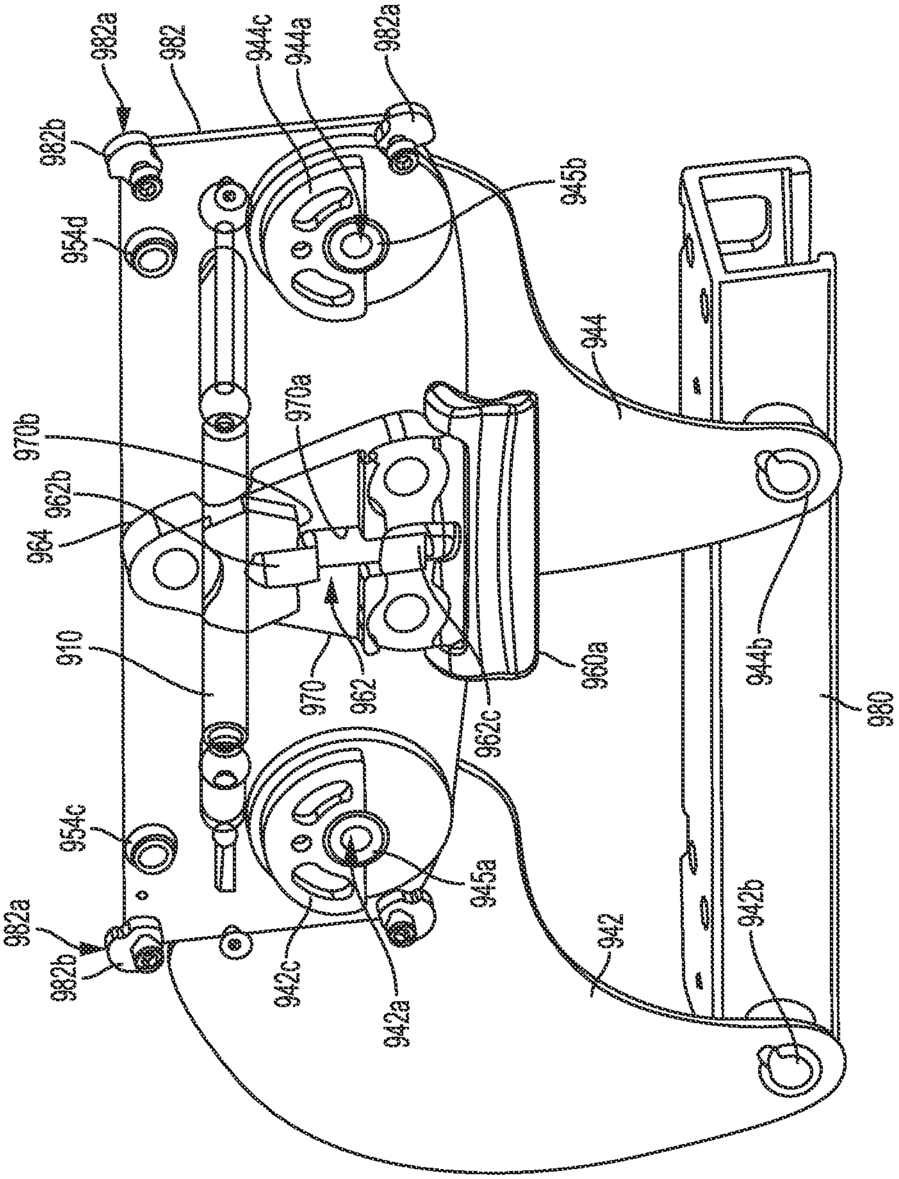
FIG. 30 is a similar view to FIG. 29 with the side rail body and the timing link removed for clarity.
Figure 31:
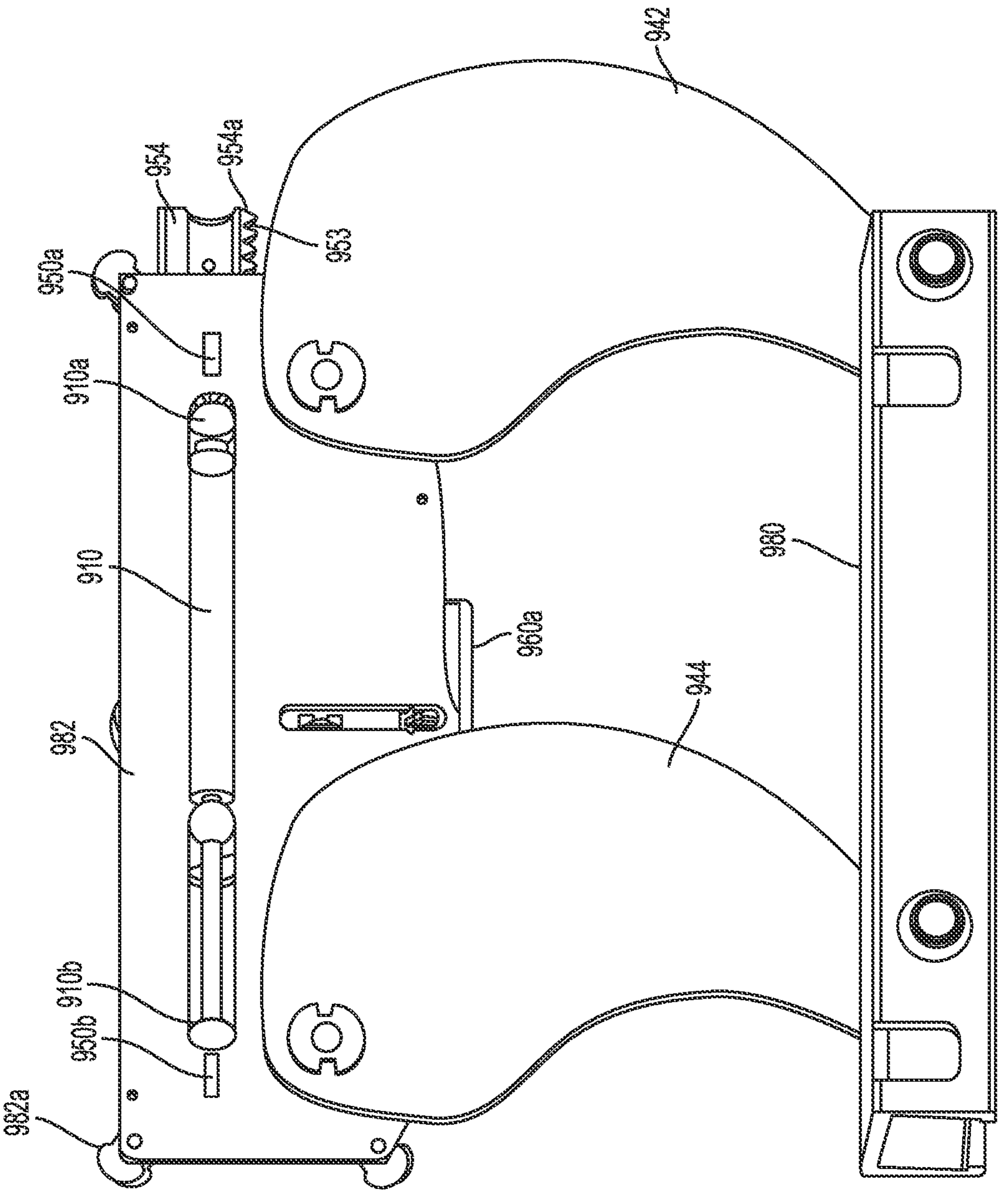
FIG. 31 is a fragmentary perspective view of the side rail with the side rail body removed for clarity as viewed from outside of the patient support apparatus.

Referring to FIG. 29, the numeral 936 generally designates another embodiment of a side rail. As will be more fully described below, side rail 936 is configured so that it can use a single damper to provide an assist or counterbalance to the weight of the side rail when raising or lowering the side rail, and hence help control the rate at which the side rail lowers. By reducing the number of components, the damper can be located within the side rail body. Further, by using a compact mounting mechanism, the damper does not interfere with the ability of the side rail to be lowered to a very low height, and thereby also assist in achieving a lower bed height. In other aspects, the side rails may be configured so that they absorb energy from impact, which can reduce the wear and tear on the component parts of the side rails.

Figure 32:
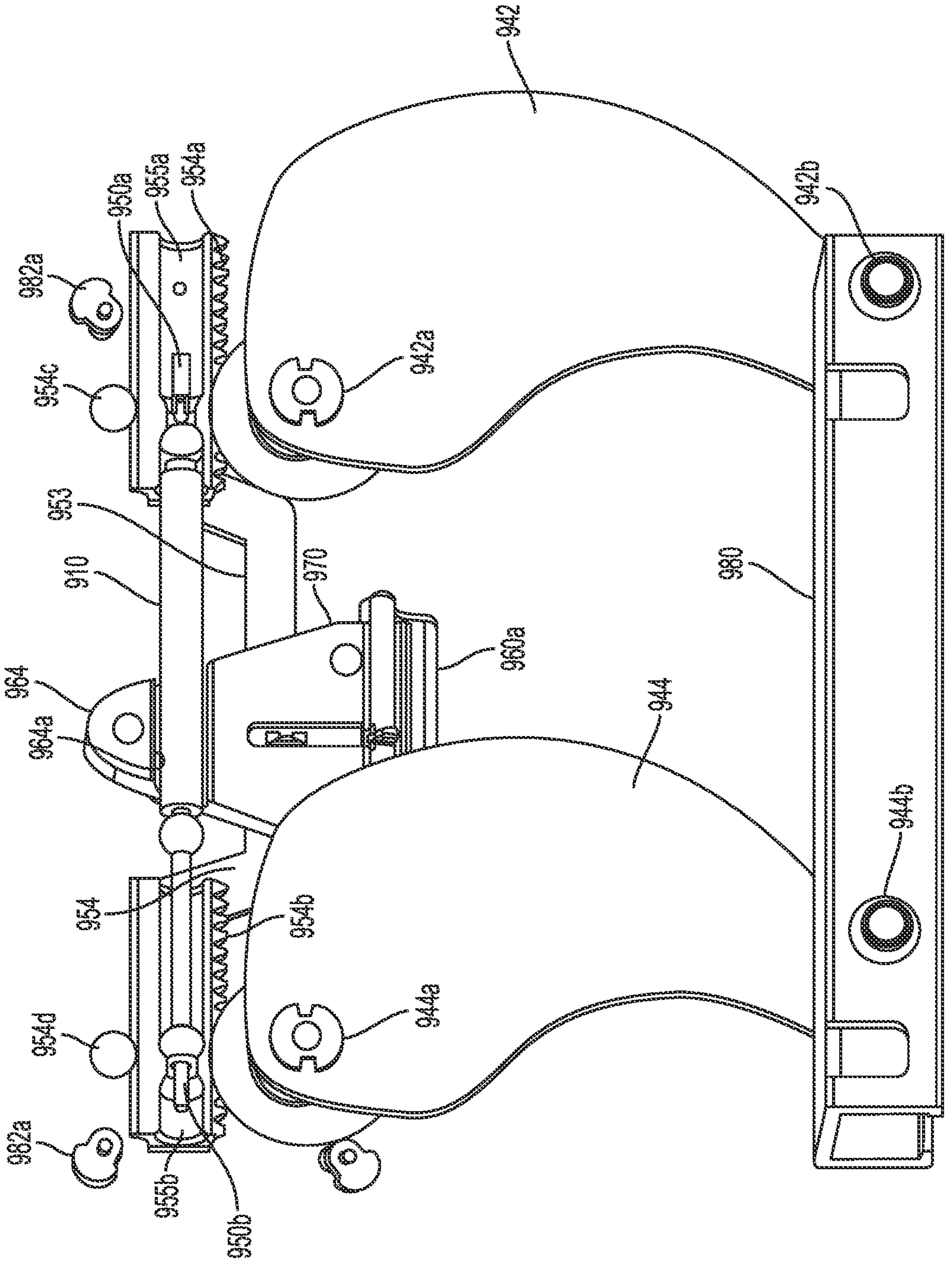
FIG. 32 is a similar view to FIG. 31 with the mounting plate removed for clarity.
Figure 32A:
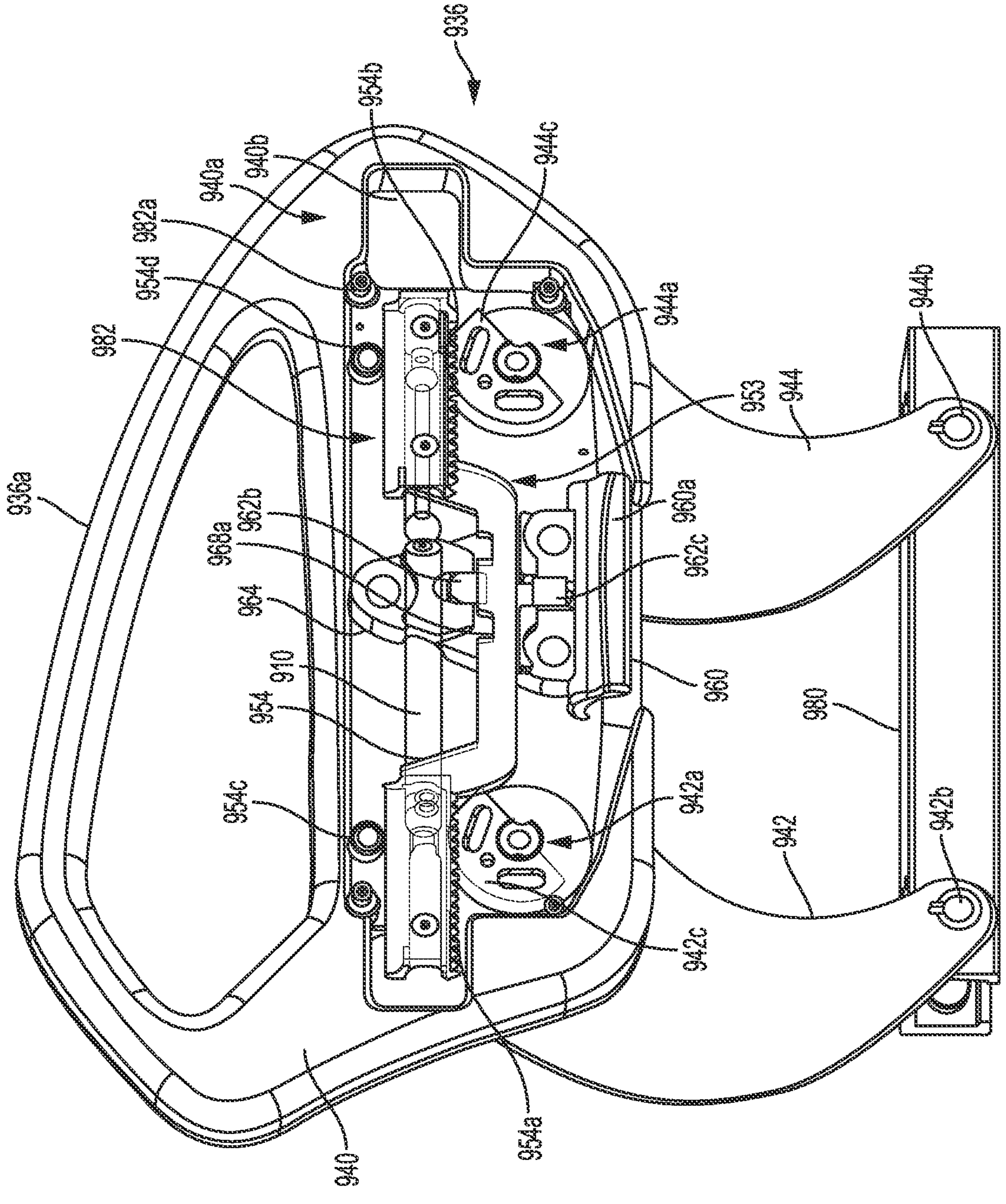
FIG. 32A is a similar view to FIG. 29 with the side rail body raised to its fully upright position.
Figure 32B:
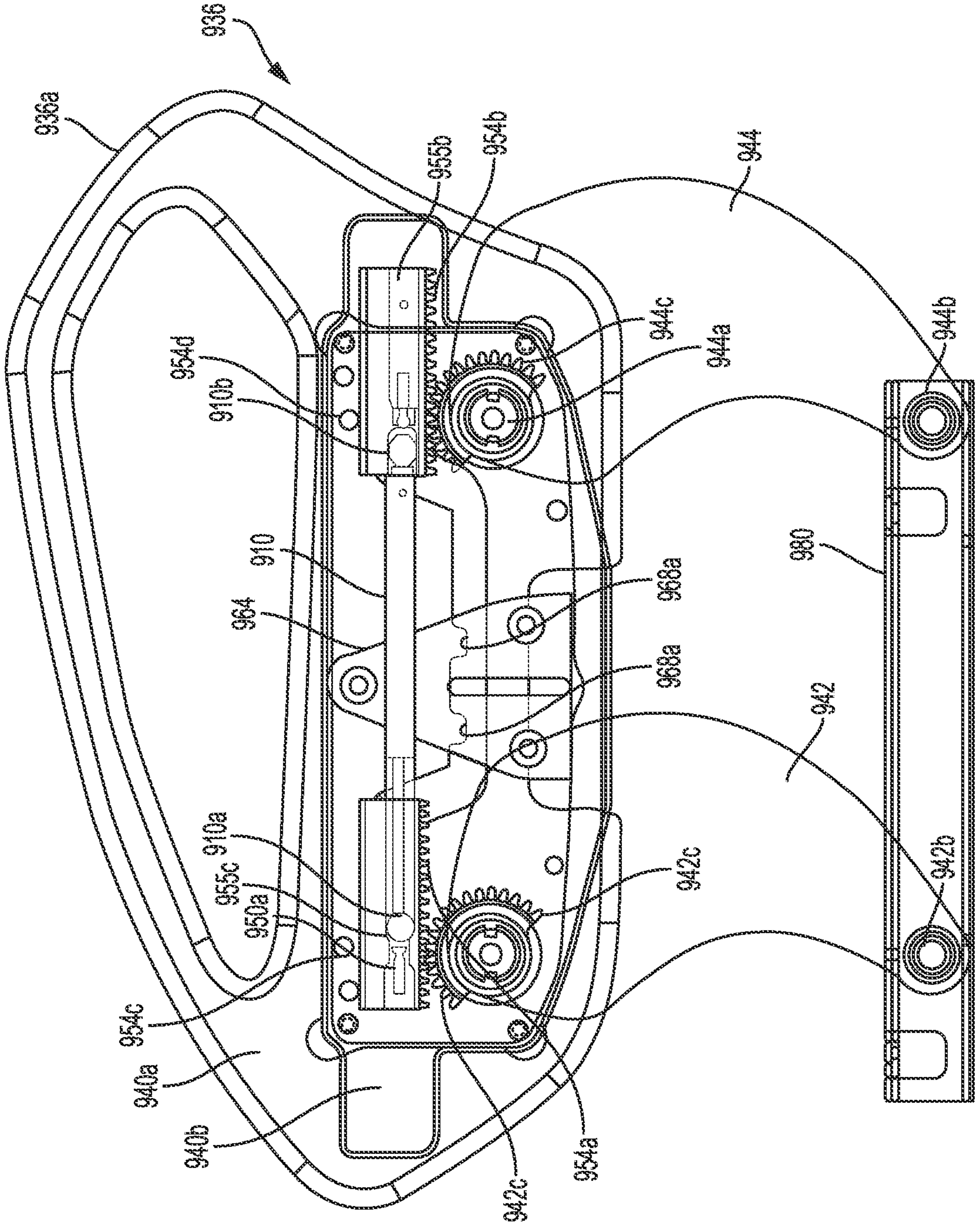
FIG. 32B is a fragmentary perspective view of the side rail as viewed from outside of the patient support apparatus with the side rail body raised to its fully upright position.

Referring to FIGS. 29-32 and 32A-32D, side rail 936 comprises a frame 940 and a pair of mounting arms 942 and 944 that are pivotally mounted at one end to the patient support apparatus, for example, either directly or via a mounting member 980, and pivotally mounted at their other end via a mounting plate 982 to frame 940 to form a four bar mounting mechanism 941 (schematic outline shown in FIG. 29). As best seen in FIGS. 29, 32A, and 32B, frame 940 forms part of the side rail body 936*a* of side rail 936 and comprises a body 940*a* to which an outer plastic shell or shells are mounted (not shown in FIGS. 29-32 and 32A-32D but shown generally in FIG. 1) to enclose the various mechanisms housed in the side rail body. In addition, body 940*a* forms a recess 940*b* in which the mounting plate 982 and side rail mounting mechanism 950, described more fully below, is mounted.

Plate 982 is secured in recess 940*b* by a plurality of fasteners 982*a*, which include lobed flanges 982*b* for engaging the edge of body 940*a* that extends around recess 940*b* (see FIGS. 29 and 32A). Arms 942 and 944 are pivotally mounted to mounting plate 982 and the patient support apparatus via upper and lower pivot connections 942*a*, 944*a*, and 942*b*, 944*b* (FIG. 20), respectively, to thereby form side rail mounting mechanism 950. The terms upper and lower in reference to connections 942*a*, 944*a*, and 942*b*, 944*b* are merely used for convenience and refer to the orientation shown in FIG. 29, for example, where the side rail body is shown moved to an intermediate locked position. Similar to the previous embodiments, upper pivot connections 942*a*, 944*a* are formed by cylindrical bushings 945*a*, 945*b* (FIG. 30) formed at or mounted to the upper portions of arms 942, 944, respectively. Bushings 945*a*, 945*b* extend through plate 982 and, further, are rotationally mounted in plate 982 so that as arms 942, 944 rotate so too will the bushings 945*a*, 945*b*. Lower pivot connections 942*b*, 944*b* are similarly formed from bushings rotatably mounted in mounting member 980. As will be more fully described below, side rail 936 also includes a timing mechanism 953 (FIG. 28) that couples the two bushings 945*a*, 945*b* of upper pivot connections 942*a*, 944*a* together so that they rotate in unison.

Extending from the bushings 945*a*, 945*b* are gears 942*c*, 944*c*, which are keyed to the respective bushings 945*a*, 945*b* and couple the timing mechanism 953 to the bushings 945*a*, 945*b*. In the illustrated embodiment, gears 942*c*, 944*c* are sector gears and, therefore, only have teeth over a portion of their outer perimeters. However, it should be understood that full, circular gears may be used.

As best seen in FIGS. 29 and 32A-32D, timing mechanism 953 comprises a generally U-shaped link 954 with toothed linear racks 954*a* and 954*b* mounted or formed on opposed ends of link 954. In the illustrated embodiment, toothed linear racks 954*a* and 954*b* are formed on channel shaped members that mount to link 954 by way of fasteners (FIGS. 29 and 32) and which support sleeves 955*a*, 955*b* to receive damper 910, more fully described below. Sleeves 955*a*, 955*b* may be formed from a low friction material, such as a plastic or other polymer, or metal.

Link 954 acts as a timing link, as well as forms part of the locking mechanism (960) described below, which allows the side rail to be locked in one or more positions, such as a raised locked position (FIG. 32C) and, optionally, one or more other locked positions, e.g. one or more intermediate locked positions (FIG. 29). Because the path of the side rail is arcuate, the raised locked position may be higher than the intermediate locked position or the same as the intermediate locked position (such as the case in the illustrated embodiment) Further, the raised locked position may coincide with the uppermost raised position (as shown in FIG. 32A) or be lower but above the lowered (lowermost) position. Therefore, it should be understood that the term intermediate when used in reference to the side rail body positions refers to a position along the path between the raised locked position and the lowered (lowermost) position and it does not necessarily mean that it is higher or lower than the raised locked position—it could be, as noted, at the same height as the raised locked position or higher or lower than the raised locked position, including below the horizontal (hitch) position.

In this manner, when frame 940 (and the rest of the side rail body) is raised or lowered, arms 942, 944 pivot about their upper pivot connections 942*a*, 944*a* and lower pivot connections 942*b*, 944*b*, which are synchronized by link 954, thereby forming the four bar mounting mechanism 941 along with plate 982 (and frame 940) and mounting member 980.

As noted, to lock the position of the side rail body, side rail 936 include a locking mechanism 960. Locking mechanism 960 is configured to engage timing link 954 with latch 962, which selectively engages notches 968*a* in link 954, to thereby lock the position of the side rail (FIG. 29). Locking mechanism 960 includes a handle 960*a* (e.g. as best seen in FIGS. 29, 30, and 32A-32D) that is accessible from the outside of side rail body. Handle 960*a* is pivotally mounted to a bracket 964, which is mounted to plate 982. Bracket 964 straddles link 954 and also supports damper 910, described more fully below. When handle 960*a* is pivoted outwardly as shown in FIG. 32A, handle 960*a* lifts or pushes latch 962 upward to disengage latch 962 from link 964 so that the side rail can be raised or lowered. When handle 960*a* is returned to its locked position, latch 962 once again is positioned so that it can engage link 954 once aligned with one of the notches 968*a*. Optionally, handle 960*a* may include a handle spring (not shown) to bias the handle in its locked position. Similarly, latch 962 may include a latch spring (not shown) to bias the latch in its locked position. Further, the handle spring may be sized so that it has a smaller spring force than the latch spring. The handle spring may be used simply to remove play in the handle, while the latch spring may have a sufficient spring force to reduce the chances of the latch being inadvertently moved to its unlocked position. Note that the handle can be designed in many ways to engage/disengage the locking mechanism.

Similar to timing link 154, link 954 is guided for linear movement relative to the upper pivot connections 942*a*, 944*a* via one or more rollers 954*c*, 954*d* (FIG. 29) as well as bracket 964. Rollers 954*c*, 954*d* are mounted to plate 982 above link 954 and urge toothed portions 954*a*, 954*b* of link

954 into engagement with the respective gears 942*c*, 944*c* (e.g. FIG. 32B) of pivot connections 942*a*, 944*a*. For example, rollers 954*c*, 954*d* (FIG. 32B) may comprise elastomeric rollers to reduce noise and also provide energy absorbing characteristics. In this embodiment, the ends of link 954 are located above the upper pivot connections, with the medial portion of link 954 extending below the ends and between the upper pivot connections.

As noted above, link 954 also forms part of the locking mechanism. As best seen in FIGS. 29 and 32A-32D, link 954 has a plurality of notches 968*a* formed at its upper edge, which are selectively engaged by a latch 962 (of locking mechanism 960). Again referring to FIG. 29, latch 962 comprises an elongate body 962*a* with a lug 962*b* at its upper end. Latch 962 is slidably mounted in bracket 964, which is mounted to plate 982 by a plurality of fasteners 964*a*. Lug 962*b* is sized to extend into and selectively seat in a respective notch 968*a* of the link 954 to thereby lock the position of the side rail.

Latch 962 also comprises a second lug 962*c* at a lower end thereof. Second lug 962*c* is adjacent handle 960*a*, which as noted is pivotally mounted to plate 982, so that when the handle is pivoted upwardly, handle 960*a* will push on lug 962*c* to urge latch 962 upward. Handle 960*a* is pivotally mounted at a lower end of bracket 964 about a horizontal axis and extends through to the outside of the side rail body, so that it can be selectively operated by a person to push on and lift lug 962*c* to disengage the latch 962 from link 954.

Optionally, bracket 964 may include dampers 966 about fasteners 964*a*, for example, rubber bumpers, which absorb energy when the side rail is raised or lowered, and moreover, if and when the side rail body 936*a* is subject to an impact force, for example, when the patient support apparatus is inadvertently pushed or knocked into an object.

In the illustrated embodiment, and as best seen in FIG. 29, bracket 964 comprises a generally inverted triangular shaped body 970, with an elongate central opening 970*a* in which latch 962 is slidably mounted. Further, body 970 includes a recess 970*b* to receive and support link 954 between lugs 962*b* and 962*c* so that latch 962 is positioned for engaging link 954, as described above. Thus, a single latch may be used to lock the position of the side rail body.

Similar to side rail 536, as noted above, side rail 936 may incorporate a single damper mechanism to counterbalance the weight of the side rail to reduce the force needed to raise or lower the side rail. In the illustrated embodiment described below, a single damper is provided that is oriented along the longitudinal axis of the side rail, which extends parallel to the longitudinal axis of the patient support.

Referring to FIGS. 32A-32D, and as will be more fully described below, damper 910 is mounted so that it can apply a force in a first direction and then apply a force in a second direction opposed from the first direction to provide a counterbalance to the weight of the side rail when the side rail rotates over first range of motion and then over a second range of motion different from the first range of motion.

In the illustrated embodiment, damper 910 comprises a gas spring. Further, damper 910 may comprise a linear gas spring that applies a constant force (as would be understood by those skilled in the art, the force of a constant force damper may vary slightly) or a variable gas spring, whose force varies over its stroke to apply a greater force over a desired range of motion, for example, when lifting or when lowering the side rail body.

Damper 910 is mounted in frame 940 and, more specifically, between the two opposed ends of link 954 and between bracket 964 and plate 982. Further, as will be more fully described below, damper 910 is either supported by plate 982 via a stop 950*a* or 950*b* (which are mounted to plate 982) or supported by the link in sleeve 955*a* or 955*b* (provided or formed in link 954) and supported by bracket 964 in a recess 964*a* (FIG. 29). The stops 950*a* and 950*b* are extended from plate 982 so that they extend into sleeves 955*a*, 955*b* (from their open side, which faces plate 982) but are not coupled to the link so that link 954 can move relative to the stops 950*a*, 950*b* (which remain in a fixed position by virtue of their mount to plate 982), when side rail body 936*a* is raised or lowered. The opposed ends 910*a* and 910*b* of damper 910 are free-floating and are not attached to plate 982 or link 954, though as noted they are supported by plate 982 or link 954 over discrete ranges of motion, as will be more described below. The opposed ends 910*a* and 910*b* of damper 910 are, however, located between fixed stops 950*a*, 950*b* ("fixed" here means fixed relative to the side rail body) and movable stops 955*c*, 955*d* formed by shoulders located in sleeves 955*a*, 955*b*, which compress the damper, as described below, when side rail 936 moves between raised and lowered positions and thereby provide a counterbalance to the weight of the side rail.

Referring again to FIG. 32B, when side rail 936 is in its most upright position (this is where the arms are orthogonal to the ground and the side rail body is in its uppermost position), damper 910 is in a neutral position, where damper 910 is uncompressed (or only slightly or partially compressed). In this configuration, damper 910 may be in contact with one of the fixed stops, such as stop 950*a*, and one of the movable stops, such as stop 955*c*, which are in the same location when the side rail is in its fully raised (but unlocked) or most upright position, but with damper 910 uncompressed (or only slightly compressed).

Figure 32C:
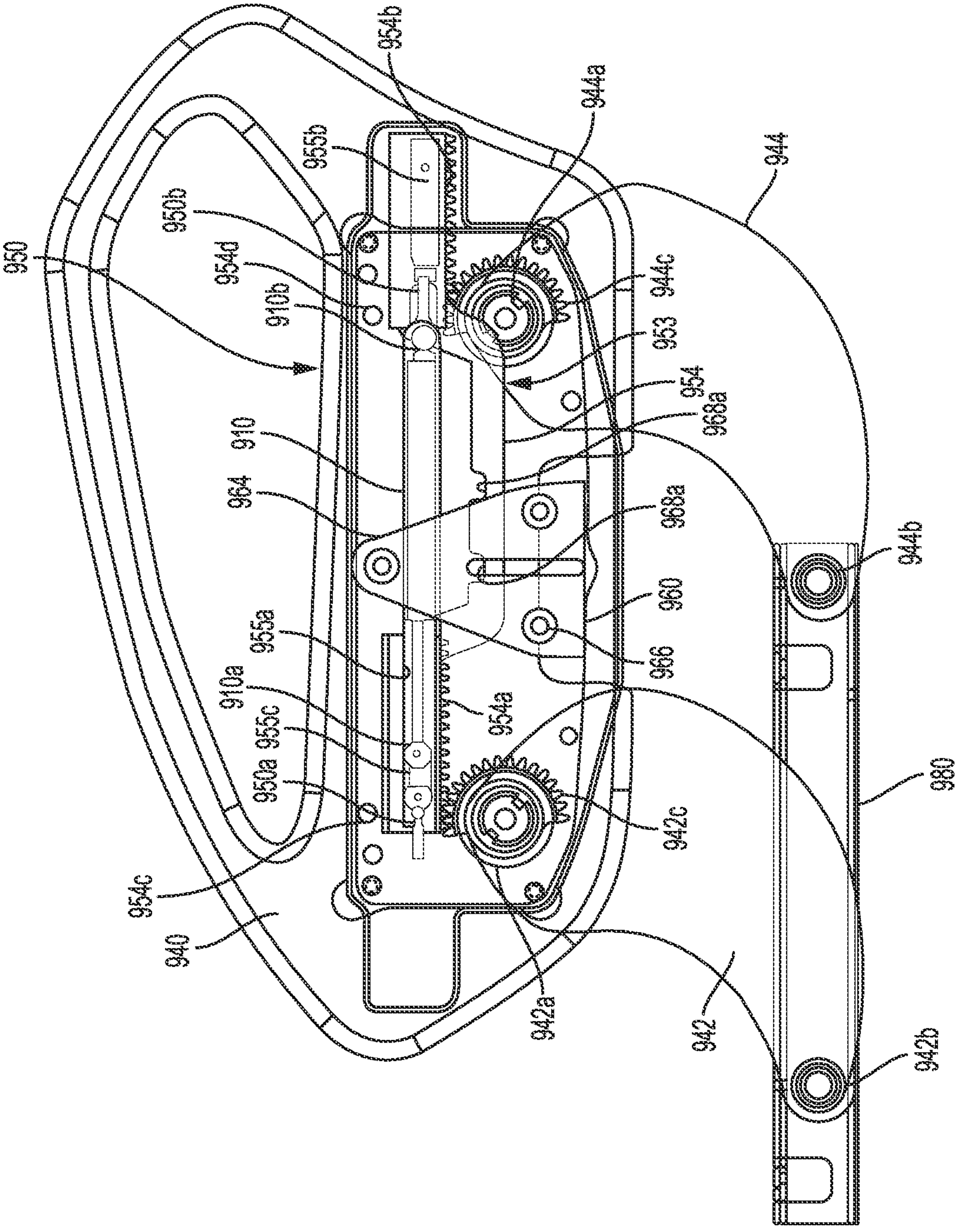
FIG. 32C is a similar view to FIG. 32B with the side rail body in a raised locked position.

As understood from FIG. 32C, when side rail 936 is lowered from its most upright position (FIG. 32B) to its raised locked position (FIG. 32C), arms 942, 944 move in a clockwise direction (as viewed in FIG. 32C) and gears 942*c*, 944*c* move timing link 954 to the right. As timing link 954 moves to the right, end 910*b* of damper 910 is now supported (described more fully below) and compressed by stop 950*b*, which as noted is mounted to plate 982 and forms a stop in the right direction (as viewed in FIG. 32C). The opposed end 910*a* of damper 910 is supported by link 954 in sleeve 955*a* and is compressed by stop 955*c*. In this manner, as side rail 936 is moved or lowered, damper 910 is compressed in a first direction (to the right as viewed in FIG. 32C).

Figure 32D:
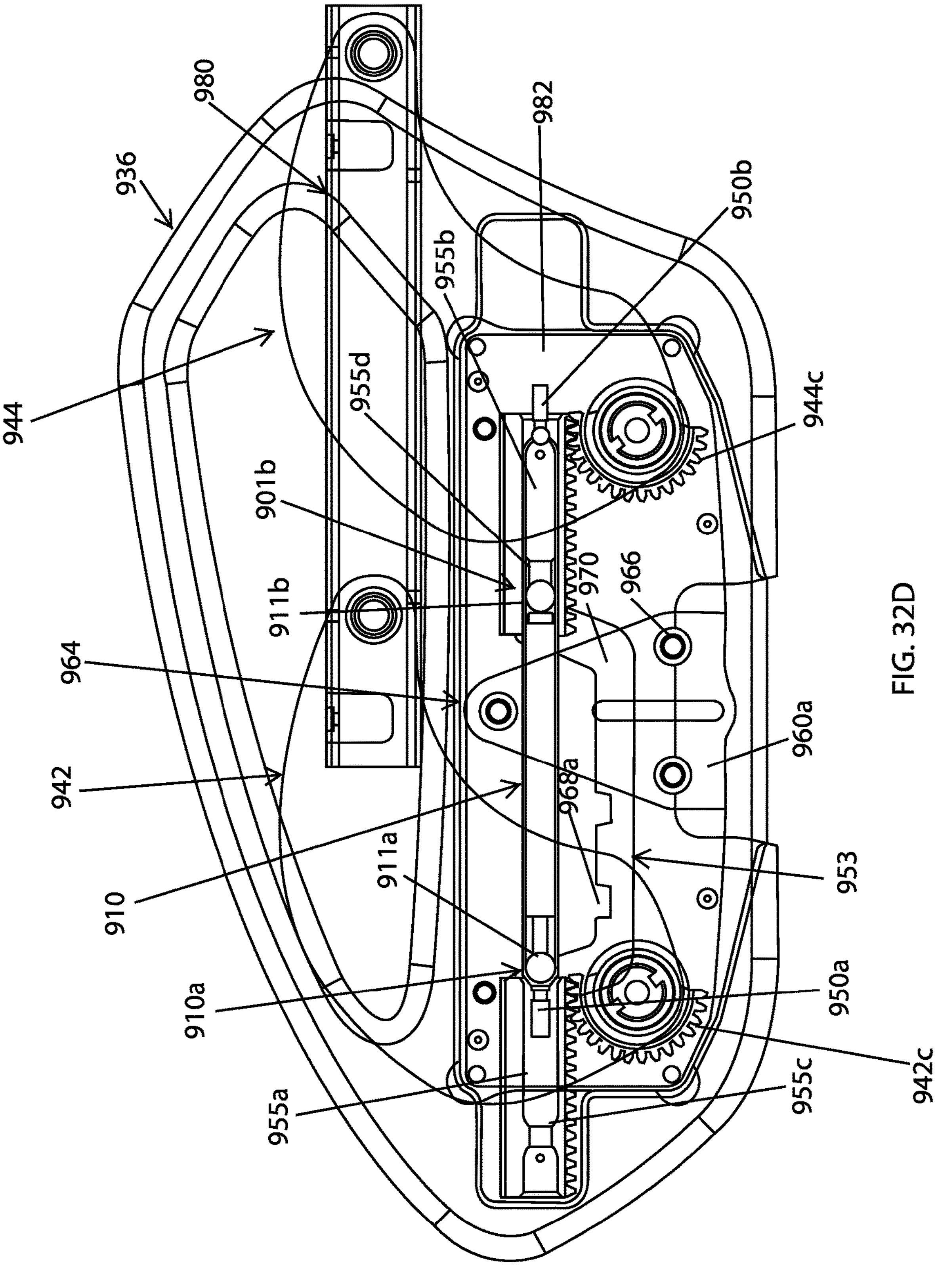
FIG. 32D is a similar view to FIG. 32C with the side rail body lowered.

Referring now to FIG. 32D, when side rail 936 is moved or lowered towards its lowered (lowermost) position, arms 942 and 944 rotate in a counterclockwise direction and gears 942*c*, 944*c* move timing link 954 to the left (as viewed in FIG. 32D). In this configuration, end 910*b* of damper 910 is now supported in sleeve 955*b* and compressed by stop 955*d*. Further, in this configuration, end 910*a* of damper 910 is no longer supported by link 954 in sleeve 955*a* and instead is supported by plate 982 via stop 950*a*. On the other hand, end 910*b* of damper 910 is supported in sleeve 955*b* and is compressed against stop 955*d*. In this manner, as side rail 936 is lowered to its lowered position, damper 910 will compress in a second direction opposite from the first direction, which forms a bidirectional counterbalance for side rail 936.

As noted above, stops 950*a* and 950*b* are configured to support the ends 910*a*, 910*b* of damper when the respective ends of the damper are no longer supported by the link. To support the damper, damper ends 910*a* and 910*b* are provided with bodies 911*a*, 911*b*, such as cylindrical or spherical bodies, which have recesses facing the direction of the fixed stops 950*a*, 950*b*. Stops 950*a*, 950*b* each have projecting bodies, such as cylindrical or spherical bodies, that extend into the damper ends 910*a* and 910*b* when the damper 910 is compressed onto the respective stop (e.g. see FIGS. 32B-32D). With this arrangement, damper 910, as noted above, may be free floating between the stops but supported by the plate or the link depending on the position of the side rail body.

Thus, damper 910 provides a force in opposed directions, both of which are parallel to the longitudinal axis of the side rail. Therefore, a single damper can provide a counterbalance to the weight of the side rail through the full range of motion of the side rail. Further, the damper can also absorb shock along an axis parallel to the longitudinal axis of the side rail.

In the illustrated embodiment, the spring comprises a gas spring. However, it should be understood that other springs may be used, such as a floating coil spring or a floating damper. Furthermore, although illustrated in the context of the U-shaped timing link, it should be understood that the counterbalance mechanism may be combined with any one of the above described timing links, including the linear timing link version, curved timing link version and the intermediate gear timing link version.

Figure 33:
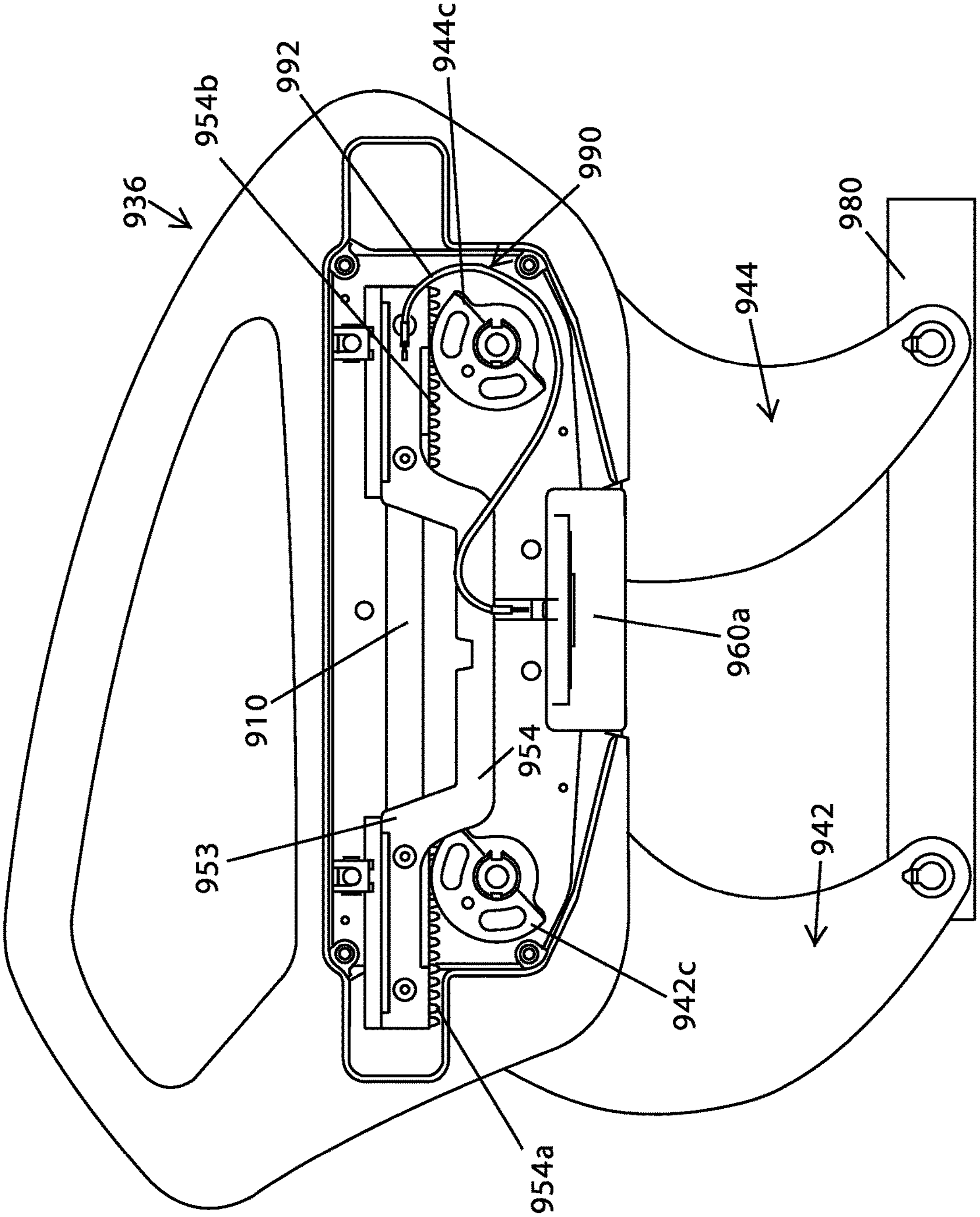
FIG. 33 is a fragmentary perspective view of another embodiment of a side rail with a remote release mechanism for releasing the counterbalance mechanism, such as a gas spring.
Figure 34:
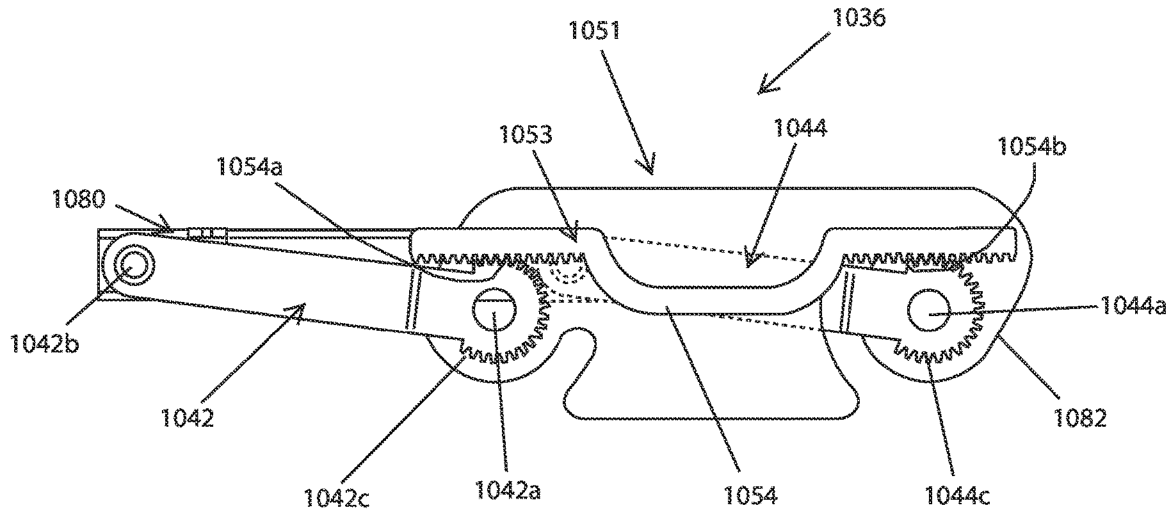
FIG. 34 is a fragmentary side view of another embodiment of a side rail with integrated gears, with the side rail body removed for clarity.
Figure 35:
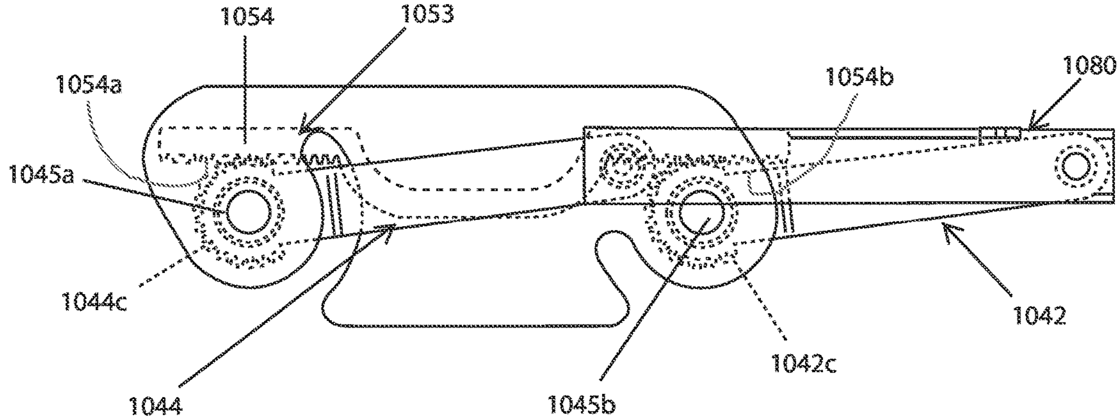
FIG. 35 is another fragmentary side view of the side rail of FIG. 34.
Figure 36:
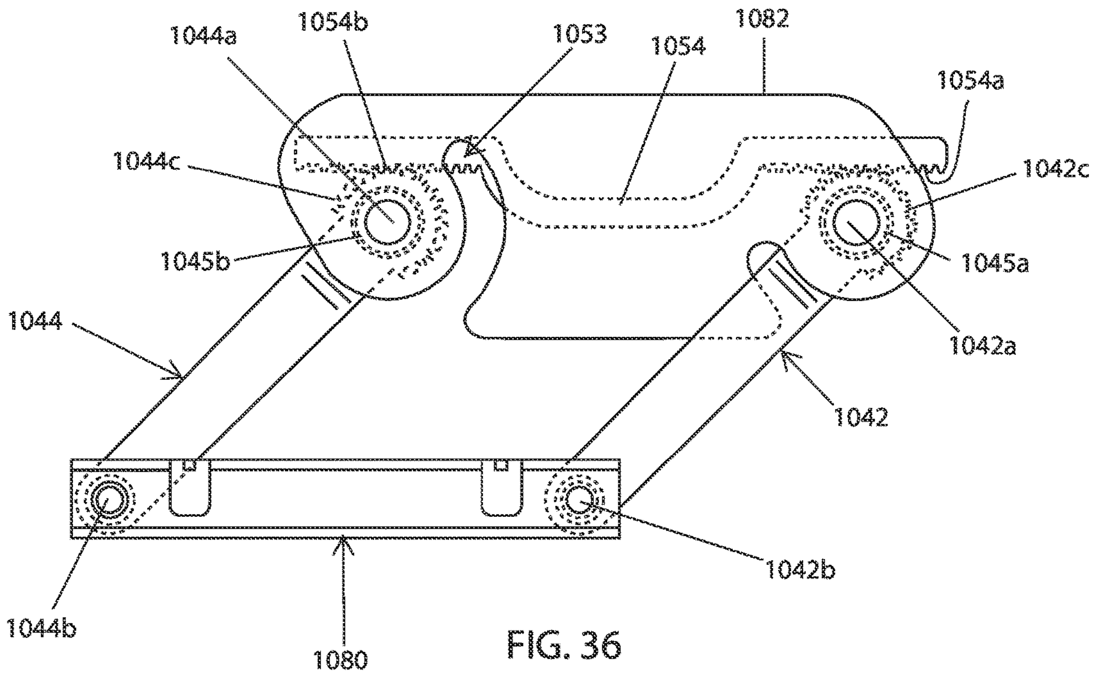
FIG. 36 is a similar view to FIG. 35 with the side rail in a raised position.
Figure 37:
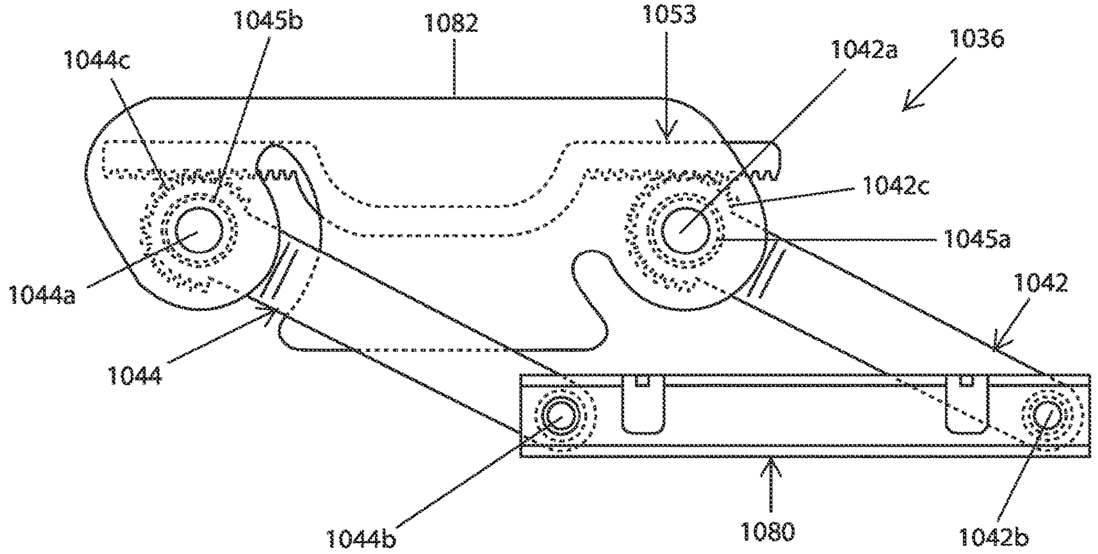
FIG. 37 is a similar view to FIG. 36 with the side rail in another raised position.

Referring to FIG. 33, optionally, side rail 936 may include a remote release 990. Release 990 is configured to allow the side rail to be locked in any position throughout the stroke of the damper, in this case a gas spring. As noted above, using a gas spring also significantly reduces part count and provides a dampening solution during a side rail impact. Such impacts can occur when a bed with side rails is pushed through a doorway and the side rail collides into the door or jam, etc.

Referring again to FIG. 33, release 990 comprises a push-pull cable 992, such as a Boden cable. Cable 992 is coupled on one end to handle 960*a* and is coupled on its other end to the release pin of gas spring 910. In this manner, when cable 992 is pulled by handle 960*a* and moved from a locked position to an unlocked position, cable 992 will pull on the release pin to release the gas spring so that the position of the side rail can be adjusted. Once side rail 936 is in the desired position, handle 960*a* can be pivoted or moved back to its locked position, where cable 992 is no longer pulled and instead is pushed back so that the release pin of the gas cylinder is moved back to its locked position and the gas spring will again lock the position of side rail 936.

By using the spring to lock the position of side rail 936, the locking mechanism 960 and the notches in timing link 954 may be eliminated.

Optionally, as will described in reference to FIGS. 34-37, the mounting mechanisms of any of the above side rails may include integral gears that are integrally formed with or to the respective side rail arms and formed about their pivot respective bushings, which rotatably mount the respective arms to the side rail body. Thus, each of the arms has a one-piece construction, eliminating the need for additional assembly and reducing the number of parts. Being "integrally" formed with the arms includes forming the gear and arms together, such as by cast molding or the like, or by integrating them together, such as by welding.

Referring to FIGS. 34-37, side rail 1036 (shown with the side rail body removed) includes a pair of side rail arms 1042, 1044 that rotatably mount (at lower pivot connections 1042*b*, 1044*b*) on end to the patient support apparatus, optionally via mounting member 1080, and rotatably mount at their opposed ends (at upper pivot connections 1042*a*, 1044*a*) to the side rail body (not shown) by a mounting mechanism 1051. In this manner, similar to the previous embodiments, the side rail arms, the mounting mechanism, and the mounting member form a four bar linkage.

In the illustrated embodiment, side rail arms 1042, 1044 include gears 1042*c*, 1044*c* that are integrally formed with the respective side rail arms 1042, 1044. Further, integral gears 1042*c*, 1044*c* may be formed about bushings 1045*a*, 1405*b*, which rotatably mount arms 1042, 1044 to the side rail body.

Similar to side rail 936, side rail arms 1042, 1044 are rotatably mounted to a mounting plate 1082, which mounts the mounting mechanism 1051 to the side rail body. Similarly, plate 1082 supports a timing mechanism 1053 that couples gears 1042*c* and 1044*c* together to synchronize the movement of the side rail arms. Timing mechanism 1053 also includes a timing link 1054 with toothed racks 1054*a*, 1054*b* at its opposed ends for engaging and coupling gears 1042*c*, 1044*c* together. For further details of suitable locking mechanisms, optional counterbalance mechanisms, optional energy absorbing components, the timing link, the mounting of the timing link, and the side rail body, reference is made to the above embodiments.

Figure 38:
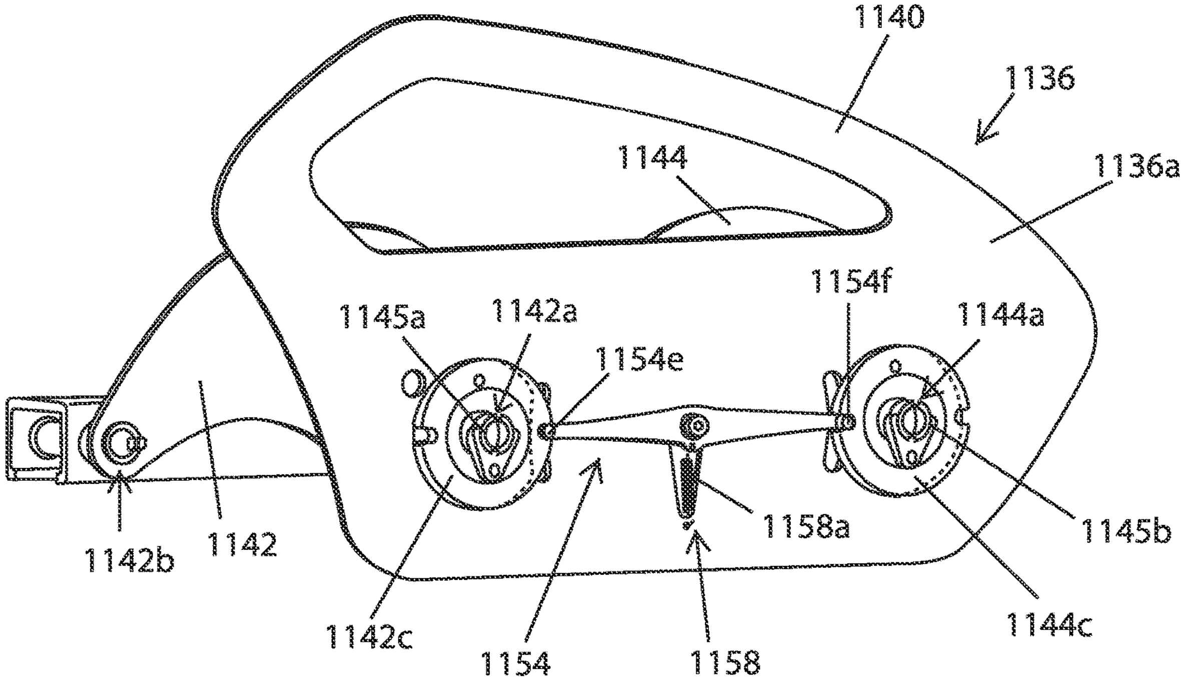
FIG. 38 is a fragmentary elevation view of another embodiment of a side rail with a mounting mechanism that is selectively operable as four bar linkage and with the side rail outer cover or covers removed.
Figure 39:
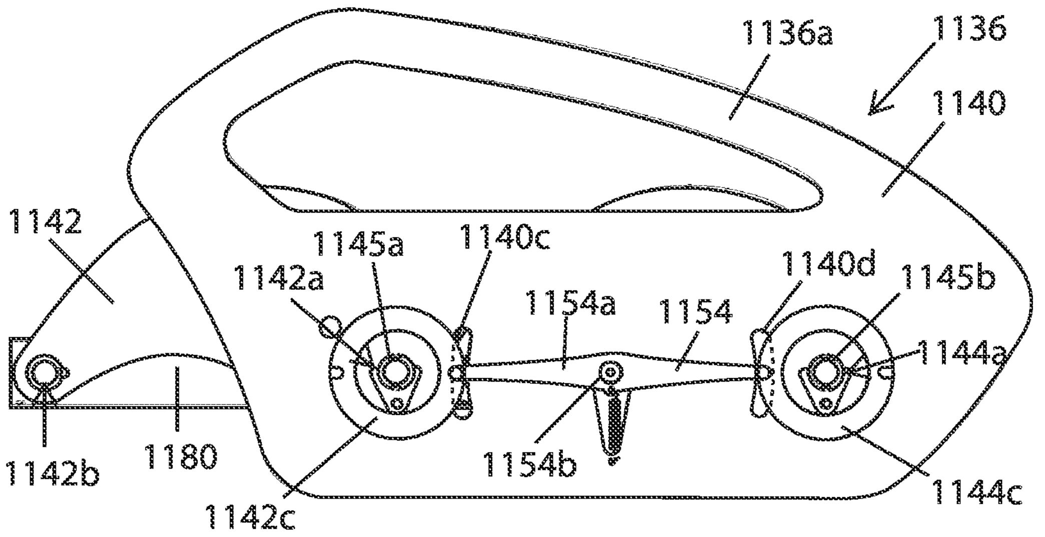
FIG. 39 is a similar view to FIG. 38 illustrating mounting mechanism with the four bar linkage disengaged.
Figure 40:
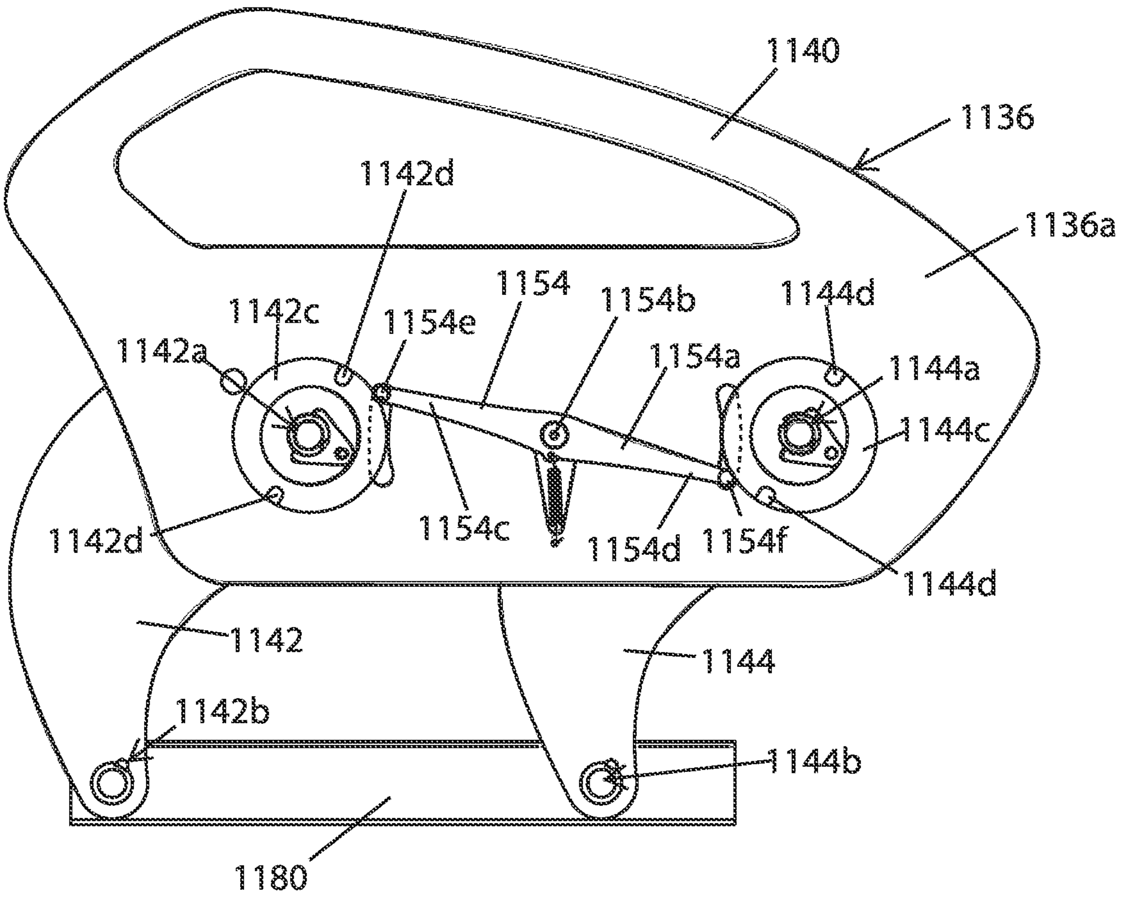
FIG. 40 is a fragmentary perspective view of the side rail of FIG. 38 incorporating one or more counterbalance mechanisms.
Figure 40A:
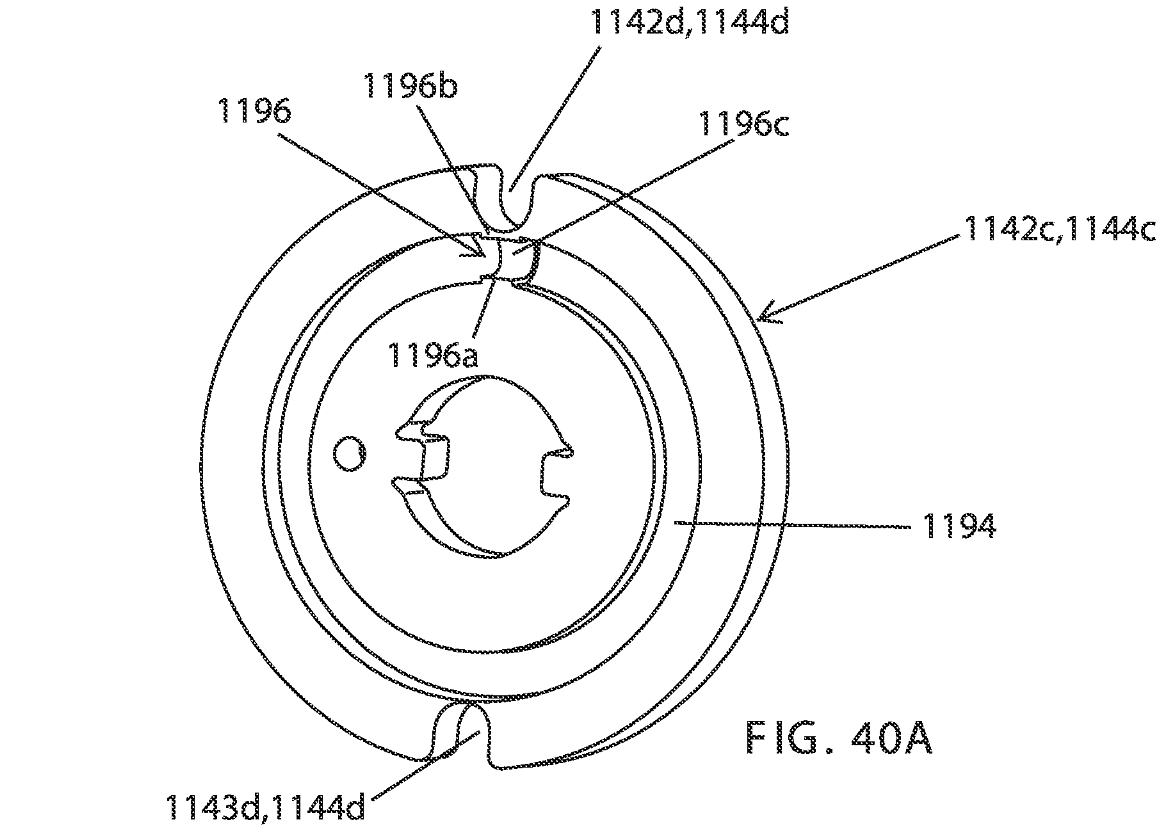
FIG. 40A is an enlarged view of one of the upper pivot connection discs.
Figure 40B:
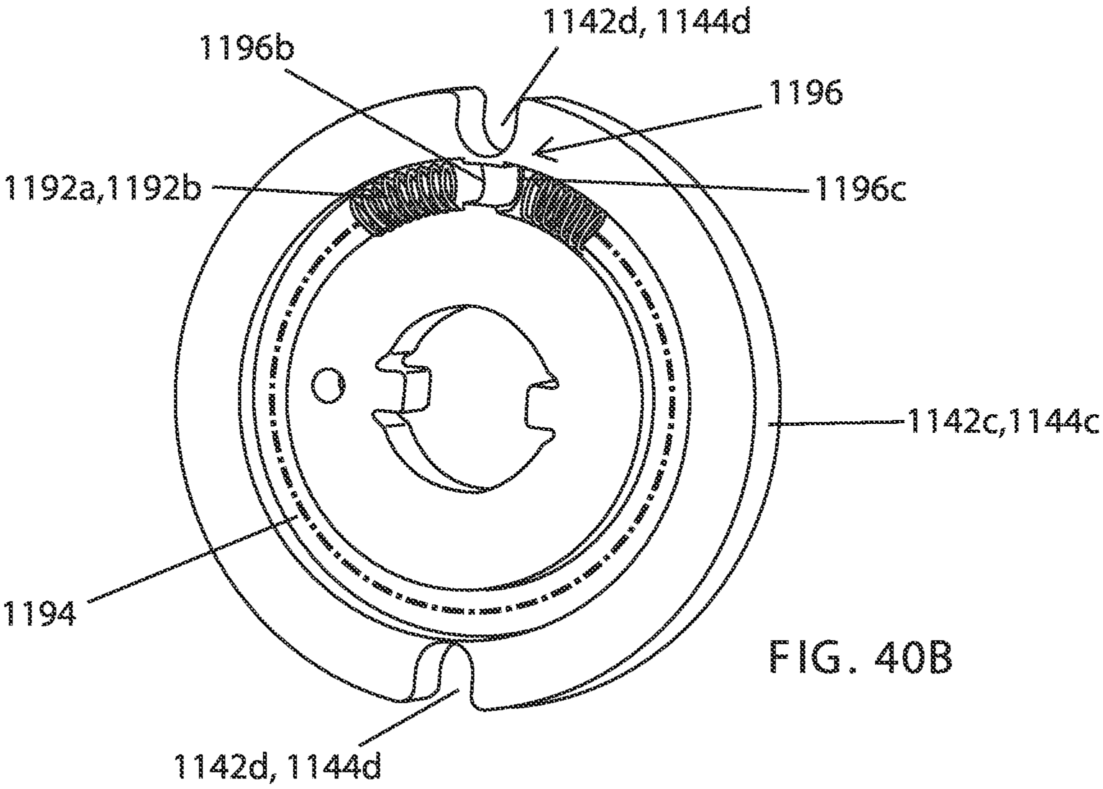
FIG. 40B is an enlarged perspective view of the inside of the upper pivot connection disc with a counterbalance spring.
Figure 40C:
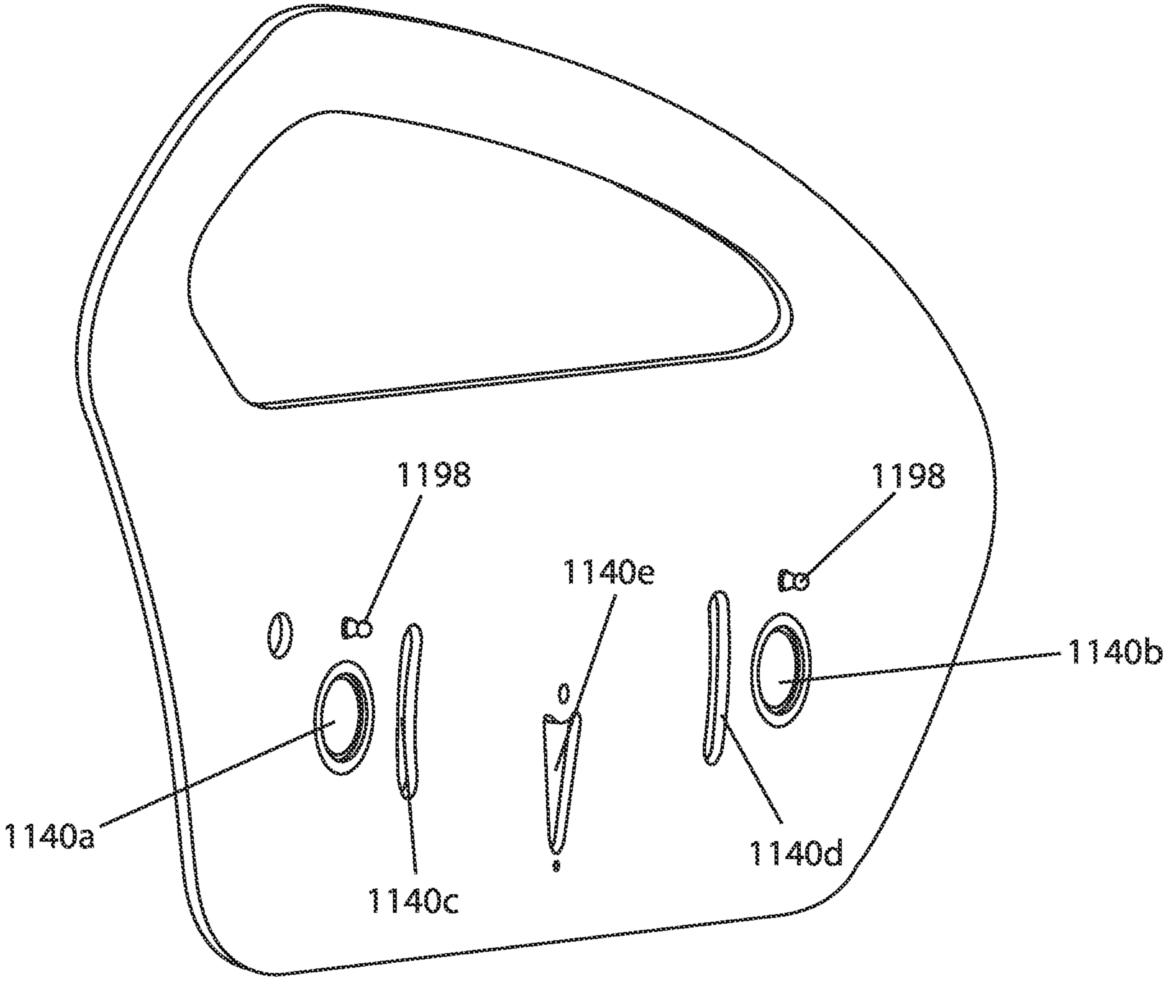
FIG. 40C is a perspective view of the side rail body frame.

Referring to FIGS. 38-40, the numeral 1136 generally designates another embodiment of a side rail. As will be more fully described below, side rail 1136 incorporates a timing link that operates only over a discrete range of motion. Further, side rail 1136 is configured so that it can use a single damper or a pair of dampers that are incorporated into the pivot connections between the mounting arms and the side rail body to provide an assist or counterbalance to the weight of the side rail when raising or lowering the side rail, and hence help control the rate at which the side rail lowers. By incorporating the dampers into the pivot connections, the damper does not interfere with the ability of the side rail to be lowered to a very low height, and thereby also assists in achieving a lower bed height.

Referring to FIGS. 38-40, side rail 1136 incorporates a timing link 1154 that is operable as a timing link only over a limited range of motion to avoid hitching of the side rail. As will be more fully described below, timing link 1154 disengages from linking the mounting arms 1142, 1144 together to allow the mounting arms a greater range of travel and to maintain the side rail body mounting mechanism within the side rail body even with the greater a range of travel, but limits the degrees of freedom when needed to avoid the side rail from flipping upside down ("hitching").

Figure 46:
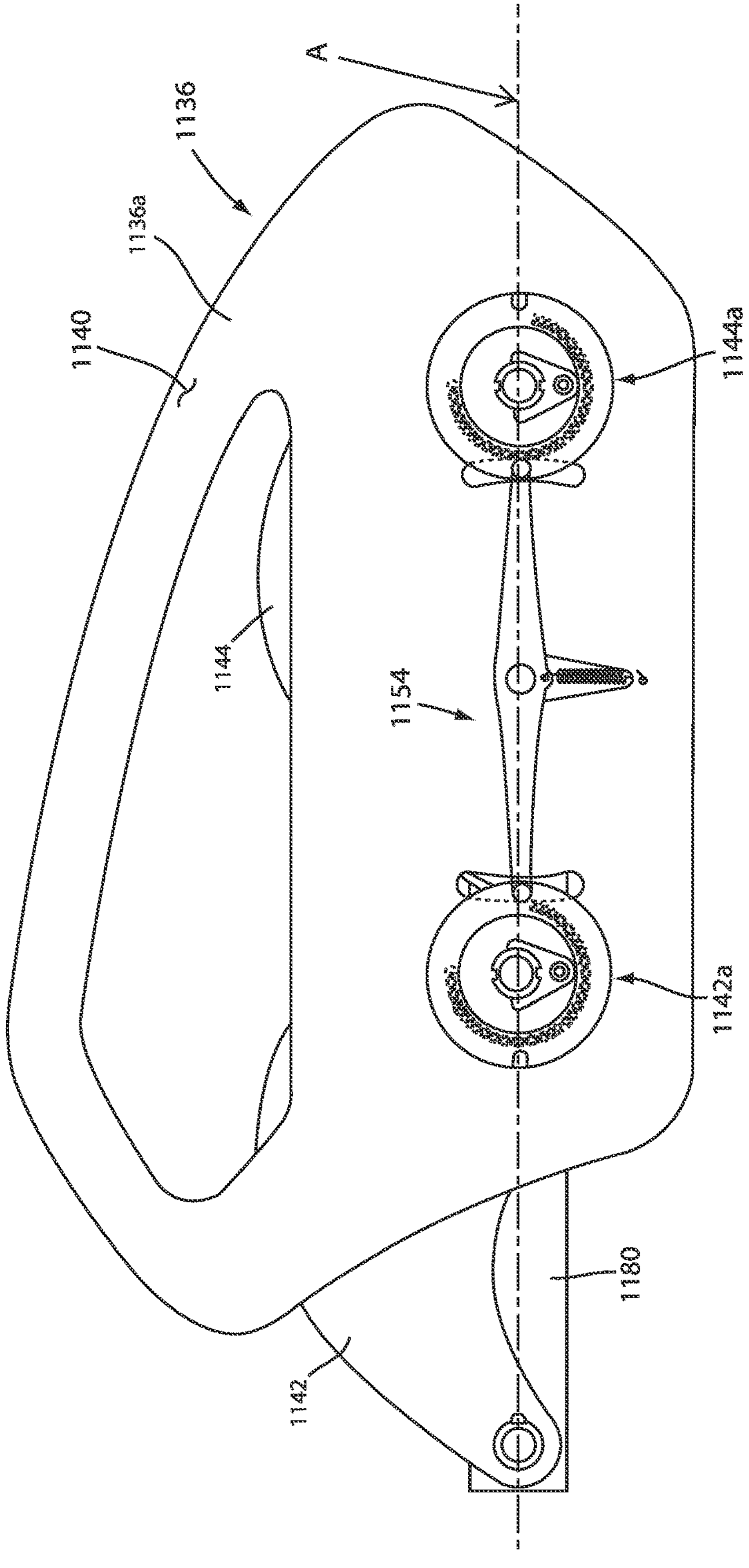
FIG. 46 is a fragmentary elevation view of the side rail shown lowered where the axes of rotation of the upper and lower pivot connections are aligned in a common plane that is parallel to the frame, with portions of the upper pivot connections shown in transparency.
Figure 47:
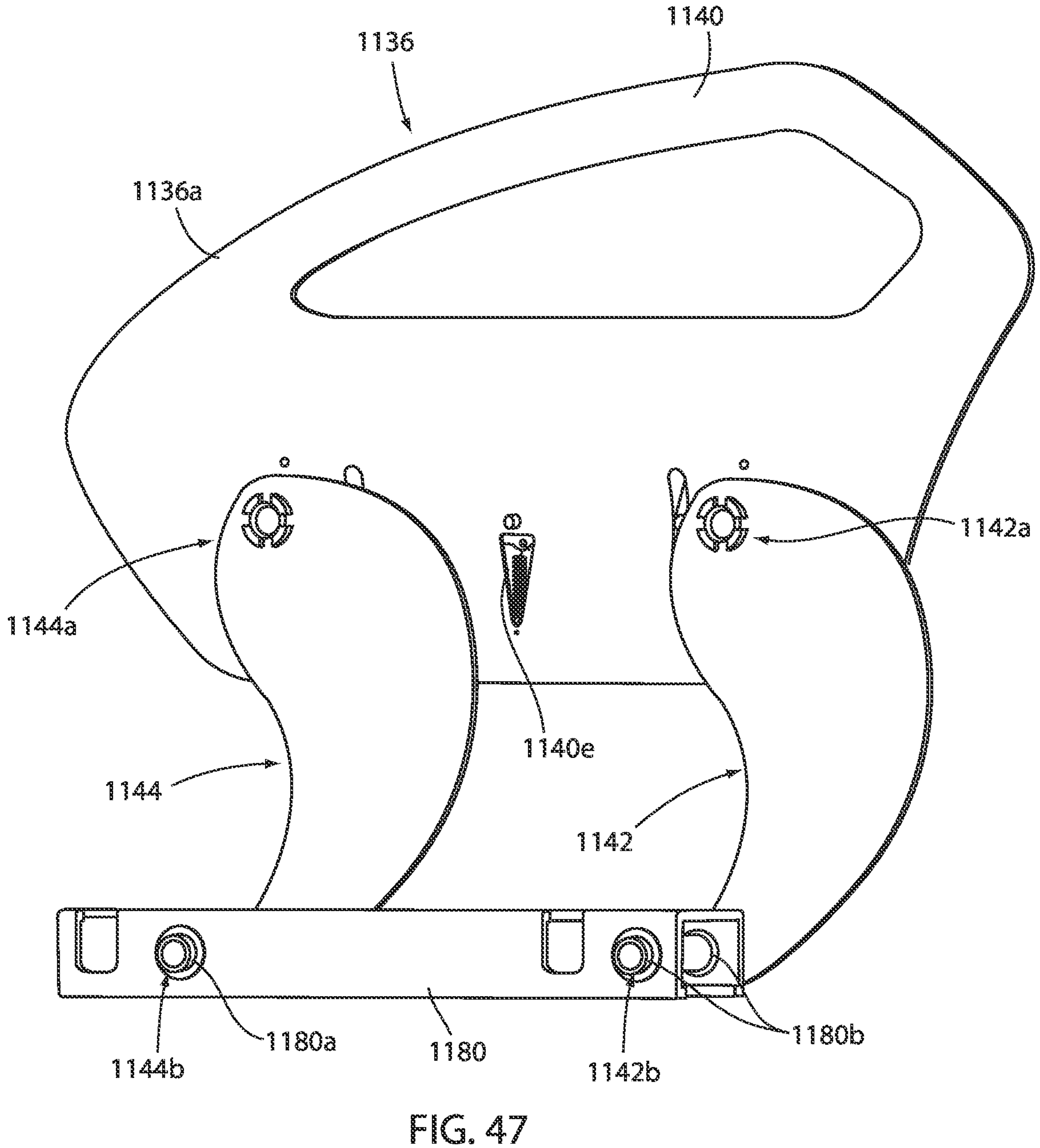
FIG. 47 is a fragmentary elevation view from the patient facing side of the side rail shown in the fully raised.
Figure 48:
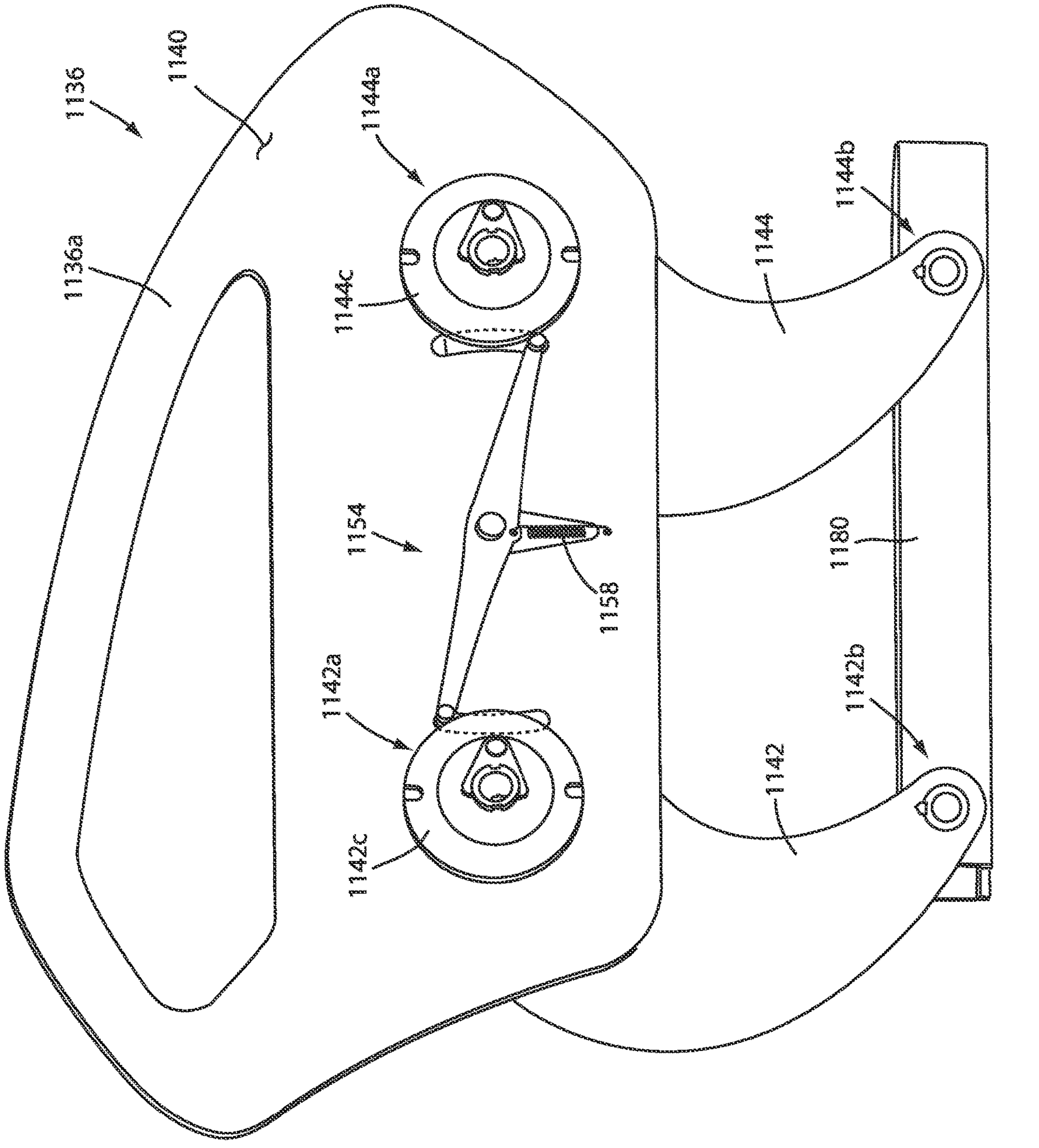
FIG. 48 is a fragmentary elevation view of the side rail shown in the fully raised position with the disc retainer in its alternate position similar to FIGS. 44-46.

Referring again to FIGS. 39-41 similar to the previous embodiments, side rail 1136 includes a pair of side rail mounting arms 1142, 1144, which are pivotally mounted at one end to side rail body 1136*a* by a pair of upper pivot connections 1142*a*, 1144*a* and mounted at their opposed ends to mounting member 1180 by lower pivot connections 1142*b*, 1144*b*. Each of the pivot connections 1142*a*, 1144*a*, 1142*b*, 1144*b* are formed by bushings 1145*a*, 1145*b* mounted to the respective ends of arms 1142, 1144, which are respectively rotatably mounted to side rail body frame 1140 of side rail body 1136*a* in mounting openings 1140*a*, 1140*b* and to mounting member 1180 in openings 1180*a*, 1180*b* (FIG. 47). Again similar to the previous embodiments, bushings 1145*a*, 1145*b* of upper pivot connections 1142*a*, 1144*a* are coupled together by timing link 1154 to thereby link the rotation of mounting arms 1142, 1144 together, though in this embodiment only over a limited range of motion to reduce the degrees of freedom when all of the pivot axes of the upper and lower pivot connections are aligned a common plane A that is parallel to the frame (e.g. as shown in FIG. 46).

In the illustrated embodiment, timing link 1154 comprises a pivotal elongated member 1154*a* that is pivotally mounted to side rail body frame 1140 about a timing link pivot axis 1154*b* by a pivot bushing to allow timing link 1154 to pivot and to engage or disengage from the respective bushings 1145*a*, 1145*b*. In the illustrated embodiment, the timing link pivot axis 1154*b* is located centrally between the first end and the second end of timing link 1154 and is perpendicular to the timing link longitudinal axis.

Further, in the illustrated embodiment, timing link 1154 selectively couples to and decouples from bushings 1145*a*, 1145*b* via discs 1142*c*, 1144*c*, which include at least one notch 1142*d*, 1144*d* that is selectively engaged by ends 1154*c*, 1154*d* of timing link 1154. Discs 1142*c*, 1144*c* are secured to bushings 1145*a*, 1145*b* by flanges 1145*c*, 1145*d* that are keyed to the respective bushings. Notably, flanges 1145*c*, 1145*d* are shown in different positions about bushings 1145*a*, 1145*b* in FIGS. 41-43 than in FIGS. 44-48 (shown 180 degrees apart). Alternately, retaining or snap rings may be used to secure the discs to the respective bushings. Further, although only one notch is needed, in the illustrated embodiment, each disc 1142*c* 1144*c* includes a pair of notches to facilitate manufacturing and installation.

The timing link 1154 extends between discs 1142*c*, 1144*c* and, when engaged with discs 1142*c*, 1144*c*, extends along a horizontal axis that extends through the pivot axes of upper pivot connections 1142*a*, 1144*a*. Thus, when engaged with discs 1142*c*, 1144*c*, timing link 1154 is configured to be parallel with the mounting member 1180. As side rail body 1136*a* initially moves away from its engaged position (position where link 1154 is engaged with disc's 1142*c*, 1144*c*), link 1154 prohibits discs 1142*c*, 1144*c* from pivoting in opposite directions about their respective pivot axes. In this manner, the timing link 1154 constrains the mounting arms 1142, 1144 to synchronously pivot about their four respective pivot axes in the same direction, but only over a discrete range of motion. When the side rail body 1136*a* moves further away from its engaged position, the timing link 1154 disengages from the discs, and the ends of link 1154 fall outside the notches 1142*d*, 1144*d* to ride on outer surfaces of the discs 1142*c*, 1144*c* rendering the timing link 1154 inoperable as a timing link and, further, angled to the mounting member 1180—thus no longer forming a four bar linkage with the mounting arms 1142, 1144 and mounting member 1180.

Optionally, ends 1154*c*, 1154*d* of link 1154 each include pins 1154*e*, 1154*f*. Pins 1154*e*, 1154*f* extend transversely through the elongate member relative to its longitudinal axis, for engaging the respective notches 1142*d*, 1144*d*. In this manner, pins 1154*e*, 1154*f* and notches 1142*d*, 1144*d* form toggle arresting elements that cooperate to prevent undesired movement of the side rail body 1136*a* described more fully below.

To control the pivotal motion of timing link 1154, the pivotal motion of link 1154 is limited by stops provided by side rail body frame 1140. In the illustrated embodiment, pins 1154*e*, 1154*f* are guided along elongated slots 1140*c*, 1140*d* formed in side rail body frame 1140, whose ends form stops to limit the movement of timing link 1154. In the illustrated embodiment, slots 1140*c*, 1140*d* are arcuate in shape to guide pins 1154*e*, 1154*f* along their respective arcuate paths adjacent discs 1142*c*, 1144*c*.

Figure 41:
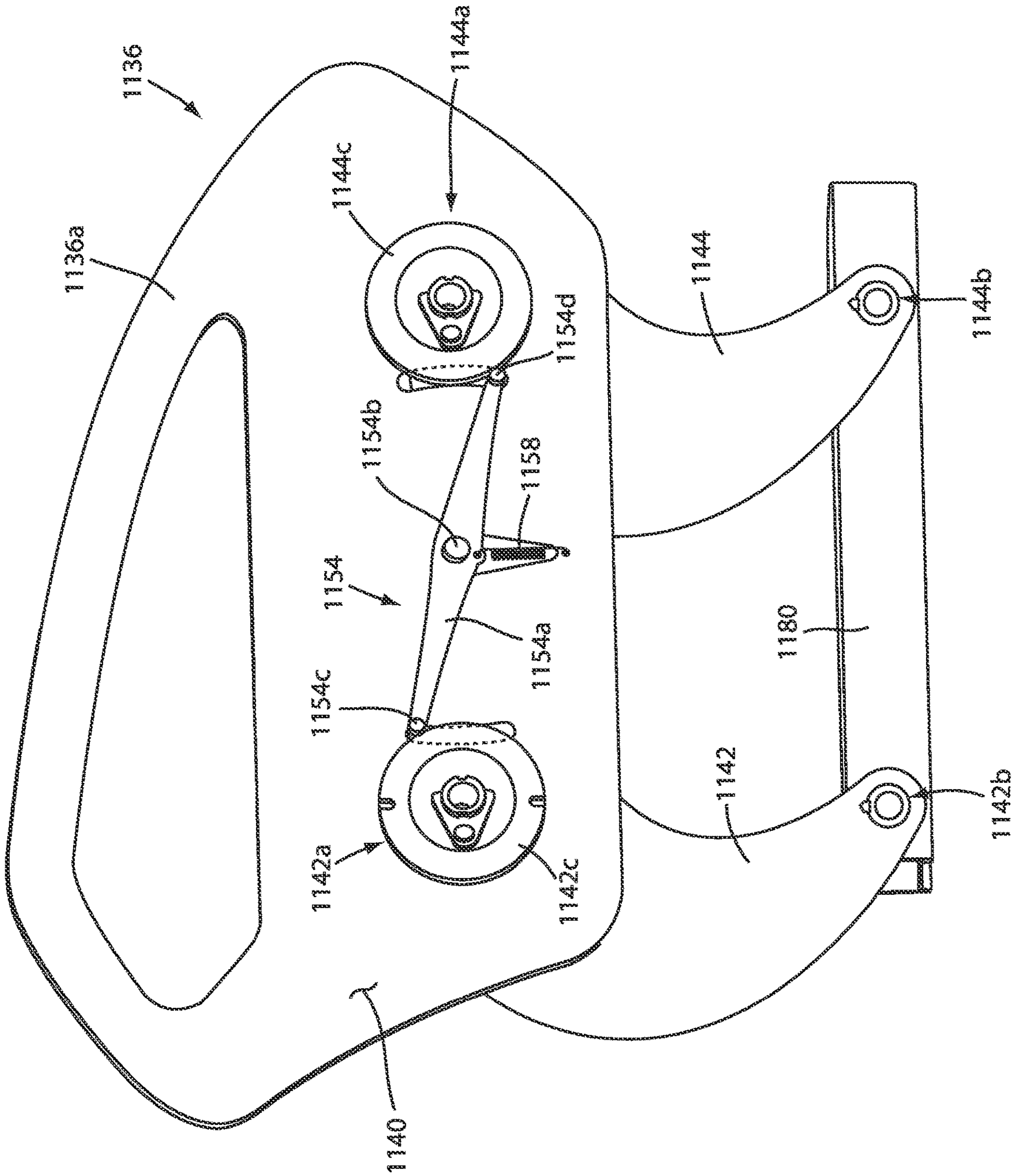
FIG. 41 is a fragmentary elevation view of the side rail shown in the full upright position with portions of the upper pivot connections shown in transparency.
Figure 42:
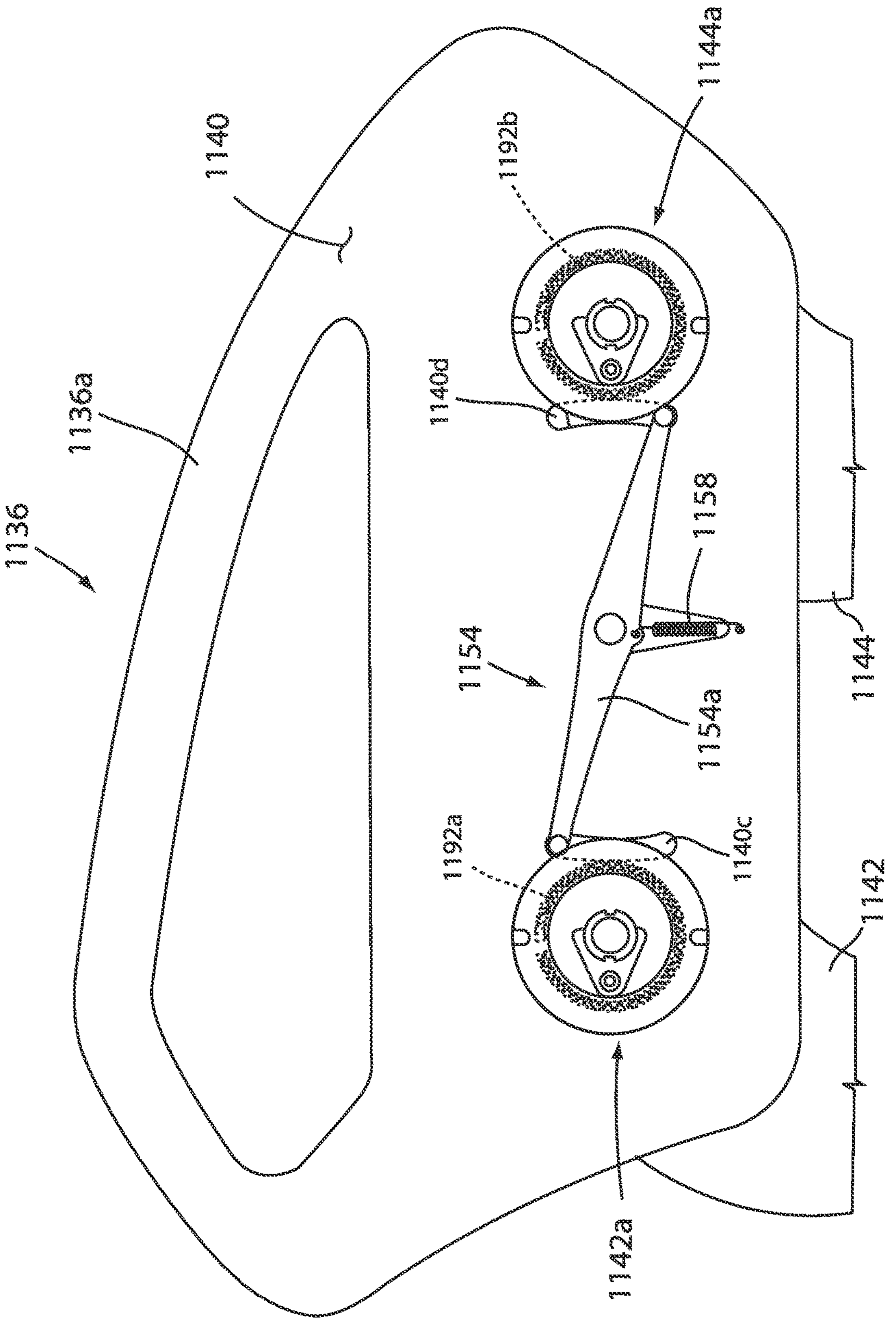
FIG. 42 is an enlarged fragmentary elevation view of the side rail of FIG. 41 with portions of the upper pivot connections shown in transparency.
Figure 43:
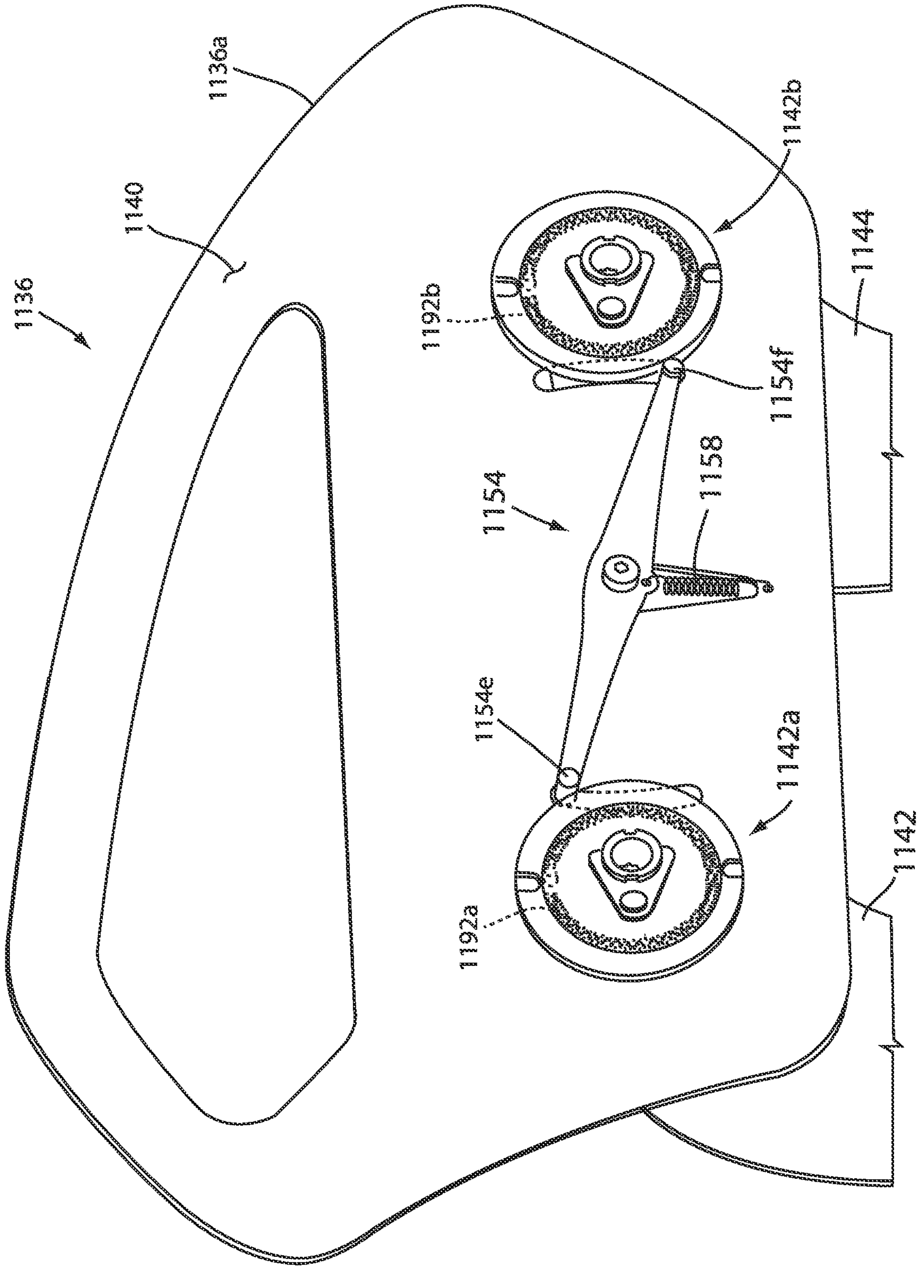
FIG. 43 is an enlarged fragmentary perspective view similar to FIG. 42.
Figure 44:
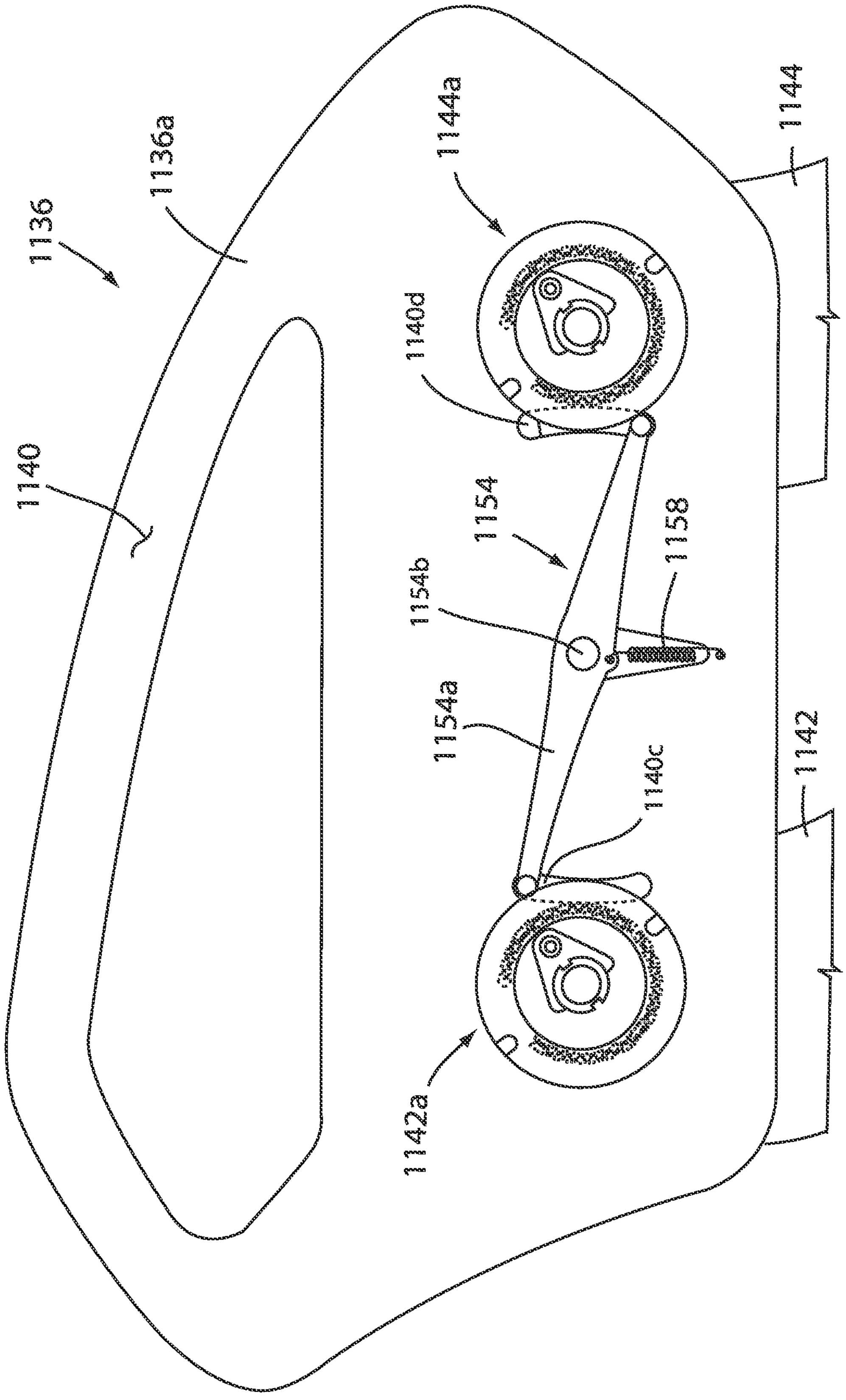
FIG. 44 is a fragmentary perspective view similar to FIG. 43 with the disc retainer shown in an alternate position and with the side rail body lowered.
Figure 44A:
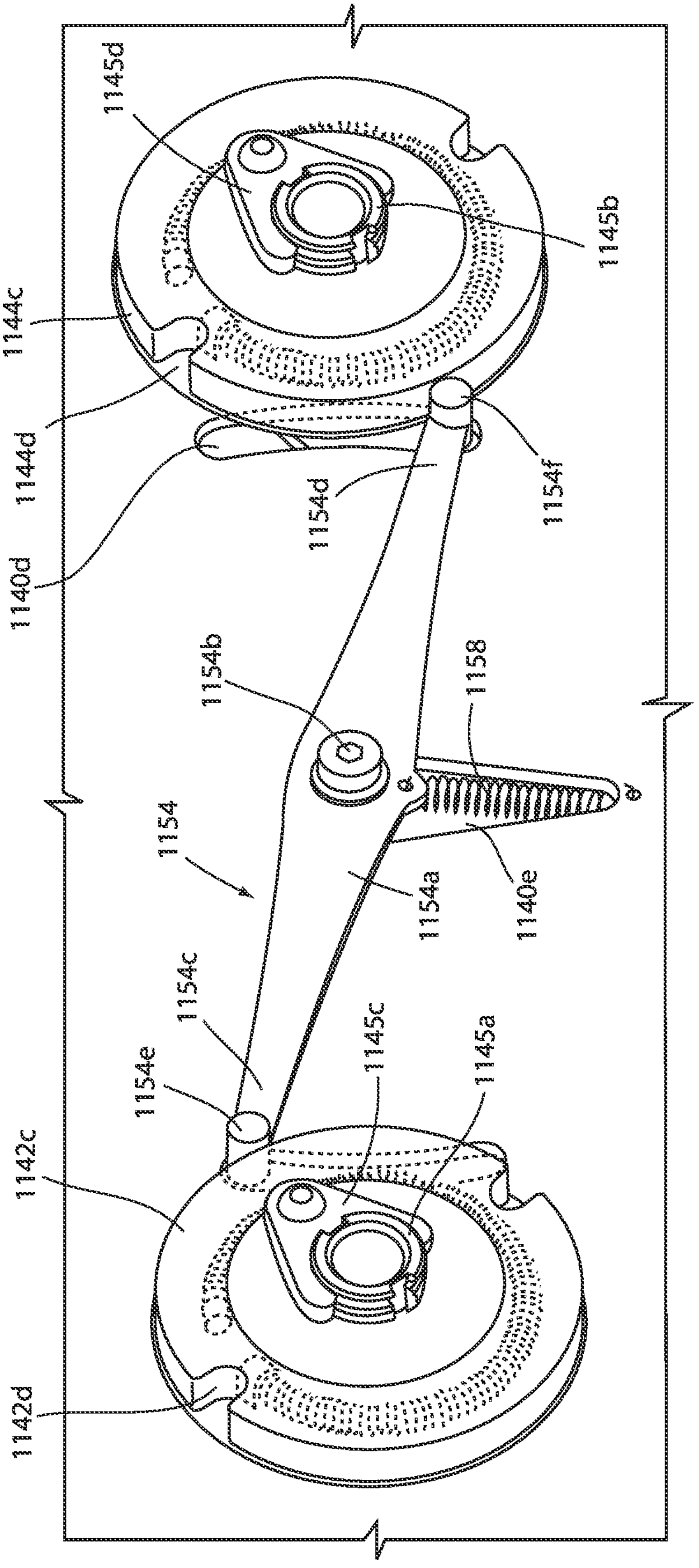
FIG. 44A is an enlarged fragmentary perspective view of the upper pivot connections and timing link with portions of the upper pivot connections shown in transparency.
Figure 44B:
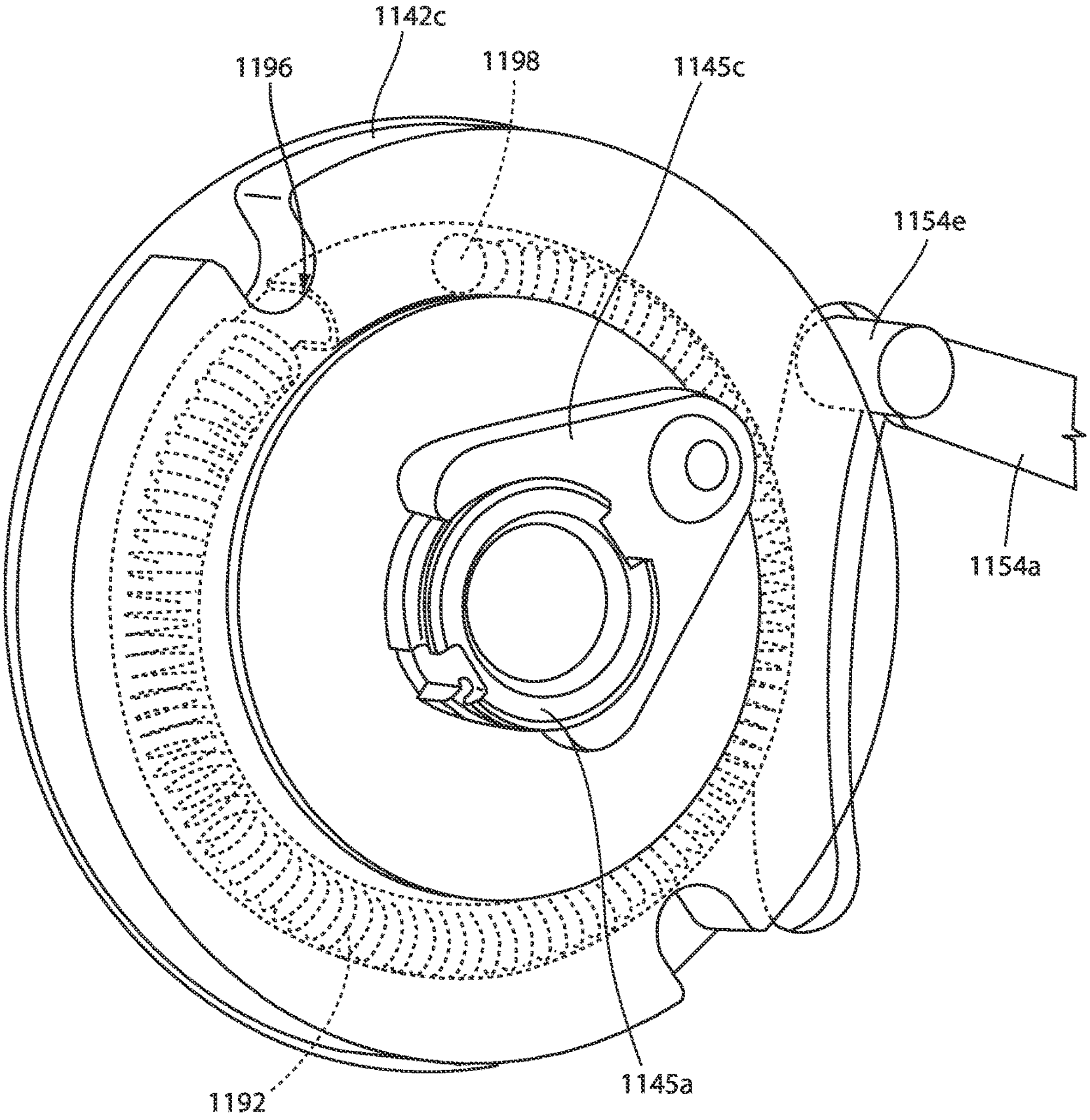
FIG. 44B is an enlarged fragmentary perspective view of the upper pivot connection with portions of the upper pivot connection shown in transparency.
Figure 45:
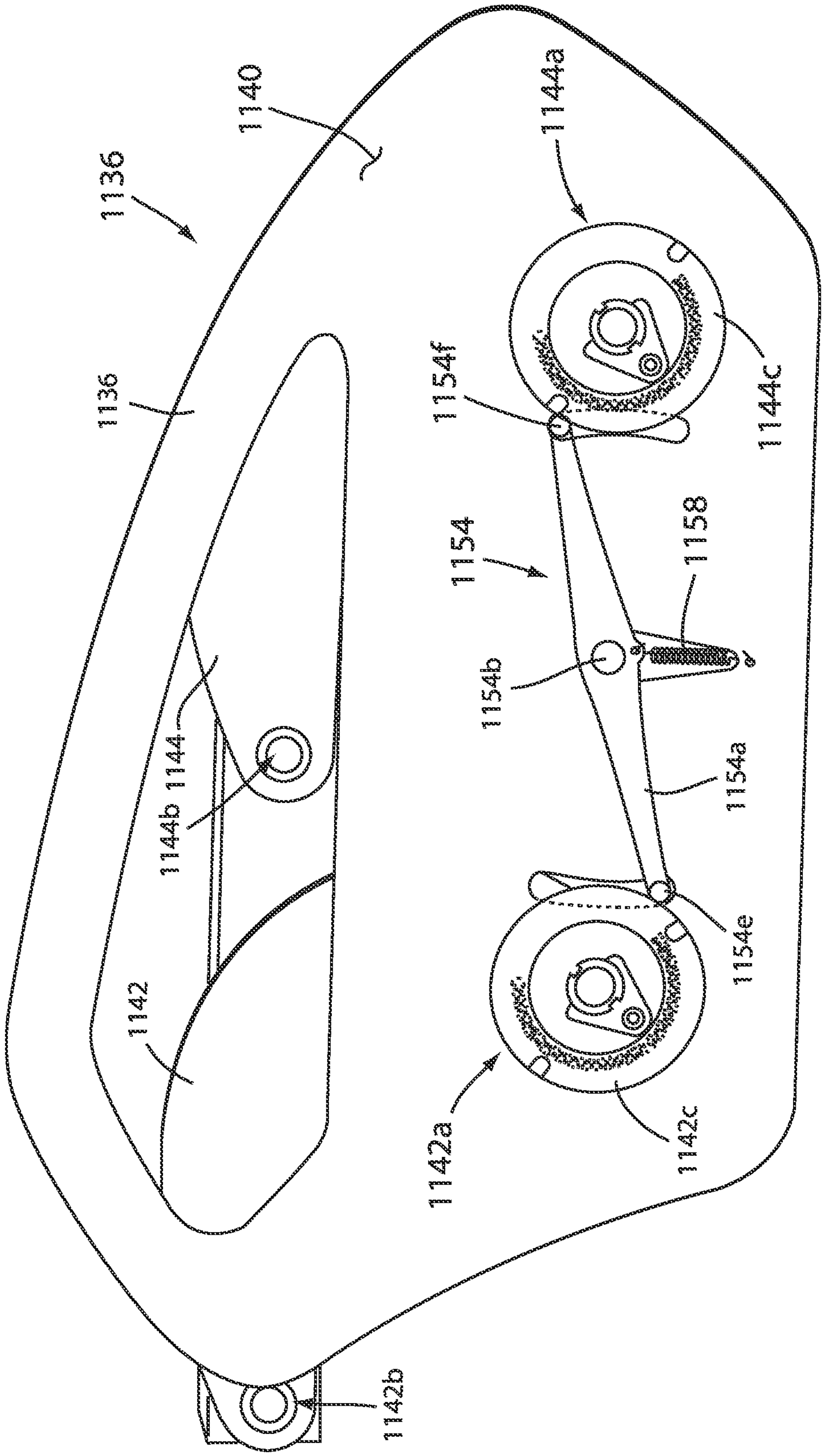
FIG. 45 is a fragmentary elevation view of the side rail of FIG. 41 shown lowered with portions of the upper pivot connections shown in transparency.

Referring now to FIGS. 41-43, when the side rail 1136 is at its full upright position, the timing link 1154 is disengaged from discs 1142*c*, 1144*c* (see FIGS. 44A and 44B). However, as side rail body 1136*a* is lowered to the right (as viewed in FIB. 45), discs 1142*c*, 1144*c* will rotate in the clockwise direction, respectively, so that the notch 1142*d*, 1144*d* of each disc 1142*c*, 1144*c* moves into alignment with pins 1154*e*, 1154*f* of timing link 1154 (FIGS. 38, 39, and 46). As best seen from FIG. 44B, pins 1154*e*, 1154*f* are immediately adjacent the edge of the respective disc so that when the notch 1142*d*, 1144*d* passes by a respective pin 1154*e*, 1154*f*, the tapered edge of the disc at the opening of the notch will contact the respective pin and move the pin into the respective notch 1142*d*, 1144*d* under the bias of a spring described below. As the discs continue to rotate, timing link 1154 will move to its horizontal position (FIGS. 38, 39, and 46) where, as noted, its pins will be fully seated in and engaged by notches 1142*d*, 1144*d*.

In the illustrated embodiment, timing link 1154 only seats in the respective notches when all four pivot connections are aligned to link the respective rotations of the upper pivot connections together and, thereby, preventing hitching (e.g., where the side rail body can flip upside down, because of the lack of restraint (i.e., where there are too may degrees of freedom)). Optionally, as noted, timing link 1154 couples the respective upper pivot connections over a limited range of motion. In the illustrated embodiment, upper pivot connections 1142*a*, 1144*a* are coupled together by timing link 1154 over a range of about 20 degrees, for example, about 10 degrees before full engagement (i.e., where the timing link is horizontal) and about 10 degrees after full engagement. As would be understood, the range of engagement is may be adjusted by changing factors, such as the length and location of the slots 1136*b*, 1136*c* and/or the size of the discs and other factors.

Pins 1154*e*, 1154*f* may be fixed at or near the respective ends of elongate member 1154*a* or may be rotatably mounted about their longitudinal axes to reduce the friction between the timing link 1154 and discs 1142*c*, 1144*c*. Alternately, pins 1154*e*, 1154*f* may be formed from a low friction material or have a low friction outer coating or layer.

To bias timing link 1154 to its horizontal orientation or engaged position, timing link 1154 also includes a spring 1158 (e.g., FIGS. 38 and 42). Spring 1158 comprises a coil spring 1158*a* that is mounted on one end to side rail body frame 1140 and on its other end to elongated member 1154*a*. Optionally, frame 1140 may include an opening 1140*e* to accommodate spring 1158. Further, spring 1158 is configured as an over center spring. For example, one end of coil spring 1158*a* is mounted to elongated member 1154*a* offset from its pivot axis 1154*b* so that when elongated member 1154*a* is tilted in the clockwise direction (e.g., as viewed in FIGS. 40 and 42), spring 1158 will apply a downward spring force on elongated member 1154*a* to bias elongated member 1154*a* toward its horizontal position. Similarly, when elongated member 1154*a* is tilted in the counterclockwise direction (e.g., as viewed in FIGS. 45 and 45A), spring 1158 will bias elongated member 1154*a* in a clockwise direction to once again to urge elongated member 1154*a* toward its horizontal orientation or engaged position.

In addition to having a selectively engageable timing link, side rail 1136 optionally includes at least one counter balance mechanisms. The counter balance mechanism is configured to assist in balancing the weight of the side rail and, further, in the illustrated embodiment configured to assist in balancing the weight of the side rail when the side rail is moved from its full upright position (FIGS. 41 and 42).

Referring again to FIGS. 41 and 42, one or both upper pivot connections 1142*a*, 1142*b* includes a spring 1192*a*, 1192*b*, such as a coil spring, that is trapped between two mechanical stops so that when side rail body 1136*a* is rotated from its full upright position, the spring or springs 1192*a*, 1192*b* are compressed to reduce the apparent weight of the side rail 1136*a* when a user, for example, wishes to raise or lower side rail body 1136*a*. Springs are in their least compressed state or a neutral (uncompressed) state when the side rail body is in its fully upright position (FIG. 41). Once the side rail body is lowered from its fully upright position, either by clockwise or counterclockwise rotation of the mounting arms, the springs are compressed, which reduces the apparent weight of the side rail. Although two springs are shown and described, it should be understood that a single spring or more than two springs could be used.

In the illustrated embodiment, springs 1192*a*, 1192*b* are mounted about upper pivot connections 1142*a*, 1144*a* so that they are compressed as upper pivot connections rotate away from the fully upright position to store some of the weight of the side rail to provide a counterbalance mechanism. Further, springs 1192*a*, 1192*b* are mounted in discs 1142*c*, 1144*c*. As best seen in FIG. 41, each disc 1142*c*, 1144*c* includes an annular recess or channel that forms a track in which the respective spring 1192*a* or 1192*b* is trapped when the respective disc 1142*c*, 1144*c* is mounted to side rail body frame 1140. Further, springs 1192*a*, 1192*b* are compressed when the respective disc 1142*c*, 1144*c* is rotated, as noted in either direction, from the full upright position (see e.g. FIG. 41).

To compress springs 1192*a*, 1192*b*, each disc 1142*c*, 1144*c* includes a stop 1196. In the illustrated embodiment, each stop 1196 is formed by channel-shaped member 1196*a* (which is formed or mounted in channel 1194) that includes two opposed ends 1196*b*, 1196*c*. The inner dimension of channel-shaped member 1196*a* is smaller than the ends of the spring (1192*a*, 1192*b*) so that opposed ends 1196*b*, 1196*c* thereby provide a stop for each end of the spring. Additionally, a second stop 1198 is provided, which is mounted to side rail body frame 1140 and extends into recess 1194 to form a fixed stop relative to the spring, which moves with the disc and the bushing when the side rail body is raised or lowered. To accommodate stop 1198, the inner dimension of channel member 1196*a* is larger than stop 1198 so that as the disc rotates, stop 1198 can pass through channel-shaped member 1196*a* to press on the free end of the spring to compress the spring against stop 1196.

Stop 1198, as noted, is mounted to frame 1140 in a fixed position but extends into the open side of recess 1194, which faces frame 1140. Because it has a smaller outer dimension than the inner dimension of stop 1196, stop 1198 can move through stop 1196 but because of its connection to frame 1140 can provide a stop for either end of spring 1192*a*, 1192*b*.

Thus, springs 1192*a*, 1192*b* are free floating between one fixed stop and one moving stop so that a single spring (or two or more springs) may be used to operate as a counter balance to the weight of side rail. Furthermore, because the springs are contained within the discs mounted about the upper pivot connections, the springs are fully contained within the side rail body. Additionally, because of the compact arrangement of the springs, the overall height of the side rail body may be reduced to further assist in achieving a low height bed.

Although described as manually driven side rails, any of the above side rails may be powered, such as described in co-pending U.S. Prov. App. Entitled POWERED SIDE RAIL FOR PATIENT SUPPORT APPARATUS, Ser. No. 62/270,715, filed Dec. 22, 2015, which is incorporated by reference herein in its entirety. Further, any of the powered side rails described in the above referenced application may be configured as manually movable side rails, using any of the mounting mechanisms described herein or other mounting mechanisms.

In any of the above side rails, the side rails may be configured so that they absorb energy from raising or lowering side rails or any impacts, which can reduce the wear and tear on the component parts of the side rail. Further, the dampers may be used between any of the components of the side rails, including any load path that connects the side rails to other parts of a patient support apparatus. The dampers can be selected from, but not limited to, a rubber body, a spring, or living hinge.

In any of the embodiments, the side rails may incorporate a timing link that varies the friction between it and the gears it engages over one range of motion but then configured to provide increased friction and hence stability over another range of motion, where increased stability may be desired. It should be understood that one or more features of one embodiment may be combined with one or more features of another embodiment.

Accordingly, as described herein, many of the components of the mounting mechanism, e.g. the timing link, the locking mechanism, the upper portion of the mounting arms of a side rail may be fully contained within the side rail body (see e.g. FIGS. 23 and 23A) and hence are compact and do not interfere with the ability of the side rails to be lowered to a very low height. Further, the timing link can be the vehicle of the locking mechanism for the side rail, which allows for a simplified mounting mechanism in some embodiments. Further, the mounting mechanism can use a single locking assembly or a single latch to lock both side rail mounting arms simultaneously. Thus, the side rail can be more efficient, which can reduce the overall part count and hence simplify the assembly process.

While several forms of the disclosure have been shown and described, various alterations and changes can be made without departing from the spirit and broader aspects of the disclosure as defined in the appended claims, which are to be interpreted in accordance with the principles of patent law, including the doctrine of equivalents. For example, as noted, the side rails can have a single locked position or multiple locked positions, including an uppermost (fully upright) position and a lowermost (fully lowered) position, where the mounting arms are at their maximum upward position and height or lowest downward position and height. Further, the bypass mechanisms described herein may be configured to bypass one or more locked positions (raised locked position, intermediate locked position, and/or a lowered locked position (if locked), as noted, and, further, bypass any stop positions, if desired. Additionally, while in some embodiments there are stops to limit the rage of motion between a lowered position (e.g. where the mounting arms are angled relative to the floor) and, in some cases, just beyond the raised locked position, the stops may be bypassed or eliminated to allow a greater range of motion, including 360 degree rotation (or multiples of 360 degree rotation) of the mounting arms. Further, in some embodiments where 360 degree rotation is possible (e.g. the side rail illustrated in FIG. 11), stops may be provided to limit the rotation.

This disclosure is presented for illustrative purposes and should not be interpreted as an exhaustive description of all embodiments of the disclosure or to limit the scope of the claims to the specific elements illustrated or described in connection with these embodiments. For example, and without limitation, any individual element(s) of the described disclosure may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments comprise a plurality of features that are described in concert and that might cooperatively provide a collection of benefits. Therefore, the present disclosure is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

We claim:

1. A patient support apparatus comprising:

a frame;

a side rail mounted to said frame, said side rail including a side rail body and a pair of arms mounting said side rail body for movement over a full range of motion relative to said frame, said pair of arms having a first pair of pivot connections directly coupled to said side rail body and a second pair of pivot connections for mounting to said frame;

a timing link; and each of said first pair of pivot connections of said pair of arms engaging said timing link over a portion of said timing link and translating across said portion when said first pair of pivot connections are pivoted.

2. The patient support apparatus according to claim 1, wherein said timing link includes a plurality of teeth at said portions, and said first pair of pivot connections includes a plurality of teeth to engage respective teeth of said plurality of teeth at said portions of said timing link.

3. The patient support apparatus according to claim 2, wherein said timing link comprises a non-linear timing link.

4. The patient support apparatus according to claim 3, wherein said non-linear timing link comprises a gear or a curved rack.

5. The patient support apparatus according to claim 1, wherein said timing link comprises a belt loop or a chain loop.

6. The patient support apparatus according to claim 1, further comprising at least one latch to engage said timing link to thereby lock movement of said side rail body.

7. The patient support apparatus according to claim 1, wherein said timing link is at least partially supported by at least two rollers, and wherein said at least two rollers are formed from energy absorbing material to thereby absorb impact forces from said timing link.

8. A patient support apparatus comprising:

a frame;

a side rail mounted to said frame, said side rail including a side rail body and a pair of arms, said pair of arms mounting said side rail body relative to said frame, said pair of arms having a first pair of pivot connections connected to said side rail body and a second pair of pivot connections mounted to said frame, and said side rail body having first and second movable stops; and a single damper to counterbalance the weight of the side rail to reduce the force needed to raise and to lower the side rail.

9. The patient support apparatus according to claim 8, wherein said frame has a longitudinal axis, and said side rail body has a longitudinal axis extending parallel to the longitudinal axis of the patient support apparatus, and said single damper is oriented along the longitudinal axis of the side rail body.

10. The patient support apparatus according to claim 8, wherein said damper is mounted so that it can apply a force in a first direction when said side rail body rotates over a first range of motion and then can apply a force in a second direction opposed from the first direction when said side rail body rotates over a second range of motion different from the first range of motion.

11. The patient support apparatus according to claim 8, wherein said side rail body is movably mounted to said frame by said pair of arms over a range of motion relative to said frame and having spaced apart first and second stops, said damper having a longitudinal axis and being compressible and generating a force when compressed along said longitudinal axis, said damper having opposed first and second free ends, and said damper being trapped between said first and second stops wherein when said side rail body moves in a first direction over said range of motion said first stop compresses said first free end of said damper, and when said side rail body moves in a second direction over said range of motion said second stop compresses said second free end of said damper.

12. The patient support apparatus according to claim 11, further comprising a timing link, said timing link linking rotational movement of said first pair of pivot connections of said pair of arms, said timing link supporting said first and second stops and moving said first and second stops to compress said damper.

13. The patient support apparatus according to claim 12, wherein said first and second stops comprise movable stops, and said side rail body includes first and second fixed stops fixed relative to said side rail body, and said first and second free ends of said damper trapped between said first and second fixed stops, wherein when said side rail body moves in the first direction said first movable stop compresses said first free end of said damper and compresses said second free end against said second fixed stop, and when said side rail body moves in said second direction said second movable stop compresses said second free end of said damper and compresses said first free end against said first fixed stop.

14. The patient support apparatus according to claim 12, further comprising a locking mechanism to lock the position of the side rail body, and said locking mechanism supporting said damper between said first and second free ends.

15. The patient support apparatus according to claim 14, wherein said locking mechanism includes a latch to engage said timing link to thereby lock movement of said side rail body.

16. The patient support apparatus according to claim 8, wherein said damper comprises a gas spring.

17. The patient support apparatus according to claim 16, wherein said gas spring is contained within said side rail body, and wherein said gas spring is remotely lockable from outside said side rail body.

18. A patient support apparatus comprising:

a frame;

a side rail mounted to said frame, said side rail including a side rail body and a pair of arms, said pair of arms mounting said side rail body relative to said frame, said pair of arms having a first pair of pivot connections connected to said side rail body and a second pair of pivot connections mounted to said frame;

a timing link; and each of said first pair of pivot connections of said pair of arms engaged with said timing link over a first range of motion to form a four bar linkage and disengaged from said timing link over a second range of motion to no longer form a four bar linkage.

19. The patient support apparatus according to claim 18, wherein said timing link comprises a bar extending between said first pair of pivot connections.

20. The patient support apparatus according to claim 19, wherein said bar is pivotally mounted between said first pair of pivot connections to form a rocker bar.

21. The patient support apparatus according to claim 20, wherein each of said first pair of pivot connections includes a disc, and each disc having at least one slot for engagement by said bar over said first range of motion.

* * * * *